(12) United States Patent
Costa

(10) Patent No.: US 12,485,115 B2
(45) Date of Patent: Dec. 2, 2025

(54) BIASED NMDA RECEPTOR MODULATORS AND USES THEREOF

(71) Applicant: EDWARD VIA COLLEGE OF OSTEOPATHIC MEDICINE, Blacksburg, VA (US)

(72) Inventor: Blaise Mathias Costa, Blacksburg, VA (US)

(73) Assignee: EDWARD VIA COLLEGE OF OSTEOPATHIC MEDICINE, Blacksburg, VA (US)

(*) Notice: Subject to any disclaimer, the term of this patent is extended or adjusted under 35 U.S.C. 154(b) by 1033 days.

(21) Appl. No.: 17/293,903

(22) PCT Filed: Nov. 13, 2019

(86) PCT No.: PCT/US2019/061308
§ 371 (c)(1),
(2) Date: May 13, 2021

(87) PCT Pub. No.: WO2020/102443
PCT Pub. Date: May 22, 2020

(65) Prior Publication Data
US 2022/0016105 A1    Jan. 20, 2022

Related U.S. Application Data

(60) Provisional application No. 62/923,401, filed on Oct. 18, 2019, provisional application No. 62/760,141, filed on Nov. 13, 2018.

(51) Int. Cl.
| | | |
|---|---|---|
| *A01N 37/00* | (2006.01) |
| *A01N 25/00* | (2006.01) |
| *A01N 37/12* | (2006.01) |
| *A01N 37/44* | (2006.01) |
| *A61K 31/215* | (2006.01) |
| *A61K 31/24* | (2006.01) |
| *A61K 31/451* | (2006.01) |
| *A61K 31/453* | (2006.01) |
| *A61K 31/4545* | (2006.01) |
| *A61K 31/496* | (2006.01) |
| *A61K 31/497* | (2006.01) |
| *A61K 31/501* | (2006.01) |
| *A61K 31/506* | (2006.01) |
| *A61K 31/5377* | (2006.01) |
| *A61K 31/675* | (2006.01) |
| *A61K 45/06* | (2006.01) |
| *C07D 401/04* | (2006.01) |
| *C07D 401/14* | (2006.01) |
| *C07D 405/04* | (2006.01) |
| *C07D 405/14* | (2006.01) |
| *C07D 413/04* | (2006.01) |
| *C07D 413/14* | (2006.01) |

(52) U.S. Cl.
CPC ........ *A61K 31/4545* (2013.01); *A61K 31/451* (2013.01); *A61K 31/453* (2013.01); *A61K 31/496* (2013.01); *A61K 31/497* (2013.01); *A61K 31/501* (2013.01); *A61K 31/506* (2013.01); *A61K 31/5377* (2013.01); *A61K 31/675* (2013.01); *A61K 45/06* (2013.01); *C07D 401/04* (2013.01); *C07D 401/14* (2013.01); *C07D 405/04* (2013.01); *C07D 405/14* (2013.01); *C07D 413/04* (2013.01); *C07D 413/14* (2013.01)

(58) Field of Classification Search
None
See application file for complete search history.

(56) References Cited

U.S. PATENT DOCUMENTS

| | | |
|---|---|---|
| 2009/0081636 A1 | 3/2009 | Huang |
| 2010/0137332 A1 | 6/2010 | Gant et al. |

FOREIGN PATENT DOCUMENTS

| | | |
|---|---|---|
| WO | 2011049737 A1 | 4/2011 |

OTHER PUBLICATIONS

Mirzaabdullaev et al. (Condensations of anabasine, N-aminoanabasine with isocyanates and isothiocyanates. Uzbekskii Khimicheskii Zhurnal. vol. 19 Issue: 6. p. 38-43. 1975).*
Mirzaabdullaev et al. (Mass-spectrometric study of methyl, acetylcarbamoyl, and methylthiocarbamoyl derivatives of anabasine, aminoanabasine, cytisine, aminocytisine, and ephedrine. Uzbekskii Khimicheskii Zhurnal. Issue: 2. p. 47-49. 1976).*
Kulakov et al. (Synthesis and antibacterial and antifungal activities of thiourea derivatives of the alkaloid anabasine. Pharmaceutical chemistry journal. May 28, 2011 vol. 45, pp. 15-18, (2011)).*
Remington: The Science and Practice of Pharmacy.*
"CID 13442634 Ncbi", Pubchem, pp. 1-10, Feb. 8, 2007.
"CID 87271765 Ncbi", Pubchem, pp. 1-8, Feb. 12, 2015.
"International Search Report and Written Opinion", issued by the United States Patent Office, as International Searching Authority for PCT/US2019/061308 on Jan. 22, 2020.
Hardingham, et al., "Coupling of extrasynaptic NMDA receptors to a CREB shut-off pathway is developmentally regulated," Biochim Biophys Acta, vol. 1600, Nos. 1-2, pp. 148-153, Accepted: Sep. 20, 2002.

(Continued)

*Primary Examiner* — Layla Soroush
(74) *Attorney, Agent, or Firm* — Carin R. Miller; Lex Generalis, LLC

(57) ABSTRACT

Described herein are compounds that can be capable of modulating an N-methyl-D-aspartate (NMDA) receptor. In some embodiments, the compound(s) can be a biased modulator of an NMDA receptor. In some embodiments, the compound(s) can be a biased allosteric modulator of an NMDA receptor. Also described herein are methods of treating an NMDA-mediated disease by administering one or more of the compounds described herein. In some embodiments, the compounds can be effective to treat a neurobiological or psychiatric disease or disorder.

17 Claims, 34 Drawing Sheets

(56) References Cited

OTHER PUBLICATIONS

Hardingham, et al., "Synaptic versus extrasynaptic NMDA receptor signalling: implications for neurodegenerative disorders," Nat Rev Neurosci, vol. 11(10): p. 682-696, Oct. 2010.
Okamoto, S., et al., "Balance between synaptic versus extrasynaptic NMDA receptor activity influences inclusions and neurotoxicity of mutant huntingtin," Nat Med., vol. 15, No. 12, p. 1407-1413, Dec. 2009.
Aluclu, M.U., et al., Evaluation of effects of memantine on cerebral ischemia in rats, Neurosciences (Riyadh), vol. 13, No. 2, p. 113-6, 2008.
Al-Hallaq, R.A., et al., "NMDA di-heteromeric receptor populations and associated proteins in rat hippocampus," J Neurosci, vol. 27, No. 31, p. 8334-43, Aug. 1, 2007.
Luo, J., et al., "The majority of N-methyl-D-aspartate receptor complexes in adult rat cerebral cortex contain at least three different subunits (NR1/NR2A/NR2B)," Mol Pharmacol., vol. 51, No. 1, p. 79-86, Accepted: Oct. 11, 1996.
Rauner, C. and G. Kohr, "Triheteromeric NR1/NR2A/NR2B receptors constitute the major N-methyl-D-aspartate receptor population in adult hippocampal synapses," J Biol Chem, vol. 286, No. 9, p. 7558-66, Mar. 4, 2011. PMC3045010.
Sheng, M., et al., "Changing subunit composition of heteromeric NMDA receptors during development of rat cortex," Nature, vol. 368, No. 6467, p. 144-7, Mar. 10, 1994.
Tovar, K.R., et al., "Triheteromeric NMDA receptors at hippocampal synapses," J Neurosci, vol. 33, No. 21, p. 9150-60, May 22, 2013.
Hansen, K.B., et al., "Distinct functional and pharmacological properties of Triheteromeric GluN1/GluN2A/GluN2B NMDA receptors," Neuron, vol. 81, No. 5, p. 1084-1096, Mar. 5, 2014.
Traynelis et al., "Glutamate Receptor Ion Channels: Structure, Regulation, and Function," Pharmacol Rev., vol. 62, No. 3, pp. 405-496, 2010.
Paoletti, et al., "NMDA receptor subunit diversity: impact on receptor properties, synaptic plasticity and disease," Nature Rev., Neurosci., vol. 14, p. 383-400, Jun. 2013.
Lai, T.W., et al., "Stroke intervention pathways: NMDA receptors and beyond," Trends Mol Med., vol. 17, No. 5, p. 266-75, May 2011.
Matsumura, S., et al., "Impairment of CaMKII activation and attenuation of neuropathic pain in mice lacking NR2B phosphorylated at Tyr1472," Eur J Neurosci, vol. 32, No. 5, p. 798-810, Accepted: May 24, 2010.
Kotermanski, S.E. and J.W. Johnson, "Mg2+ imparts NMDA receptor subtype selectivity to the Alzheimer's drug memantine," J Neurosci, vol. 29, No. 9, p. 2774-9, Mar. 4, 2009.
Milnerwood, A.J. and L.A. Raymond, "Early synaptic pathophysiology in neurodegeneration: insights from Huntington's disease," Trends Neurosci, vol. 33, No. 11, p. 513-23, Nov. 2010.
Sgambato-Faure, V. and M.A. Cenci, "Glutamatergic mechanisms in the dyskinesias induced by pharmacological dopamine replacement and deep brain stimulation for the treatment of Parkinson's disease," Prog Neurobiol, vol. 96, No. 1, p. 69-86, Available online: Nov. 3, 2011.

Wortzel, H.S. and D.B. Arciniegas, "Treatment of post-traumatic cognitive impairments," Curr Treat Options Neurol., vol. 14, No. 5, p. 493-508, Oct. 2012.
Yamamoto, S., et al., "Effects of single prolonged stress and D-cycloserine on contextual fear extinction and hippocampal NMDA receptor expression in a rat model of PTSD," Neuropsychopharmacology, vol. 33, No. 9, p. 2108-16, Accepted: Sep. 21, 2007.
Henson, M.A., et al., "Influence of the NR3A subunit on NMDA receptor functions," Prog Neurobiol, vol. 91, No. 1, p. 23-37, May 2010.
Won, H., et al., "Autistic-like social behaviour in Shank2-mutant mice improved by restoring NMDA receptor function," Nature, vol. 486, No. 7402, p. 261-5, Jun. 14, 2012.
Autry, A.E., et al., "NMDA receptor blockade at rest triggers rapid behavioural antidepressant responses," Nature, vol. 475, No. 7354, p. 91-5, Jul. 7, 2011.
Parsons, C.G., A. Stoffler, and W. Danysz, "Memantine: a NMDA receptor antagonist that improves memory by restoration of homeostasis in the glutamatergic system—too little activation is bad, too much is even worse," Neuropharmacology, vol. 53, No. 6, p. 699-723, Accepted: Jul. 17, 2007.
Moghaddam, B. and D. Javitt, "From revolution to evolution: the glutamate hypothesis of schizophrenia and its implication for treatment," Neuropsychopharmacology, vol. 37, No. 1, p. 4-15, Accepted: Jul. 21, 2011.
Niimura, M., et al., "Changes in phosphorylation of the NMDA receptor in the rat hippocampus induced by status epilepticus," J Neurochem, vol. 92, No. 6, p. 1377-85, 2005.
Dalmau, J., et al., "Anti-NMDA-receptor encephalitis: case series and analysis of the effects of antibodies," Lancet Neurol, vol. 7, No. 12, p. 1091-8, Dec. 2008.
Zeng, Q., et al., "Synaptic proximity enables NMDAR signaling to promote brain metastasis," Nature, vol. 573, No. 7775, p. 526-531, Sep. 26, 2019.
Muller-Langle, A., et al., "NMDA Receptor-Mediated Signaling Pathways Enhance Radiation Resistance, Survival and Migration in Glioblastoma Cells—A Potential Target for Adjuvant Radiotherap,". Cancers (Basel), vol. 11, No. 503, pp. 1-16, Published: Apr. 9, 2019.
Kalev-Zylinska, M.L., et al., "N-methyl-D-aspartate receptors amplify activation and aggregation of human platelets," Thromb Res., vol. 133, No. 5, p. 837-47, Available online: Feb. 21, 2014.
Schwarting, A., et al., "Fatigue in SLE: diagnostic and pathogenic impact of anti-N-methyl-D-aspartate receptor (NMDAR) autoantibodies," Ann Rheum Dis, vol. 78, No. 9, p. 1226-1234, Published Online First: Jun. 11, 2019.
Makhro, A., et al., "Cardiac N-methyl D-aspartate Receptors as a Pharmacological Target," J Cardiovasc Pharmacol., vol. 68, No. 5, p. 356-373, 2016.
Deng, A. and S.C. Thomson, "Renal NMDA receptors independently stimulate proximal reabsorption and glomerular filtration," Am J Physiol. Renal Physiol., vol. 296, No. 5, p. F976-82, Mar. 11, 2009.
Dumas, S.J., et al., "NMDA-Type Glutamate Receptor Activation Promotes Vascular Remodeling and Pulmonary Arterial Hypertension," Circulation, vol. 137, No. 22, p. 2371-2389, May 29, 2018.

* cited by examiner

A. $1_{gs}/2A_{gs}$

B.

TH

E.

F.

G.

H.

F.

G.

H.

C.

D.

E.

F.

BIASED NMDA RECEPTOR MODULATORS AND USES THEREOF

CROSS-REFERENCE TO RELATED APPLICATIONS

This application is the U.S. National Stage Application under 35 U.S.C. § 371 of Patent Cooperation Treaty Application No.: PCT/US2019/061308, filed on Nov. 13, 2019, entitled "BIASED NMDA RECEPTOR MODULATORS AND USES THEREOF," which claims the benefit of and priority to U.S. Provisional Patent Application No. 62/760,141, filed on Nov. 13, 2018, entitled "Compounds that Selectively Potentiate Triheteromeric (GluN1/2A/2B)", the contents of which are incorporated by reference herein in their entireties.

This application also claims the benefit of and priority to U.S. Provisional Patent Application No. 62/923,401, filed on Oct. 18, 2019, entitled "Compounds That Selectively Potentiate Triheteromeric (GluN1/2A/2B)," the contents of which is incorporated by reference herein in its entirety.

TECHNICAL FIELD

The subject matter disclosed herein is generally directed to compounds and compositions capable of modulating or otherwise interacting with N-methyl-D-aspartate (NMDA) receptors and uses thereof.

BACKGROUND

N-methyl-D-aspartate (NMDA) are glutamate receptors form ion channels and are found in nerve cells. NMDA receptors play a central role in normal brain function and activity. They are involved in synaptic plasticity, synapse formation underlying memory, learning, and formation of neural networks in the central nervous system. NMDA receptors. NMDA receptors are activated when glutamate and glycine (a co-agonist) bind to it. When activated, NMDA allows positively charged ions to flow through the NMDA channel.

Aberrant expression, function and/or activity of NMDA receptors can contribute to the pathogenesis of various psychiatric and/or neurological diseases and disorders. Indeed, overactivation of the receptor causes an excess influx of calcium ions and can lead to excitotoxicity. Excitotoxicity has been implicated in various neurodegenerative diseases and disorders, such as Alzheimer's disease, Parkinson's disease, Huntington's disease and amyotrophic lateral sclerosis (ALS) and can contribute to neuron death and damage during ischemic events. Hypofunction of NMDA receptors may be involved in the impairment of synaptic plasticity and has also been implicated in neurological diseases and disorders. For example, hypofunction induced by NMDA receptor antagonists have elicited positive, negative, and cognitive-like symptoms of schizophrenia. Thus, it is believed that hypofunction of NMDA receptors, like hyperfunction of NMDA receptors, can result in neurological diseases and disorders.

Much effort has been expended to develop agents capable of modulating NMDA receptor activity. However, the heterogeneity of NMDA receptors, complex spatial and temporal expression patterns, and relatively narrow margin of normal activity of NMDA receptors has made NMDA receptor targeting-therapeutics development challenging. Indeed, NMDA receptors are heteromeric receptors as previously discussed. Also, different subtypes are predominant in different tissue types as wells as during different times throughout the lifespan of a subject. Moreover, pathologic conditions arise as a result of both under- and over-activity of the NMDA receptors. Further, despite there being significant research into the structure, activity, function, and NMDA receptor's role in health and disease, these efforts are extremely biased towards on particular subtype, namely the canonical representative di-heteromeric (DH) receptor subtypes GluN1/2A and GluN1/2B. However, other DH subtypes as well as tri-heteromeric (TH) subtypes play significant roles in disease development.

As such, there exists a need to develop compounds and compositions capable of modulating NMDA receptor function and activity, particularly ones that are selective to different NMDA receptor subtypes.

Citation or identification of any document in this application is not an admission that such a document is available as prior art to the present invention.

SUMMARY

In certain example embodiments, described herein are compounds of Formula I

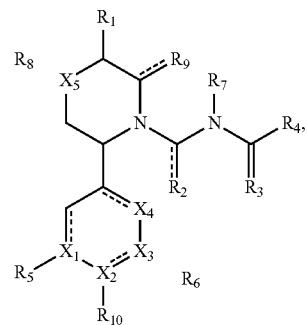

Formula I wherein $R_1$ is selected from the group consisting of: $H_2$, an aldehyde, an alkane, and an alkyl, where each are optionally substituted, wherein $R_2$ and $R_3$ are each individually selected from the group consisting of: S, O, and NH, wherein $R_4$ is selected from the group consisting of: an alkane, an alkene, an alkyl, an aryl, a heterocycle, a bicycloalkane, an alkoxy, and combinations thereof, wherein each are optionally substituted, wherein $R_5$, when optionally present, is selected from the group consisting of: H, $H_2$, an alkyl, and a nitrile, which are optionally substituted, wherein $R_6$, when optionally present, is selected from the group consisting of: H, $H_2$, an alkyl, and a nitrile, which are optionally substituted, wherein $R_7$ is selected from the group consisting of: H and an alkyl, which are optionally substituted wherein $R_8$, when optionally present, is selected from the group consisting of: H, $H_2$, and an alkyl, which are optionally substituted, wherein $R_9$ is selected from the group consisting of: $H_2$, =O, =N, and =S, wherein $R_{10}$, when optionally present, is H or $H_2$, wherein $X_1$-$X_3$ and $X_5$ are each individually selected from the group consisting of: C, $CH_2$, and N, and wherein $X_4$ is CH, $CH_2$, or N.

In some exemplary embodiments, the compound is Compound 1

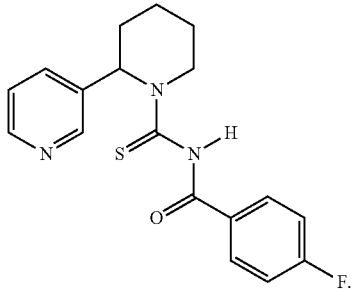
(1)

In some exemplary embodiments, $R_1$ is selected from the group consisting of: $H_2$,

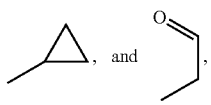

wherein $R_2$ and $R_3$ are each independently selected from the group consisting of: S, O, and NH, wherein $R_4$ is selected from the group consisting of:

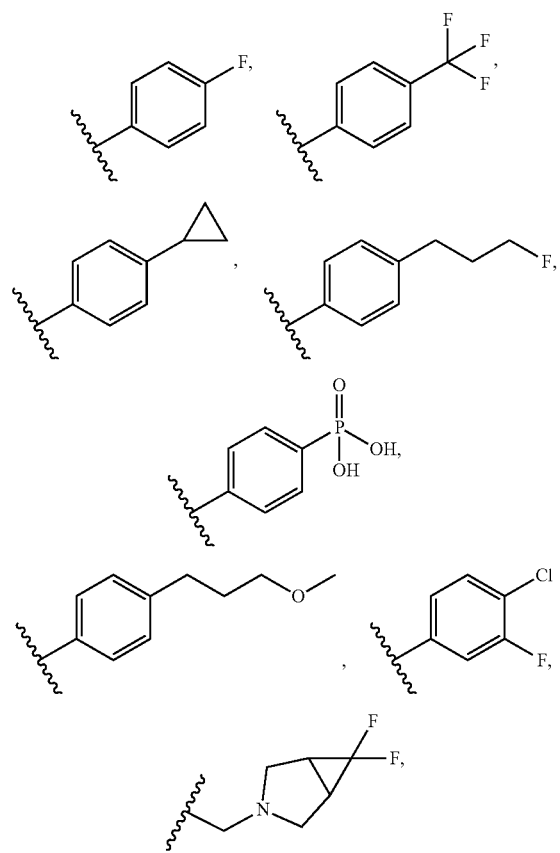

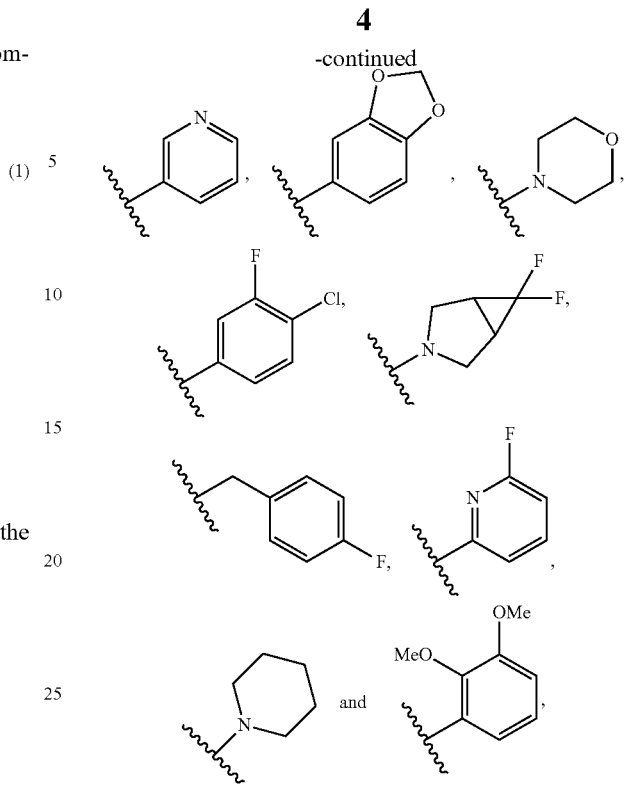

wherein $R_5$, when optionally present, is selected from the group consisting of: H, $H_2$, —CN, wherein $R_6$, when optionally present, is selected from the group consisting of: H, $H_2$,

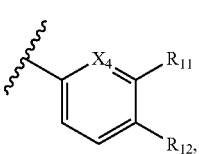

and $CH_3$, wherein $R_7$ is H or $CH_3$, wherein $R_8$, when optionally present, is H, $H_2$ or $CH_3$, wherein $R_9$ is $H_2$ or =O, wherein $R_{10}$, when optionally present, H or $H_2$, wherein $X_1$ and $X_5$ are each individually selected from the group consisting of: C, N, and O, wherein $X_2$ and $X_3$ are each individually selected from the group consisting of: C and N, and wherein $X_4$ is N or CH.

In some exemplary embodiments, $R_1$ is $H_2$, wherein $R_2$ is O or S, wherein $R_3$ is O, wherein $R_4$ is wherein $X_4$ is N or CH, wherein Ru is F, OMe, or H, and $R_{12}$ is F, $CF_3$, Cl, OMe, cyclopropyl, —$(CH_2)_3$F, (—$CH_2)_3$OMe, or PO(OH)$_2$.

In some exemplary embodiments the compound is any of compounds (2)-(41).

In some exemplary embodiments, the compound is selective for a tri-heteromeric N-methyl-D-aspartate (NMDA) receptor.

In some exemplary embodiments, the tri-heteromeric NMDA receptor is GluN1/2A/2B.

In some exemplary embodiments, the compound is a biased allosteric modulator of an N-methyl-D-aspartate (NMDA) receptor.

In some exemplary embodiments, compound is a biased allosteric modulator of a tri-heteromeric N-methyl-D-aspartate (NMDA) receptor.

In some exemplary embodiments, the tri-heteromeric NMDA receptor is GluN1/2A/2B.

In some exemplary embodiments, described herein are pharmaceutical formulations comprising: a compound as described herein or a pharmaceutically acceptable salt thereof and a pharmaceutically acceptable carrier. In some exemplary embodiments, the pharmaceutical formulation further comprises an auxiliary active agent. In some exemplary embodiments, the auxiliary active agent is a N-methyl-D-aspartate (NMDA) receptor antagonist, antagonist, or other NMDA receptor modulator.

In some exemplary embodiments, described herein are methods of treating or preventing a disease or a symptom thereof in a subject comprising: administering a compound as described herein or a pharmaceutical formulation thereof to the subject in need thereof. In some exemplary embodiments, the method can further comprise administering an auxiliary active agent to the subject in need thereof. In some exemplary embodiments, the auxiliary active agent is an NMDA receptor antagonist, agonist, or other NMDA receptor modulator.

In some exemplary embodiments the disease is an N-methyl-D-aspartate (NMDA) receptor-mediated disease. In some exemplary embodiments the disease is a neurological or a psychiatric disease. In some exemplary embodiments, the disease is a tri-heteromeric NMDA receptor-mediated disease. In some exemplary embodiments, the tri-heteromeric NMDA receptor is GluN1/2A/2B.

In some exemplary embodiments, the disease is a cancer, a thrombosis disease, an autoimmune disease, a heart disease, a kidney disease, a lung disease, or a blood vessel disease.

In some exemplary embodiments described herein is the use of a compound as in any of claims 1-10 as a medicament to treat an N-methyl-D-aspartate (NMDA) receptor-mediated disease or a symptom thereof.

In some exemplary embodiments described herein is the, use of a compound as in any of claims 1-10 in the manufacture of a medicament to treat an N-methyl-D-aspartate (NMDA) receptor-mediated disease or a symptom thereof.

In some exemplary embodiments, described herein are kits that can include an amount of a compound as described herein or a pharmaceutical formulation thereof and instructions fixed in a tangible medium of expression that provide directions for treatment or prevention of an N-methyl-D-aspartate (NMDA) receptor-mediated disease or a symptom thereof using the compound or pharmaceutical formulation thereof. In some exemplary embodiments, the kit further comprises an auxiliary active agent. In some embodiments, the auxiliary active agent is an NMDA receptor antagonist, agonist, or other NMDA receptor modulator These and other aspects, objects, features, and advantages of the example embodiments will become apparent to those having ordinary skill in the art upon consideration of the following detailed description of example embodiments.

BRIEF DESCRIPTION OF THE DRAWINGS

An understanding of the features and advantages of the present invention will be obtained by reference to the following detailed description that sets forth illustrative embodiments, in which the principles of the invention may be utilized, and the accompanying drawings of which:

FIG. 1A shows a chemical structure for a compound referred interchangeably herein as Compound 1, CNS004, and CNS4, having the Chemical Name: (4-Fluoro-N-(2-(pyridin-3-yl)piperidine-1-carbonothioyl)benzamide). FIG. 1B shows an averaged dose response curve (DRC) that can demonstrate that CNS004 has minimal activity on GluN1/2A ($EC_{50}$ not determined, n=3) and GluN1/2B ($EC_{50}$ not determined, n=4) diheteromeric receptors, but potentiates GluN1/2A/2B ($EC_{50}$: 160±15.39 μM; $R^2$, 0.99±0.004, n=5, calculated by log agonist vs response using GraphPad Prism 7) containing triheteromeric receptors. Agonist induced maximum response was normalized to 100% in the y-axis; numbers more than 100 represents the potentiation. Averaged glycine (FIG. 1C) DRC in the presence and absence of 100 μM CNS004 can demonstrate that CNS004 significantly reduced glycine potency on GluN1/2A/2B receptors [$EC_{50}$, 0.36±0.04 μM; $R^2$, 0.99±0.002 (n=4) and 1.44±0.26 μM, $R^2$, 0.96±0.064 (n=5) without and with CNS004 respectively, p<0.05, unpaired Kolmogorov-Smirnov test]. In contrast, CNS004 significantly increased glutamate (FIG. 1D) potency on GluN1/2A/2B receptors [$EC_{50}$, 7.47±1.48 μM; $R^2$, 1.00±0.002 (n=5) and 1.98±0.17 μM; $R^2$, 0.99±0.005 (n=4) without and with CNS004 respectively, p<0.05, unpaired Kolmogorov-Smirnov test]. (FIG. 1E) Traces represent agonist currents, recorded from the xenopus oocytes expressing recombinant GluN1/2A, GluN1/2B and GluN1/2A/2B TH receptors, using two electrode voltage clamp electrophysiology technique with −60 mV holding potential. Light (10 μM) and dark (100 μM) gray bars indicate CNS004 agonist application. Black, 100 μM glycine and 100 μM glutamate Scale: X=60 sec, Y=500 nA current. Note: CNS004 did not activate the receptor in the absence of agonist glutamate or glycine. Pre-application of CNS004 alone did not change the agonist induced current response.

FIGS. 3B and 3D represent changes in agonist (Ag) induced peak current amplitude without (unfilled circle) and with (filled) CNS4. * represent statistical significance (of paired student's t-test). *=p<0.05, ****=p<0.0001. 1/2A, n=5 traces; 1/2A/2B, n=8 traces, NS, not significant. These results were obtained from patch clamp electrophysiology assay using HEK293T cells expressing above mentioned recombinant NMDA receptor subtypes after transient transfection.

FIG. 8D. Histograms represent the CNS004 induced potentiation in GluN1/2A/2B in all three different applications. Dotted line indicates agonist induced maximum current (100%). * represent statistical significance (of paired student's t-test). *=p<0.05, **=p<0.01.

FIG. 9A. CNS004 dissects triheteromeric GluN1/2A/2B receptors from diheteromeric GluN1/2A containing NMDA receptors. Averaged and normalized dose response curves (DRC) show that CNS004 potentiates GluN1/2A/2B ($EC_{50}$:38.97±22.41 μM; $R^2$, 0.96±0.016, n=6) containing triheteromeric and GluN1/2B ($EC_{50}$: 8.67±2.77 μM; $R^2$, 0.98±0.009, n=9) diheteromeric receptors. It minimally inhibited GluN1/2A ($EC_{50}$: ND, n=6), GluN1/2D ($EC_{50}$: ND, n=5) and no activity on GluN1/2C ($EC_{50}$: ND, n=6) containing NMDA receptors. Agonist (10 μM glycine and 10 μM glutamate) induced maximum response is normalized to 100% in the y-axis; Numbers more than 100 at y-axis represent the potentiation. ND, not determined. FIGS. 9B-9D. are similar assays as that performed in association with FIG. 9A but performed using different agonist concentration, FIG. 9B (100 μM gly-100 μM glu), FIG. 9C (100 μM gly-300 μM glu), and FIG. 9D (100 μM gly-300 nM glu). FIGS. 9E and 9F are the same as FIGS. 9C and 9D, but without receptor 1/2D data shown. FIG. 9G can demonstrate that GluN1/2B selective antagonist, ifenprodil, exhibits an intermediate selectivity for GluN1/2A/2B receptor. FIG. 9H Representative CNS004 (1-300 μM) dose-response curves for GluN1/2A, GluN1/2B and GluN1/2A/2B NMDA receptors in 100 μM glutamate and 100 μM glycine concentrations. FIG. 9I. A representative 1-300 μM CNS004 dose-response curve for GluN1/2A/2B NMDA receptors in 10 μM glutamate and 10 μM glycine concentrations.

FIG. 13D shows traces from a similar assay as described in relation to FIGS. 13A-13C with increasing (0, 1, 10, 100 nM, and 100 μM glycine and constant glycine (100 μM) concentration.

FIGS. 15E-15H represent similar dose-response curves in the presence and absence of 100 μM CNS004. Histograms represent average $EC_{50}$ and statistical significance (of unpaired student's t-test). *=p<0.05, *=p<0.01***=p<0.001.

Figure 1A:
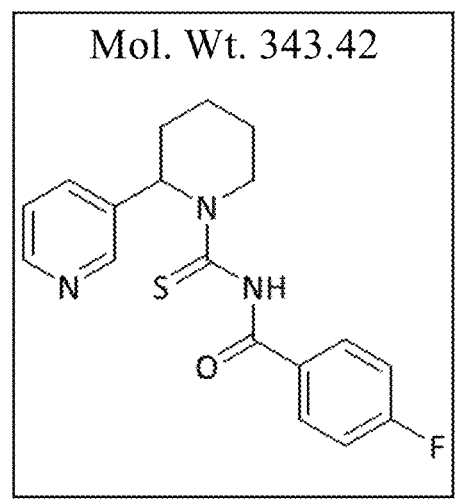
FIGS. 1A-1E can demonstrate that CNS004 selectively potentiates GluN1/2A/2B containing triheteromeric (TH) NMDA receptors.

The figures herein are for illustrative purposes only and are not necessarily drawn to scale.

DETAILED DESCRIPTION OF THE EXAMPLE EMBODIMENTS

Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

All publications and patents cited in this specification are cited to disclose and describe the methods and/or materials in connection with which the publications are cited. All such publications and patents are herein incorporated by reference as if each individual publication or patent were specifically and individually indicated to be incorporated by reference. Such incorporation by reference is expressly limited to the methods and/or materials described in the cited publications and patents and does not extend to any lexicographical definitions from the cited publications and patents. Any lexicographical definition in the publications and patents cited that is not also expressly repeated in the instant application should not be treated as such and should not be read as defining any terms appearing in the accompanying claims. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Where a range is expressed, a further aspect includes from the one particular value and/or to the other particular value. Where a range of values is provided, it is understood that each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure. For example, where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In addition, the phrase "about 'x' to 'y'", where 'x' and 'y' are numerical values, includes "about 'x' to about 'y'".

It should be noted that ratios, concentrations, amounts, and other numerical data can be expressed herein in a range format. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. Ranges can be expressed herein as from "about" one particular value, and/or to "about" another particular value. Similarly, when values are expressed as approximations, by use of the antecedent "about," it will be understood that the particular value forms a further aspect. For example, if the value "about 10" is disclosed, then "10" is also disclosed.

It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to 5%" should be interpreted to include not only the explicitly recited values of about 0.1% to about 5%, but also include individual values (e.g., about 1%, about 2%, about 3%, and about 4%) and the sub-ranges (e.g., about 0.5% to about 1.1%; about 5% to about 2.4%; about 0.5% to about 3.2%, and about 0.5% to about 4.4%, and other possible sub-ranges) within the indicated range.

Embodiments of the present disclosure will employ, unless otherwise indicated, techniques of chemistry, pharmacology, organic chemistry, biochemistry, physiology, neurobiology, and the like, which are within the skill of the art. Such techniques are explained fully in the literature.

Before the embodiments of the present disclosure are described in detail, it is to be understood that, unless otherwise indicated, the present disclosure is not limited to particular materials, reagents, reaction materials, manufacturing processes, or the like, as such can vary. It is also to be understood that the terminology used herein is for purposes of describing particular embodiments only, and is not intended to be limiting. It is also possible in the present disclosure that steps can be executed in different sequence where this is logically possible unless the context clearly dictates otherwise.

General Definitions

Unless defined otherwise, technical and scientific terms used herein have the same meaning as commonly understood by one of ordinary skill in the art to which this disclosure pertains. Definitions of common terms and techniques in molecular biology may be found in Molecular Cloning: A Laboratory Manual, $2^{nd}$ edition (1989) (Sambrook, Fritsch, and Maniatis); Molecular Cloning: A Laboratory Manual, $4^{th}$ edition (2012) (Green and Sambrook); Current Protocols in Molecular Biology (1987) (F. M. Ausubel et al. eds.); the series Methods in Enzymology (Academic Press, Inc.): PCR 2: A Practical Approach (1995) (M. J. MacPherson, B. D. Hames, and G. R. Taylor eds.): Antibodies, A Laboratory Manual (1988) (Harlow and Lane, eds.): Antibodies A Laboratory Manual, $2^{nd}$ edition 2013 (E. A. Greenfield ed.); Animal Cell Culture (1987) (R. I. Freshney, ed.); Benjamin Lewin, Genes IX, published by Jones and Bartlet, 2008 (ISBN 0763752223); Kendrew et al. (eds.), The Encyclopedia of Molecular Biology, published by Blackwell Science Ltd., 1994 (ISBN 0632021829); Robert A. Meyers (ed.), Molecular Biology and Biotechnology: a Comprehensive Desk Reference, published by VCH Publishers, Inc., 1995 (ISBN 9780471185710); Singleton et al., Dictionary of Microbiology and Molecular Biology 2nd ed., J. Wiley & Sons (New York, N.Y. 1994), March, Advanced Organic Chemistry Reactions, Mechanisms and Structure 4th ed., John Wiley & Sons (New York, N.Y. 1992); and Marten H. Hofker and Jan van Deursen, Transgenic Mouse Methods and Protocols, $2^{nd}$ edition (2011).

As used herein, the singular forms "a", "an", and "the" include both singular and plural referents unless the context clearly dictates otherwise.

As used herein, "about," "approximately," "substantially," and the like, when used in connection with a measurable variable such as a parameter, an amount, a temporal duration, and the like, are meant to encompass variations of and from the specified value including those within experimental error (which can be determined by e.g. given data set, art accepted standard, and/or with e.g. a given confidence interval (e.g. 90%, 95%, or more confidence interval from the mean), such as variations of +/−10% or less, +/−5% or less, +/−1% or less, and +/−0.1% or less of and from the specified value, insofar such variations are appropriate to perform in the disclosed invention. As used herein, the terms "about," "approximate," "at or about," and "substantially" can mean that the amount or value in question can be the exact value or a value that provides equivalent results or effects as recited in the claims or taught herein. That is, it is understood that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art such that equivalent results or effects are obtained. In some circumstances, the value that provides equivalent results or effects cannot be reasonably determined. In general, an amount, size, formulation, parameter or other quantity or characteristic is "about," "approximate," or "at or about" whether or not expressly stated to be such. It is understood that where "about," "approximate," or "at or about" is used before a quantitative value, the parameter also includes the specific quantitative value itself, unless specifically stated otherwise.

The term "optional" or "optionally" means that the subsequent described event, circumstance or substituent may or may not occur, and that the description includes instances where the event or circumstance occurs and instances where it does not.

The recitation of numerical ranges by endpoints includes all numbers and fractions subsumed within the respective ranges, as well as the recited endpoints.

As used herein, a "biological sample" may contain whole cells and/or live cells and/or cell debris. The biological sample may contain (or be derived from) a "bodily fluid". The present invention encompasses embodiments wherein the bodily fluid is selected from amniotic fluid, aqueous humour, vitreous humour, bile, blood serum, breast milk, cerebrospinal fluid, cerumen (earwax), chyle, chyme, endolymph, perilymph, exudates, feces, female ejaculate, gastric acid, gastric juice, lymph, mucus (including nasal drainage and phlegm), pericardial fluid, peritoneal fluid, pleural fluid, pus, rheum, saliva, sebum (skin oil), semen, sputum, synovial fluid, sweat, tears, urine, vaginal secretion, vomit and mixtures of one or more thereof. Biological samples include cell cultures, bodily fluids, cell cultures from bodily fluids. Bodily fluids may be obtained from a mammal organism, for example by puncture, or other collecting or sampling procedures.

The terms "subject," "individual," and "patient" are used interchangeably herein to refer to a vertebrate, preferably a mammal, more preferably a human. Mammals include, but are not limited to, murines, simians, humans, farm animals, sport animals, and pets. Tissues, cells and their progeny of a biological entity obtained in vivo or cultured in vitro are also encompassed.

As used herein, "active agent" or "active ingredient" refers to a substance, compound, or molecule, which is biologically active or otherwise, induces a biological or physiological effect on a subject to which it is administered to. In other words, "active agent" or "active ingredient" refers to a component or components of a composition to which the whole or part of the effect of the composition is attributed.

As used herein, "administering" refers to an administration that is oral, topical, intravenous, subcutaneous, transcutaneous, transdermal, intramuscular, intra joint, parenteral, intra-arteriole, intradermal, intraventricular, intraosseous, intraocular, intracranial, intraperitoneal, intralesional, intranasal, intracardiac, intraarticular, intracavernous, intrathecal, intravireal, intracerebral, and intracerebroventricular, intratympanic, intracochlear, rectal, vaginal, by inhalation, by catheters, stents or via an implanted reservoir or other device that administers, either actively or passively (e.g. by diffusion) a composition the perivascular space and adventitia. For example, a medical device such as a stent can contain a composition or formulation disposed on its surface, which can then dissolve or be otherwise distributed to the surrounding tissue and cells. The term "parenteral" can include subcutaneous, intravenous, intramuscular, intra-articular, intra-synovial, intrasternal, intrathecal, intrahepatic, intralesional, and intracranial injections or infusion techniques. Suitable administration routes include, for instance auricular (otic), buccal, conjunctival, cutaneous, dental, electro-osmosis, endocervical, endosinusial, endotracheal, enteral, epidural, extra-amniotic, extracorporeal, hemodialysis, infiltration, interstitial, intra-abdominal, intra-amniotic, intra-arterial, intra-articular, intrabiliary, intrabronchial, intrabursal, intracardiac, intracartilaginous, intracaudal, intracavernous, intracavitary, intracerebral, intracisternal, intracorneal, intracoronal (dental), intracoronary, intracorporus cavernosum, intradermal, intradiscal, intraductal, intraduodenal, intradural, intraepidermal, intraesophageal, intragastric, intragingival, intraileal, intralesional, intraluminal, intralymphatic, intramedullary, intrameningeal, intramuscular, intraocular, intraovarian, intrapericardial, intraperitoneal, intrapleural, intraprostatic, intrapulmonary, intrasinal, intraspinal, intrasynovial, intratendinous, intratesticular, intrathecal, intrathoracic, intratubular, intratumor, intratym panic, intrauterine, intravascular, intravenous, intravenous bolus, intravenous drip, intraventricular, intravesical, intravitreal, iontophoresis, irrigation, laryngeal, nasal, nasogastric, occlusive dressing technique, ophthalmic, oral, oropharyngeal, other, parenteral, percutaneous, periarticular, peridural, perineural, periodontal, rectal, respiratory (inhalation), retrobulbar, soft tissue, subarachnoid, subconjunctival, subcutaneous, sublingual, submucosal, topical, transdermal, transmucosal, transplacental, transtracheal, transtympanic, ureteral, urethral, and/or vaginal administration, and/or any combination of the above administration routes, which typically depends on the disease to be treated.

As used herein, "agent" refers to any substance, compound, molecule, and the like, which can be biologically active or otherwise can induce a biological and/or physiological effect on a subject to which it is administered to. An agent can be a primary active agent, or in other words, the component(s) of a composition to which the whole or part of the effect of the composition is attributed. An agent can be a secondary agent (or auxiliary agent), or in other words, the component(s) of a composition to which an additional part and/or other effect of the composition is attributed.

As used herein, "alkyl," refers to the radical of saturated aliphatic groups, including straight-chain alkyl, alkenyl, or alkynyl groups, branched-chain alkyl, cycloalkyl (alicyclic), alkyl substituted cycloalkyl groups, and cycloalkyl substituted alkyl. In preferred embodiments, a straight chain or branched chain alkyl has 30 or fewer carbon atoms in its backbone (e.g., $C_1$-$C_{30}$ for straight chains, $C_3$-$C_{30}$ for branched chains), preferably 20 or fewer, more preferably 15 or fewer, most preferably 10 or fewer. Likewise, preferred cycloalkyls have from 3-10 carbon atoms in their ring structure, and more preferably have 5, 6 or 7 carbons in the ring structure. The term "alkyl" (or "lower alkyl") as used throughout the specification, examples, and claims is intended to include both "unsubstituted alkyls" and "substituted alkyls," the latter of which refers to alkyl moieties having one or more substituents replacing a hydrogen on one or more carbons of the hydrocarbon backbone. Such substituents include, but are not limited to, halogen, hydroxyl, carbonyl (such as a carboxyl, alkoxycarbonyl, formyl, or an acyl), thiocarbonyl (such as a thioester, a thioacetate, or a thioformate), alkoxyl, phosphoryl, phosphate, phosphonate, a hosphinate, amino, amido, amidine, imine, cyano, nitro, azido, sulfhydryl, alkylthio, sulfate, sulfonate, sulfamoyl, sulfonamido, sulfonyl, heterocyclyl, aralkyl, or an aromatic or heteroaromatic moiety.

Unless the number of carbons is otherwise specified, "lower alkyl" as used herein means an alkyl group, as defined above, but having from one to ten carbons, more preferably from one to six carbon atoms in its backbone structure. Likewise, "lower alkenyl" and "lower alkynyl" have similar chain lengths. Throughout the application, preferred alkyl groups are lower alkyls. In preferred embodiments, a substituent designated herein as alkyl is a lower alkyl.

"Alkyl" includes one or more substitutions at one or more carbon atoms of the hydrocarbon radical as well as heteroalkyls. Suitable substituents include, but are not limited to, halogens, such as fluorine, chlorine, bromine, or iodine; hydroxyl; —NRR', wherein R and R' are independently hydrogen, alkyl, or aryl, and wherein the nitrogen atom is optionally quaternized; —SR, wherein R is hydrogen, alkyl, or aryl; —CN; —$NO_2$; —COOH; carboxylate; —COR, —COOR, or —CON(R)$_2$, wherein R is hydrogen, alkyl, or aryl; azide, aralkyl, alkoxyl, imino, phosphonate, phosphinate, silyl, ether, sulfonyl, sulfonamido, heterocyclyl, aromatic or heteroaromatic moieties, haloalkyl (such as —$CF_3$, —$CH_2$—$CF_3$, —$CCl_3$); —CN; —NCOCOCH$_2$CH$_2$, —NCOCOCHCH; —NCS; and combinations thereof.

It will be understood by those skilled in the art that the moieties substituted on the hydrocarbon chain can themselves be substituted, if appropriate. For instance, the substituents of a substituted alkyl may include halogen, hydroxy, nitro, thiols, amino, azido, imino, amido, phosphoryl (including phosphonate and phosphinate), sulfonyl (including sulfate, sulfonamido, sulfamoyl and sulfonate), and silyl groups, as well as ethers, alkylthios, carbonyls (including ketones, aldehydes, carboxylates, and esters), haloalkyls, —CN and the like. Cycloalkyls can be substituted in the same manner.

As used herein, "alkenyl" and "alkynyl" refer to unsaturated aliphatic groups analogous in length and possible substitution to the alkyls described above, but that contain at least one double or triple bond, respectively. The term "substituted alkenyl" refers to alkenyl moieties having one or more substituents replacing one or more hydrogen atoms on one or more carbons of the hydrocarbon backbone. Such substituents include, but are not limited to, halogen, azide, alkyl, aralkyl, alkenyl, alkynyl, cycloalkyl, hydroxyl, carbonyl (such as a carboxyl, alkoxycarbonyl, formyl, or an acyl), silyl, ether, ester, thiocarbonyl (such as a thioester, a thioacetate, or a thioformate), alkoxyl, phosphoryl, phosphate, phosphonate, phosphinate, amino (or quarternized amino), amido, amidine, imine, cyano, nitro, azido, sulfhydryl, alkylthio, sulfate, sulfonate, sulfamoyl, sulfonamido, sulfonyl, heterocyclyl, alkylaryl, haloalkyl, —CN, aryl, heteroaryl, and combinations thereof. The term "substituted alkynyl" refers to alkynyl moieties having one or more substituents replacing one or more hydrogen atoms on one or more carbons of the hydrocarbon backbone. Such substituents include, but are not limited to, halogen, azide, alkyl, aralkyl, alkenyl, alkynyl, cycloalkyl, hydroxyl, carbonyl (such as a carboxyl, alkoxycarbonyl, formyl, or an acyl), silyl, ether, ester, thiocarbonyl (such as a thioester, a thioacetate, or a thioformate), alkoxyl, phosphoryl, phosphate, phosphonate, phosphinate, amino (or quarternized amino), amido, amidine, imine, cyano, nitro, azido, sulfhydryl, alkylthio, sulfate, sulfonate, sulfamoyl, sulfonamido, sulfonyl, heterocyclyl, alkylaryl, haloalkyl, —CN, aryl, heteroaryl, and combinations thereof.

As used herein, "alkoxyl" or "alkoxy," "aroxy" or "aryloxy," generally describe compounds represented by the formula —OR$^v$, wherein R$^v$ includes, but is not limited to, substituted or unsubstituted alkyl, alkenyl, alkynyl, cycloalkyl, heterocyclyl, cycloalkenyl, heterocycloalkenyl, aryl, heteroaryl, arylalkyl, heteroalkyls, alkylaryl, alkylheteroaryl. The terms "alkoxyl" or "alkoxy" as used herein refer to an alkyl group, as defined above, having an oxygen radical attached thereto. Representative alkoxyl groups include methoxy, ethoxy, propyloxy, tert-butoxy and the like. An "ether" is two hydrocarbons covalently linked by an oxygen. Accordingly, the substituent of an alkyl that renders that alkyl an ether is or resembles an alkoxyl, such as can be represented by one of —O-alkyl, —O-alkenyl, and —O-alkynyl. The term alkoxy also includes cycloalkyl, heterocyclyl, cycloalkenyl, heterocycloalkenyl, and arylalkyl having an oxygen radical attached to at least one of the carbon atoms, as valency permits.

The term "substituted alkoxy" refers to an alkoxy group having one or more substituents replacing one or more hydrogen atoms on one or more carbons of the alkoxy backbone. Such substituents include, but are not limited to, halogen, azide, alkyl, aralkyl, alkenyl, alkynyl, cycloalkyl, hydroxyl, carbonyl (such as a carboxyl, alkoxycarbonyl, formyl, or an acyl), silyl, ether, ester, thiocarbonyl (such as a thioester, a thioacetate, or a thioformate), alkoxyl, phosphoryl, phosphate, phosphonate, phosphinate, amino (or quarternized amino), amido, amidine, imine, cyano, nitro, azido, sulfhydryl, alkylthio, sulfate, sulfonate, sulfamoyl, sulfonamido, sulfonyl, heterocyclyl, alkylaryl, haloalkyl, —CN, aryl, heteroaryl, and combinations thereof.

The term "alkylthio" refers to an alkyl group, as defined above, having a sulfur radical attached thereto. The "alkylthio" moiety is represented by —S-alkyl. Representative alkylthio groups include methylthio, ethylthio, and the like. The term "alkylthio" also encompasses cycloalkyl groups having a sulfur radical attached thereto. The term "substituted alkylthio" refers to an alkylthio group having one or more substituents replacing one or more hydrogen atoms on one or more carbon atoms of the alkylthio backbone. Such substituents include, but are not limited to, halogen, azide, alkyl, aralkyl, alkenyl, alkynyl, cycloalkyl, hydroxyl, carbonyl (such as a carboxyl, alkoxycarbonyl, formyl, or an acyl), silyl, ether, ester, thiocarbonyl (such as a thioester, a thioacetate, or a thioformate), alkoxyl, phosphoryl, phosphate, phosphonate, phosphinate, amino (or quarternized amino), amido, amidine, imine, cyano, nitro, azido, sulfhydryl, alkylthio, sulfate, sulfonate, sulfamoyl, sulfonamido, sulfonyl, heterocyclyl, alkylaryl, haloalkyl, —CN, aryl, heteroaryl, and combinations thereof.

As used herein, "amino" and "amine," are art-recognized and refer to both substituted and unsubstituted amines, e.g., a moiety that can be represented by the general formula:

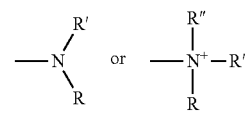

wherein, R, R', and R" each independently represent a hydrogen, substituted or unsubstituted alkyl, substituted or unsubstituted alkenyl, substituted or unsubstituted alkynyl, substituted or unsubstituted carbonyl, —(CH$_2$)$_m$—R''', or R and R' taken together with the N atom to which they are attached complete a heterocycle having from 3 to 14 atoms in the ring structure; R''' represents a hydroxy group, substituted or unsubstituted carbonyl group, an aryl, a cycloalkyl ring, a cycloalkenyl ring, a heterocycle, or a polycycle; and m is zero or an integer ranging from 1 to 8. In preferred embodiments, only one of R and R' can be a carbonyl, e.g., R and R' together with the nitrogen do not form an imide. In preferred embodiments, R and R' (and optionally R") each independently represent a hydrogen atom, substituted or unsubstituted alkyl, a substituted or unsubstituted alkenyl, or —(CH$_2$)$_m$—R'''. Thus, the term 'alkylamine' as used herein refers to an amine group, as defined above, having a substituted or unsubstituted alkyl attached thereto (i.e. at least one of R, R', or R" is an alkyl group).

As used herein, "arylalkyl," refers to an alkyl group that is substituted with a substituted or unsubstituted aryl or heteroaryl group.

As used herein, "alkylaryl," as used herein, refers to an aryl group (e.g., an aromatic or hetero aromatic group), substituted with a substituted or unsubstituted alkyl group.

As used interchangeably herein, the terms "amide" or "amido" refer to both "unsubstituted amido" and "substituted amido" and are represented by the general formula:

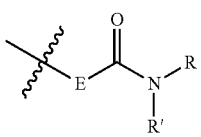

wherein, E is absent, or E is substituted or unsubstituted alkyl, substituted or unsubstituted alkenyl, substituted or unsubstituted alkynyl, substituted or unsubstituted aralkyl, substituted or unsubstituted cycloalkyl, substituted or unsubstituted aryl, substituted or unsubstituted heteroaryl, substituted or unsubstituted heterocyclyl, wherein independently of E, R and R' each independently represent a hydrogen, substituted or unsubstituted alkyl, substituted or unsubstituted alkenyl, substituted or unsubstituted alkynyl, substituted or unsubstituted carbonyl, substituted or unsubstituted cycloalkyl, substituted or unsubstituted heterocyclyl, substituted or unsubstituted alkylaryl, substituted or unsubstituted arylalkyl, substituted or unsubstituted aryl, or substituted or unsubstituted heteroaryl, —(CH$_2$)$_m$—R''', or R and R' taken together with the N atom to which they are attached complete a heterocycle having from 3 to 14 atoms in the ring structure; R''' represents a hydroxy group, substituted or unsubstituted carbonyl group, an aryl, a cycloalkyl ring, a cycloalkenyl ring, a heterocycle, or a polycycle; and m is zero or an integer ranging from 1 to 8. In preferred embodiments, only one of R and R' can be a carbonyl, e.g., R and R' together with the nitrogen do not form an imide. In preferred embodiments, R and R' each independently represent a hydrogen atom, substituted or unsubstituted alkyl, a substituted or unsubstituted alkenyl, or —(CH$_2$)$_m$—R'''. When E is oxygen, a carbamate is formed. The carbamate cannot be attached to another chemical species, such as to form an oxygen-oxygen bond, or other unstable bonds, as understood by one of ordinary skill in the art.

As used herein, "arylthio" refers to —S-aryl or —S-heteroaryl groups, wherein aryl and heteroaryl are as defined herein. The term "substituted arylthio" represents —S-aryl or —S-heteroaryl, having one or more substituents replacing a hydrogen atom on one or more ring atoms of the aryl and heteroaryl rings as defined herein. Such substituents include, but are not limited to, halogen, azide, alkyl, aralkyl, alkenyl, alkynyl, cycloalkyl, hydroxyl, carbonyl (such as a carboxyl, alkoxycarbonyl, formyl, or an acyl), silyl, ether, ester, thiocarbonyl (such as a thioester, a thioacetate, or a thioformate), alkoxyl, phosphoryl, phosphate, phosphonate, phosphinate, amino (or quarternized amino), amido, amidine, imine, cyano, nitro, azido, sulfhydryl, alkylthio, sulfate, sulfonate, sulfamoyl, sulfonamido, sulfonyl, heterocyclyl, alkylaryl, haloalkyl, —CN, aryl, heteroaryl, and combinations thereof.

The terms "aroxy" and "aryloxy," as used interchangeably herein, are represented by —O-aryl or —O-heteroaryl, wherein aryl and heteroaryl are as defined herein. The terms "substituted aroxy" and "substituted aryloxy," as used interchangeably herein, represent —O-aryl or —O-heteroaryl, having one or more sub stituents replacing one or more hydrogen atoms on one or more ring atoms of the aryl and heteroaryl, as defined herein. Such substituents include, but are not limited to, halogen, azide, alkyl, aralkyl, alkenyl, alkynyl, cycloalkyl, hydroxyl, carbonyl (such as a carboxyl, alkoxycarbonyl, formyl, or an acyl), silyl, ether, ester, thiocarbonyl (such as a thioester, a thioacetate, or a thioformate), alkoxyl, phosphoryl, phosphate, phosphonate, phosphinate, amino (or quarternized amino), amido, amidine, imine, cyano, nitro, azido, sulfhydryl, alkylthio, sulfate, sulfonate, sulfamoyl, sulfonamido, sulfonyl, heterocyclyl, alkylaryl, haloalkyl, —CN, aryl, heteroaryl, and combinations thereof.

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s). Reference throughout this specification to "one embodiment", "an embodiment," "an example embodiment," means that a particular feature, structure or characteristic described in connection with the embodiment is included in at least one embodiment of the present invention. Thus, appearances of the phrases "in one embodiment," "in an embodiment," or "an example embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention. For example, in the appended claims, any of the claimed embodiments can be used in any combination.

As used herein, "aryl" refers to $C_5$-$C_{26}$-membered aromatic, fused aromatic, fused heterocyclic, or biaromatic ring systems. Broadly defined, "aryl," as used herein, includes 5-, 6-, 7-, 8-, 9-, 10-, 14-, 18-, and 24-membered single-ring aromatic groups, for example, benzene, naphthalene, anthracene, phenanthrene, chrysene, pyrene, corannulene, coronene, etc. "Aryl" further encompasses polycyclic ring systems having two or more cyclic rings in which two or more carbons are common to two adjoining rings (i.e., "fused rings") wherein at least one of the rings is aromatic, e.g., the other cyclic ring or rings can be cycloalkyls, cycloalkenyls, cycloalkynyls, aryls and/or heterocycles. The term "substituted aryl" refers to an aryl group, wherein one or more hydrogen atoms on one or more aromatic rings are substituted with one or more substituents including, but not limited to, halogen, azide, alkyl, aralkyl, alkenyl, alkynyl, cycloalkyl, hydroxyl, alkoxy, carbonyl (such as a ketone, aldehyde, carboxyl, alkoxycarbonyl, formyl, or an acyl), silyl, ether, ester, thiocarbonyl (such as a thioester, a thioacetate, or a thioformate), alkoxyl, phosphoryl, phosphate, phosphonate, phosphinate, amino (or quarternized amino), amido, amidine, imine, cyano, nitro, azido, sulfhydryl, imino, alkylthio, sulfate, sulfonate, sulfamoyl, sulfonamido, sulfonyl, heterocyclyl, alkylaryl, haloalkyl (such as $CF_3$, —$CH_2$—$CF_3$, —$CCl_3$), —CN, aryl, heteroaryl, and combinations thereof.

The term "biocompatible", as used herein, refers to a substance or object that performs its desired function when introduced into an organism without inducing significant inflammatory response, immunogenicity, or cytotoxicity to native cells, tissues, or organs, or to cells, tissues, or organs introduced with the substance or object. For example, a biocompatible product is a product that performs its desired function when introduced into an organism without inducing significant inflammatory response, immunogenicity, or cytotoxicity to native cells, tissues, or organs.

Biocompatibility, as used herein, can be quantified using the following in vivo biocompatibility assay. A material or product is considered biocompatible if it produces, in a test of biocompatibility related to immune system reaction, less than 50%, 45%, 40%, 35%, 30%, 25%, 20%, 15%, 10%, 8%, 6%, 5%, 4%, 3%, 2%, or 1% of the reaction, in the same test of biocompatibility, produced by a material or product the same as the test material or product except for a lack of the surface modification on the test material or product. Examples of useful biocompatibility tests include measuring and assessing cytotoxicity in cell culture, inflammatory response after implantation (such as by fluorescence detection of cathepsin activity), and immune system cells recruited to implant (for example, macrophages and neutrophils).

The term "biodegradable" as used herein, generally refers to a material that will degrade or erode under physiologic conditions to smaller units or chemical species that are capable of being metabolized, eliminated, or excreted by the subject. The degradation time is a function of composition and morphology. Degradation times can be from hours to weeks.

As used herein "cancer" can refer to one or more types of cancer including, but not limited to, acute lymphoblastic leukemia, acute myeloid leukemia, adrenocortical carcinoma, Kaposi Sarcoma, AIDS-related lymphoma, primary central nervous system (CNS) lymphoma, anal cancer, appendix cancer, astrocytomas, atypical teratoid/Rhabdoid tumors, basa cell carcinoma of the skin, bile duct cancer, bladder cancer, bone cancer (including but not limited to Ewing Sarcoma, osteosarcomas, and malignant fibrous histiocytoma), brain tumors, breast cancer, bronchial tumors, Burkitt lymphoma, carcinoid tumor, cardiac tumors, germ cell tumors, embryonal tumors, cervical cancer, cholangiocarcinoma, chordoma, chronic lymphocytic leukemia, chronic myelogenous leukemia, chronic myeloproliferative neoplasms, colorectal cancer, craniopharyngioma, cutaneous T-Cell lymphoma, ductal carcinoma in situ, endometrial cancer, ependymoma, esophageal cancer, esthesioneuroblastoma, extracranial germ cell tumor, extragonadal germ cell tumor, eye cancer (including, but not limited to, intraocular melanoma and retinoblastoma), fallopian tube cancer, gallbladder cancer, gastric cancer, gastrointestinal carcinoid tumor, gastrointestinal stromal tumors, central nervous system germ cell tumors, extracranial germ cell tumors, extragonadal germ cell tumors, ovarian germ cell tumors, testicular cancer, gestational trophoblastic disease, Hairy cell leukemia, head and neck cancers, hepatocellular (liver) cancer, Langerhans cell histiocytosis, Hodgkin lymphoma, hypopharyngeal cancer, islet cell tumors, pancreatic neuroendocrine tumors, kidney (renal cell) cancer, laryngeal cancer, leukemia, lip cancer, oral cancer, lung cancer (non-small cell and small cell), lymphoma, melanoma, Merkel cell carcinoma, mesothelioma, metastatic squamous cell neck cancer, midline tract carcinoma with and without NUT gene changes, multiple endocrine neoplasia syndromes, multiple myeloma, plasma cell neoplasms, mycosis fungoides, myelody spastic syndromes, myelodysplastic/myeloproliferative neoplasms, chronic myelogenous leukemia, nasal cancer, sinus cancer, non-Hodgkin lymphoma, pancreatic cancer, paraganglioma, paranasal sinus cancer, parathyroid cancer, penile cancer, pharyngeal cancer, pheochromocytoma, pituitary cancer, peritoneal cancer, prostate cancer, rectal cancer, Rhabdomyosarcoma, salivary gland cancer, uterine sarcoma, Sézary syndrome, skin cancer, small intestine cancer, large intestine cancer (colon cancer), soft tissue sarcoma, T-cell lymphoma, throat cancer, oropharyngeal cancer, nasopharyngeal cancer, hypopharyngeal cancer, thymoma, thymic carcinoma, thyroid cancer, transitional cell cancer of the renal pelvis and ureter, urethral cancer, uterine cancer, vaginal cancer, cervical cancer, vascular tumors and cancer, vulvar cancer, and Wilms Tumor.

As used herein, "carbonyl," is art-recognized and includes such moieties as can be represented by the general formula:

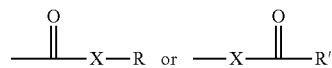

wherein X is a bond, or represents an oxygen or a sulfur, and R represents a hydrogen, a substituted or unsubstituted alkyl, substituted or unsubstituted alkenyl, substituted or unsubstituted alkynyl, substituted or unsubstituted cycloalkyl, substituted or unsubstituted heterocyclyl, substituted or unsubstituted alkylaryl, substituted or unsubstituted arylalkyl, substituted or unsubstituted aryl, or substituted or unsubstituted heteroaryl, —$(CH_2)_m$—R'', or a pharmaceutical acceptable salt, R' represents a hydrogen, substituted or unsubstituted alkyl, substituted or unsubstituted alkenyl, substituted or unsubstituted alkynyl, substituted or unsubstituted cycloalkyl, substituted or unsubstituted heterocyclyl, substituted or unsubstituted alkylaryl, substituted or unsubstituted arylalkyl, substituted or unsubstituted aryl, or substituted or unsubstituted heteroaryl or —$(CH_2)_m$—R''; R'' represents a hydroxy group, substituted or unsubstituted carbonyl group, an aryl, a cycloalkyl ring, a cycloalkenyl ring, a heterocycle, or a polycycle; and m is zero or an integer ranging from 1 to 8. Where X is oxygen and R is defines as above, the moiety is also referred to as a carboxyl group. When X is oxygen and R is hydrogen, the formula represents a 'carboxylic acid'. Where X is oxygen and R' is hydrogen, the formula represents a 'formate'. Where X is oxygen and R or R' is not hydrogen, the formula represents an "ester". In general, where the oxygen atom of the above formula is replaced by a sulfur atom, the formula represents a 'thiocarbonyl' group. Where X is sulfur and R or R' is not hydrogen, the formula represents a 'thioester.' Where X is sulfur and R is hydrogen, the formula represents a 'thiocarboxylic acid.' Where X is sulfur and R' is hydrogen, the formula represents a 'thioformate.' Where X is a bond and R is not hydrogen, the above formula represents a 'ketone.' Where X is a bond and R is hydrogen, the above formula represents an 'aldehyde.'

The term "substituted carbonyl" refers to a carbonyl, as defined above, wherein one or more hydrogen atoms in R, R' or a group to which the moiety

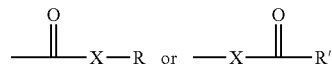

is attached, are independently substituted. Such substituents include, but are not limited to, halogen, azide, alkyl, aralkyl, alkenyl, alkynyl, cycloalkyl, hydroxyl, carbonyl (such as a carboxyl, alkoxycarbonyl, formyl, or an acyl), silyl, ether, ester, thiocarbonyl (such as a thioester, a thioacetate, or a thioformate), alkoxyl, phosphoryl, phosphate, phosphonate, phosphinate, amino (or quarternized amino), amido, amidine, imine, cyano, nitro, azido, sulfhydryl, alkylthio, sulfate, sulfonate, sulfamoyl, sulfonamido, sulfonyl, heterocyclyl, alkylaryl, haloalkyl, —CN, aryl, heteroaryl, and combinations thereof.

The term "carboxyl" is as defined above for the formula

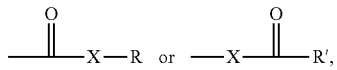

and is defined more specifically by the formula —R$^{iv}$COOH, wherein R$^{iv}$ is an alkyl, alkenyl, alkynyl, cycloalkyl, heterocyclyl, alkylaryl, arylalkyl, aryl, or heteroaryl. In preferred embodiments, a straight chain or branched chain alkyl, alkenyl, and alkynyl have 30 or fewer carbon atoms in its backbone (e.g., $C_1$-$C_{30}$ for straight chain alkyl, $C_3$-$C_{30}$ for branched chain alkyl, $C_2$-$C_{30}$ for straight chain alkenyl and alkynyl, $C_3$-$C_{30}$ for branched chain alkenyl and alkynyl), preferably 20 or fewer, more preferably 15 or fewer, most preferably 10 or fewer. Likewise, preferred cycloalkyls, heterocyclyls, aryls and heteroaryls have from 3-10 carbon atoms in their ring structure, and more preferably have 5, 6 or 7 carbons in the ring structure. The term "substituted carboxyl" refers to a carboxyl, as defined above, wherein one or more hydrogen atoms in R are substituted. Such substituents include, but are not limited to, halogen, azide, alkyl, aralkyl, alkenyl, alkynyl, cycloalkyl, hydroxyl, carbonyl (such as a carboxyl, alkoxycarbonyl, formyl, or an acyl), silyl, ether, ester, thiocarbonyl (such as a thioester, a thioacetate, or a thioformate), alkoxyl, phosphoryl, phosphate, phosphonate, phosphinate, amino (or quarternized amino), amido, amidine, imine, cyano, nitro, azido, sulfhydryl, alkylthio, sulfate, sulfonate, sulfamoyl, sulfonamido, sulfonyl, heterocyclyl, alkylaryl, haloalkyl, —CN, aryl, heteroaryl, and combinations thereof.

As used herein with reference to the relationship between DNA, cDNA, cRNA, RNA, protein/peptides, and the like "corresponding to" or "encoding" (used interchangeably herein) refers to the underlying biological relationship between these different molecules. As such, one of skill in the art would understand that operatively "corresponding to" can direct them to determine the possible underlying and/or resulting sequences of other molecules given the sequence of any other molecule which has a similar biological relationship with these molecules. For example, from a DNA sequence an RNA sequence can be determined and from an RNA sequence a cDNA sequence can be determined.

As used herein, "derivative" can refer to any compound having the same or a similar core structure to the compound but having at least one structural difference, including substituting, deleting, and/or adding one or more atoms or functional groups. The term "derivative" does not mean that the derivative is synthesized from the parent compound either as a starting material or intermediate, although this may be the case. The term "derivative" can include prodrugs, or metabolites of the parent compound. Derivatives include compounds in which free amino groups in the parent compound have been derivatized to form amine hydrochlorides, p-toluene sulfonamides, benzoxycarboamides, t-butyloxycarboamides, thiourethane-type derivatives, trifluoroacetylamides, chloroacetylamides, or formamides. Derivatives include compounds in which carboxyl groups in the parent compound have been derivatized to form methyl and ethyl esters, or other types of esters or hydrazides. Derivatives include compounds in which hydroxyl groups in the parent compound have been derivatized to form O-acyl or O-alkyl derivatives. Derivatives include compounds in which a hydrogen bond donating group in the parent compound is replaced with another hydrogen bond donating group such as OH, NH, or SH. Derivatives include replacing a hydrogen bond acceptor group in the parent compound with another hydrogen bond acceptor group such as esters, ethers, ketones, carbonates, tertiary amines, imine, thiones, sulfones, tertiary amides, and sulfides. "Derivatives" also includes extensions of the replacement of the cyclopentane ring with saturated or unsaturated cyclohexane or other more complex, e.g., nitrogen-containing rings, and extensions of these rings with side various groups.

As used herein, "dose," "unit dose," or "dosage" can refer to physically discrete units suitable for use in a subject, each unit containing a predetermined quantity of the compounds described herein, e.g. the ones referred to herein as NMDA modulators or NMDA modulating compounds. and/or a pharmaceutical formulation thereof calculated to produce the desired response or responses in association with its administration.

As used herein, "hydrogel" refers to a gelatinous colloid, or aggregate of polymeric molecules in a finely dispersed semi-solid state, where the polymeric molecules are in the external or dispersion phase and water (or an aqueous solution) is forms the internal or dispersed phase. Generally, hydrogels are at least 90% by weight of an aqueous solution.

As used interchangeably herein, "heterocycle," "heterocyclic" and "heterocyclyl" refer to a cyclic radical attached via a ring carbon or nitrogen atom of a monocyclic or bicyclic ring containing 3-10 ring atoms, and preferably from 5-6 ring atoms, consisting of carbon and one to four heteroatoms each selected from the group consisting of non-peroxide oxygen, sulfur, and N(Y) wherein Y is absent or is H, O, $C_1$-$C_{10}$ alkyl, phenyl or benzyl, and optionally containing 1-3 double bonds and optionally substituted with one or more substituents. Heterocyclyl are distinguished from heteroaryl by definition. Examples of heterocycles include, but are not limited to piperazinyl, piperidinyl, piperidonyl, 4-piperidonyl, dihydrofuro[2,3-b]tetrahydrofuran, morpholinyl, piperazinyl, piperidinyl, piperidonyl, 4-piperidonyl, piperonyl, pyranyl, 2H-pyrrolyl, 4H-quinolizinyl, quinuclidinyl, tetrahydrofuranyl, 6H-1,2,5-thiadiazinyl. Heterocyclic groups can optionally be substituted with one or more substituents as defined above for alkyl and aryl.

As used herein, "heteroaryl" refers to $C_5$-$C_{26}$-membered aromatic, fused aromatic, biaromatic ring systems, or combinations thereof, in which one or more carbon atoms on one or more aromatic ring structures have been substituted with an heteroatom. Suitable heteroatoms include, but are not limited to, oxygen, sulfur, and nitrogen. Broadly defined, "heteroaryl," as used herein, includes 5-, 6-, 7-, 8-, 9-, 10-, 14-, 18-, and 24-membered single-ring aromatic groups that may include from one to four heteroatoms, for example, pyrrole, furan, thiophene, imidazole, oxazole, thiazole, triazole, tetrazole, pyrazole, pyridine, pyrazine, pyridazine and pyrimidine, and the like. The heteroaryl group may also be referred to as "aryl heterocycles" or "heteroaromatics". "Heteroaryl" further encompasses polycyclic ring systems having two or more rings in which two or more carbons are common to two adjoining rings (i.e., "fused rings") wherein at least one of the rings is heteroaromatic, e.g., the other cyclic ring or rings can be cycloalkyls, cycloalkenyls, cycloalkynyls, aryls, heterocycles, or combinations thereof. Examples of heteroaryl rings include, but are not limited to, benzimidazolyl, benzofuranyl, benzothiofuranyl, benzothiophenyl, benzoxazolyl, benzoxazolinyl, benzthiazolyl, benztriazolyl, benztetrazolyl, benzisoxazolyl, benzisothiazolyl, benzimidazolinyl, carbazolyl, 4aH-carbazolyl, carbolinyl, chromanyl, chromenyl, cinnolinyl, decahydroquinolinyl, 2H,6H-1,5,2-dithiazinyl, furanyl, furazanyl, imidazolidinyl, imidazolinyl, imidazolyl, 1H-indazolyl, indolenyl, indolinyl, indolizinyl, indolyl, 3H-indolyl, isatinoyl, isobenzofuranyl, isochromanyl, isoindazolyl, isoindolinyl, isoindolyl, isoquinolinyl, isothiazolyl, isoxazolyl, methylenedioxyphenyl, naphthyridinyl, octahydroisoquinolinyl, 1,2,3-oxadiazolyl, 1,2,4-oxadiazolyl, 1,2,5-oxadiazolyl, 1,3,4-oxadiazolyl, oxazolidinyl, oxazolyl, oxindolyl, pyrimidinyl, phenanthridinyl, phenanthrolinyl, phenazinyl, phenothiazinyl, phenoxathinyl, phenoxazinyl, phthalazinyl, pteridinyl, purinyl, pyrazinyl, pyrazolidinyl, pyrazolinyl, pyrazolyl, pyridazinyl, pyridooxazole, pyridoimidazole, pyridothiazole, pyridinyl, pyridyl, pyrimidinyl, pyrrolidinyl, pyrrolinyl, pyrrolyl, quinazolinyl, quinolinyl, quinoxalinyl, tetrahydroisoquinolinyl, tetrahydroquinolinyl, tetrazolyl, 1,2,3-thiadiazolyl, 1,2,4-thiadiazolyl, 1,2,5-thiadiazolyl, 1,3,4-thiadiazolyl, thianthrenyl, thiazolyl, thienyl, thienothiazolyl, thienooxazolyl, thienoimidazolyl, thiophenyl and xanthenyl. One or more of the rings can be substituted as defined for "substituted heteroaryl". The term "substituted heteroaryl" refers to a heteroaryl group in which one or more hydrogen atoms on one or more heteroaromatic rings are substituted with one or more substituents including, but not limited to, halogen, azide, alkyl, aralkyl, alkenyl, alkynyl, cycloalkyl, hydroxyl, alkoxy, carbonyl (such as a ketone, aldehyde, carboxyl, alkoxycarbonyl, formyl, or an acyl), silyl, ether, ester, thiocarbonyl (such as a thioester, a thioacetate, or a thioformate), alkoxyl, phosphoryl, phosphate, phosphonate, phosphinate, amino (or quarternized amino), amido, amidine, imine, cyano, nitro, azido, sulfhydryl, imino, alkylthio, sulfate, sulfonate, sulfamoyl, sulfonamido, sulfonyl, heterocyclyl, alkylaryl, haloalkyl (such as $CF_3$, $-CH_2-CF_3$, $-CCl_3$), $-CN$, aryl, heteroaryl, and combinations thereof.

As used herein, "heteroalkyl," refers to straight or branched chain, or cyclic carbon-containing radicals, or combinations thereof, containing at least one heteroatom. Suitable heteroatoms include, but are not limited to, O, N, Si, P and S, wherein the nitrogen, phosphorous and sulfur atoms are optionally oxidized, and the nitrogen heteroatom is optionally quaternized. Examples of saturated hydrocarbon radicals include, but are not limited to, methyl, ethyl, n-propyl, isopropyl, n-butyl, t-butyl, isobutyl, sec-butyl, cyclohexyl, (cyclohexyl)methyl, cyclopropylmethyl, and homologs and isomers of, for example, n-pentyl, n-hexyl, n-heptyl, n-octyl. Examples of unsaturated alkyl groups include, but are not limited to, vinyl, 2-propenyl, crotyl, 2-isopentenyl, 2-(butadienyl), 2,4-pentadienyl, 3-(1,4-pentadienyl), ethynyl, 1- and 3-propynyl, and 3-butynyl.

As used herein, "modulate" broadly denotes a qualitative and/or quantitative alteration, change or variation in that which is being modulated. Where modulation can be assessed quantitatively—for example, where modulation comprises or consists of a change in a quantifiable variable such as a quantifiable property of a cell or where a quantifiable variable provides a suitable surrogate for the modulation—modulation specifically encompasses both increase (e.g., activation) or decrease (e.g., inhibition) in the measured variable. The term encompasses any extent of such modulation, e.g., any extent of such increase or decrease, and may more particularly refer to statistically significant increase or decrease in the measured variable. By means of example, in aspects modulation may encompass an increase in the value of the measured variable by about 10 to 500 percent or more. In aspects, modulation can encompass an increase in the value of at least 10%, 20%, 30%, 40%, 50%, 75%, 100%, 150%, 200%, 250%, 300%, 400% to 500% or more, compared to a reference situation or suitable control without said modulation. In aspects, modulation may encompass a decrease or reduction in the value of the measured variable by about 5 to about 100%. In some aspects, the decrease can be about 5%, 10%, 20%, 30%, 40%, 50%, 60%, 70%, 80%, 90%, 95%, 96%, 97%, 98%, 99% to about 100%, compared to a reference situation or suitable control without said modulation. In aspects, modulation may be specific or selective, hence, one or more desired phenotypic aspects of a cell or cell population may be modulated without substantially altering other (unintended, undesired) phenotypic aspect(s).

The term "molecular weight", as used herein, can generally refer to the mass or average mass of a material. If a polymer or oligomer, the molecular weight can refer to the relative average chain length or relative chain mass of the bulk polymer. In practice, the molecular weight of polymers and oligomers can be estimated or characterized in various ways including gel permeation chromatography (GPC) or capillary viscometry. GPC molecular weights are reported as the weight-average molecular weight ($M_w$) as opposed to the number-average molecular weight ($M_n$). Capillary viscometry provides estimates of molecular weight as the inherent viscosity determined from a dilute polymer solution using a particular set of concentration, temperature, and solvent conditions.

As used herein, "pharmaceutical formulation" refers to the combination of an active agent, compound, or ingredient with a pharmaceutically acceptable carrier or excipient, making the composition suitable for diagnostic, therapeutic, or preventive use in vitro, in vivo, or ex vivo.

As used herein, "pharmaceutically acceptable carrier or excipient" refers to a carrier or excipient that is useful in preparing a pharmaceutical formulation that is generally safe, non-toxic, and is neither biologically or otherwise undesirable, and includes a carrier or excipient that is acceptable for veterinary use as well as human pharmaceutical use. A "pharmaceutically acceptable carrier or excipient" as used in the specification and claims includes both one and more than one such carrier or excipient.

As used herein, "pharmaceutically acceptable salt" refers to any acid or base addition salt whose counter-ions are non-toxic to the subject to which they are administered in pharmaceutical doses of the salts.

The term "phenyl" is art recognized, and refers to the aromatic moiety $-C_6H_5$, i.e., a benzene ring without one hydrogen atom. The term "substituted phenyl" refers to a phenyl group, as defined above, having one or more substituents replacing one or more hydrogen atoms on one or more carbons of the phenyl ring. Such substituents include, but are not limited to, halogen, azide, alkyl, aralkyl, alkenyl, alkynyl, cycloalkyl, hydroxyl, carbonyl (such as a carboxyl, alkoxycarbonyl, formyl, or an acyl), silyl, ether, ester, thiocarbonyl (such as a thioester, a thioacetate, or a thioformate), alkoxyl, phosphoryl, phosphate, phosphonate, phosphinate, amino (or quarternized amino), amido, amidine, imine, cyano, nitro, azido, sulfhydryl, alkylthio, sulfate, sulfonate, sulfamoyl, sulfonamido, sulfonyl, heterocyclyl, alkylaryl, haloalkyl, $-CN$, aryl, heteroaryl, and combinations thereof.

The term "phenoxy" is art recognized, and refers to a compound of the formula $-OR'$ wherein $R^v$ is (i.e., $-O-C_6H_5$). One of skill in the art recognizes that a phenoxy is a species of the aroxy genus. The term "substituted phenoxy" refers to a phenoxy group, as defined above, having one or more substituents replacing one or more hydrogen atoms on one or more carbons of the phenyl ring. Such substituents include, but are not limited to, halogen, azide, alkyl, aralkyl, alkenyl, alkynyl, cycloalkyl, hydroxyl, carbonyl (such as a carboxyl, alkoxycarbonyl, formyl, or an acyl), silyl, ether, ester, thiocarbonyl (such as a thioester, a thioacetate, or a thioformate), alkoxyl, phosphoryl, phosphate, phosphonate, phosphinate, amino (or quaternized amino), amido, amidine, imine, cyano, nitro, azido, sulfhydryl, alkylthio, sulfate, sulfonate, sulfamoyl, sulfonamido, sulfonyl, heterocyclyl, alkylaryl, haloalkyl, —CN, aryl, heteroaryl, and combinations thereof.

The term "phenylthio" is art recognized, and refers to —S—$C_6H_5$, i.e., a phenyl group attached to a sulfur atom. The term "substituted phenylthio" refers to a phenylthio group, as defined above, having one or more substituents replacing a hydrogen on one or more carbons of the phenyl ring. Such substituents include, but are not limited to, halogen, azide, alkyl, aralkyl, alkenyl, alkynyl, cycloalkyl, hydroxyl, carbonyl (such as a carboxyl, alkoxycarbonyl, formyl, or an acyl), silyl, ether, ester, thiocarbonyl (such as a thioester, a thioacetate, or a thioformate), alkoxyl, phosphoryl, phosphate, phosphonate, phosphinate, amino (or quaternized amino), amido, amidine, imine, cyano, nitro, azido, sulfhydryl, alkylthio, sulfate, sulfonate, sulfamoyl, sulfonamido, sulfonyl, heterocyclyl, alkylaryl, haloalkyl, —CN, aryl, heteroaryl, and combinations thereof.

The term "phosphonyl" is represented by the formula

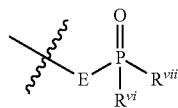

wherein E is absent, or E is substituted or unsubstituted alkyl, substituted or unsubstituted alkenyl, substituted or unsubstituted alkynyl, substituted or unsubstituted aralkyl, substituted or unsubstituted alkylaryl, substituted or unsubstituted cycloalkyl, substituted or unsubstituted aryl, substituted or unsubstituted heteroaryl, substituted or unsubstituted heterocyclyl, wherein, independently of E, R" and R'" are independently hydrogen, substituted or unsubstituted alkyl, substituted or unsubstituted alkenyl, substituted or unsubstituted alkynyl, substituted or unsubstituted carbonyl, substituted or unsubstituted cycloalkyl, substituted or unsubstituted heterocyclyl, substituted or unsubstituted alkylaryl, substituted or unsubstituted arylalkyl, substituted or unsubstituted aryl, or substituted or unsubstituted heteroaryl, —$(CH_2)_m$—R'", or R and R' taken together with the P atom to which they are attached complete a heterocycle having from 3 to 14 atoms in the ring structure; R'" represents a hydroxy group, substituted or unsubstituted carbonyl group, an aryl, a cycloalkyl ring, a cycloalkenyl ring, a heterocycle, or a polycycle; and m is zero or an integer ranging from 1 to 8. The term "substituted phosphonyl" represents a phosphonyl in which E, $R^{vi}$ and $R^{vii}$ are independently substituted. Such substituents include, but are not limited to, halogen, azide, alkyl, aralkyl, alkenyl, alkynyl, cycloalkyl, hydroxyl, carbonyl (such as a carboxyl, alkoxycarbonyl, formyl, or an acyl), silyl, ether, ester, thiocarbonyl (such as a thioester, a thioacetate, or a thioformate), alkoxyl, phosphoryl, phosphate phosphonate, phosphinate, amino (or quaternized amino), amido, amidine, imine, cyano, nitro, azido, sulfhydryl, alkylthio, sulfate, sulfonate, sulfamoyl, sulfonamido, sulfonyl, heterocyclyl, alkylaryl, haloalkyl, —CN, aryl, heteroaryl, and combinations thereof.

The term "phosphoryl" defines a phoshonyl in which E is absent, oxygen, alkoxy, aroxy, substituted alkoxy or substituted aroxy, as defined herein, and independently of E, $R^{vi}$ and $R^{vii}$ are independently hydroxyl, alkoxy, aroxy, substituted alkoxy or substituted aroxy, as defined above. When E is oxygen, the phosphoryl cannot be attached to another chemical species, such as to form an oxygen-oxygen bond, or other unstable bonds, as understood by one of ordinary skill in the art. When E, $R^{vi}$ and $R^{vii}$ are substituted, the substituents include, but are not limited to, halogen, azide, alkyl, aralkyl, alkenyl, alkynyl, cycloalkyl, hydroxyl, carbonyl (such as a carboxyl, alkoxycarbonyl, formyl, or an acyl), silyl, ether, ester, thiocarbonyl (such as a thioester, a thioacetate, or a thioformate), alkoxyl, phosphoryl, phosphate, phosphonate, phosphinate, amino (or quaternized amino), amido, amidine, imine, cyano, nitro, azido, sulfhydryl, alkylthio, sulfate, sulfonate, sulfamoyl, sulfonamido, sulfonyl, heterocyclyl, alkylaryl, haloalkyl, —CN, aryl, heteroaryl, and combinations thereof.

As used herein, "polyaryl" refers to a chemical moiety that includes two or more aryls, heteroaryls, and combinations thereof. The aryls, heteroaryls, and combinations thereof, are fused, or linked via a single bond, ether, ester, carbonyl, amide, sulfonyl, sulfonamide, alkyl, azo, and combinations thereof. The term "substituted polyaryl" refers to a polyaryl in which one or more of the aryls, heteroaryls are substituted, with one or more substituents including, but not limited to, halogen, azide, alkyl, aralkyl, alkenyl, alkynyl, cycloalkyl, hydroxyl, carbonyl (such as a carboxyl, alkoxycarbonyl, formyl, or an acyl), silyl, ether, ester, thiocarbonyl (such as a thioester, a thioacetate, or a thioformate), alkoxyl, phosphoryl, phosphate, phosphonate, phosphinate, amino (or quaternized amino), amido, amidine, imine, cyano, nitro, azido, sulfhydryl, alkylthio, sulfate, sulfonate, sulfamoyl, sulfonamido, sulfonyl, heterocyclyl, alkylaryl, haloalkyl, —CN, aryl, heteroaryl, and combinations thereof.

The term "$C_3$-$C_{20}$ cyclic" refers to a substituted or unsubstituted cycloalkyl, substituted or unsubstituted cycloalkenyl, substituted or unsubstituted cycloalkynyl, substituted or unsubstituted heterocyclyl that have from three to 20 carbon atoms, as geometric constraints permit. The cyclic structures are formed from single or fused ring systems. The substituted cycloalkyls, cycloalkenyls, cycloalkynyls and heterocyclyls are substituted as defined above for the alkyls, alkenyls, alkynyls and heterocyclyls, respectively.

As used herein, "potency" refers to a compounds activity as expressed in terms of the amount required to produce an effect of given intensity. In some embodiments, potency can be expressed the $EC_{50}$ of a compound to elicit a particular response. For example, the potency of glutamate or glycine (or any other compound and NMDA modulating compound described herein, including the inventive compounds described herein) can be expressed as the $EC_{50}$ to modulate NMDA receptor express, function and/or activity. In some embodiments where two molecules interact directly or indirectly to modulate expression, function, and/or activity of a third molecule, such as when competitive or allosteric modulators act on a receptor (such as an NMDA receptor), potency can also refer to the ability of e.g. the first molecule to act on the second molecule, such that the potency of the second molecule to modulate the third is altered 0, 10, 20, 30, 40, 50, 60, 70, 80, 90, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, 750, 760, 770, 780, 790, 800, 810, 820, 830, 840, 850, 860, 870, 880, 890, 900, 910, 920, 930, 940, 950, 960, 970, 980, 990, 1000 percent or more and can be expressed as an $EC_{50}$ of the potency of the second molecule or as an $EC_{50}$ of the first molecules' ability to cause a specific amount of change in the potency of the second molecule as to the third molecule.

As used herein, "preventative" and "prevent" refers to hindering or stopping a disease or condition before it occurs, even if undiagnosed, or while the disease or condition is still in the sub-clinical phase.

As used herein, "substantial" and "substantially," specify an amount of between 95% and 100%, inclusive, between 96% and 100%, inclusive, between 97% and 100%, inclusive, between 98% 100%, inclusive, or between 99% 100%, inclusive.

As used herein, "substantially pure" can mean an object species is the predominant species present (i.e., on a molar basis it is more abundant than any other individual species in the composition), and preferably a substantially purified fraction is a composition wherein the object species comprises about 50 percent of all species present. Generally, a substantially pure composition will comprise more than about 80 percent of all species present in the composition, more preferably more than about 85%, 90%, 95%, and 99%. Most preferably, the object species is purified to essential homogeneity (contaminant species cannot be detected in the composition by conventional detection methods) wherein the composition consists essentially of a single species.

As used herein, "substituted," refers to all permissible substituents of the compounds or functional groups described herein. In the broadest sense, the permissible substituents include acyclic and cyclic, branched and unbranched, carbocyclic and heterocyclic, aromatic and nonaromatic substituents of organic compounds. Illustrative substituents include, but are not limited to, halogens, hydroxyl groups, or any other organic groupings containing any number of carbon atoms, preferably 1-14 carbon atoms, and optionally include one or more heteroatoms such as oxygen, sulfur, or nitrogen grouping in linear, branched, or cyclic structural formats. Representative substituents include alkyl, substituted alkyl, alkenyl, substituted alkenyl, alkynyl, substituted alkynyl, phenyl, substituted phenyl, aryl, substituted aryl, heteroaryl, substituted heteroaryl, halo, hydroxyl, alkoxy, substituted alkoxy, phenoxy, substituted phenoxy, aroxy, substituted aroxy, alkylthio, substituted alkylthio, phenylthio, substituted phenylthio, arylthio, substituted arylthio, cyano, isocyano, substituted isocyano, carbonyl, substituted carbonyl, carboxyl, substituted carboxyl, amino, substituted amino, amido, substituted amido, sulfonyl, substituted sulfonyl, sulfonic acid, phosphoryl, substituted phosphoryl, phosphonyl, substituted phosphonyl, polyaryl, substituted polyaryl, $C_3$-$C_{20}$ cyclic, substituted $C_3$-$C_{20}$ cyclic, heterocyclic, substituted heterocyclic, amino acid, poly(lactic-co-glycolic acid), peptide, and polypeptide groups. Such alkyl, substituted alkyl, alkenyl, substituted alkenyl, alkynyl, substituted alkynyl, phenyl, substituted phenyl, aryl, substituted aryl, heteroaryl, substituted heteroaryl, halo, hydroxyl, alkoxy, substituted alkoxy, phenoxy, substituted phenoxy, aroxy, substituted aroxy, alkylthio, substituted alkylthio, phenylthio, substituted phenylthio, arylthio, substituted arylthio, cyano, isocyano, substituted isocyano, carbonyl, substituted carbonyl, carboxyl, substituted carboxyl, amino, substituted amino, amido, substituted amido, sulfonyl, substituted sulfonyl, sulfonic acid, phosphoryl, substituted phosphoryl, phosphonyl, substituted phosphonyl, polyaryl, substituted polyaryl, $C_3$-$C_{20}$ cyclic, substituted $C_3$-$C_{20}$ cyclic, heterocyclic, substituted heterocyclic, amino acid, poly(lactic-co-glycolic acid), peptide, and polypeptide groups can be further substituted. "Substituted," as used herein, refers to all permissible substituents of the compounds or functional groups described herein. In the broadest sense, the permissible substituents include acyclic and cyclic, branched and unbranched, carbocyclic and heterocyclic, aromatic and nonaromatic substituents of organic compounds. Illustrative substituents include, but are not limited to, halogens, hydroxyl groups, or any other organic groupings containing any number of carbon atoms, preferably 1-14 carbon atoms, and optionally include one or more heteroatoms such as oxygen, sulfur, or nitrogen grouping in linear, branched, or cyclic structural formats. Representative substituents include alkyl, substituted alkyl, alkenyl, substituted alkenyl, alkynyl, substituted alkynyl, phenyl, substituted phenyl, aryl, substituted aryl, heteroaryl, substituted heteroaryl, halo, hydroxyl, alkoxy, substituted alkoxy, phenoxy, substituted phenoxy, aroxy, substituted aroxy, alkylthio, substituted alkylthio, phenylthio, substituted phenylthio, arylthio, substituted arylthio, cyano, isocyano, substituted isocyano, carbonyl, substituted carbonyl, carboxyl, substituted carboxyl, amino, substituted amino, amido, substituted amido, sulfonyl, substituted sulfonyl, sulfonic acid, phosphoryl, substituted phosphoryl, phosphonyl, substituted phosphonyl, polyaryl, substituted polyaryl, $C_3$-$C_{20}$ cyclic, substituted $C_3$-$C_{20}$ cyclic, heterocyclic, substituted heterocyclic, amino acid, poly(lactic-co-glycolic acid), peptide, and polypeptide groups can be further substituted.

As used interchangeably herein, the terms "sufficient" and "effective," can refer to an amount (e.g. mass, volume, dosage, concentration, and/or time period) needed to achieve one or more desired result(s). For example, a therapeutically effective amount refers to an amount needed to achieve one or more therapeutic effects.

As used herein, "sulfonyl" is represented by the formula

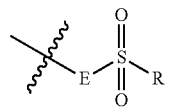

wherein E is absent, or E is alkyl, alkenyl, alkynyl, aralkyl, alkylaryl, cycloalkyl, aryl, heteroaryl, heterocyclyl, wherein independently of E, R represents a hydrogen, substituted or unsubstituted alkyl, substituted or unsubstituted alkenyl, substituted or unsubstituted alkynyl, substituted or unsubstituted amine, substituted or unsubstituted cycloalkyl, substituted or unsubstituted heterocyclyl, substituted or unsubstituted alkylaryl, substituted or unsubstituted arylalkyl, substituted or unsubstituted aryl, or substituted or unsubstituted heteroaryl, —(CH$_2$)$_m$—R''', or E and R taken together with the S atom to which they are attached complete a heterocycle having from 3 to 14 atoms in the ring structure; R''' represents a hydroxy group, substituted or unsubstituted carbonyl group, an aryl, a cycloalkyl ring, a cycloalkenyl ring, a heterocycle, or a polycycle; and m is zero or an integer ranging from 1 to 8. In preferred embodiments, only one of E and R can be substituted or unsubstituted amine, to form a "sulfonamide" or "sulfonamido." The substituted or unsubstituted amine is as defined above. The term "substituted sulfonyl" represents a sulfonyl in which E, R, or both, are independently substituted. Such substituents include, but are not limited to, halogen, azide, alkyl, aralkyl, alkenyl, alkynyl, cycloalkyl, hydroxyl, carbonyl (such as a carboxyl, alkoxycarbonyl, formyl, or an acyl), silyl, ether, ester, thiocarbonyl (such as a thioester, a thioacetate, or a thioformate), alkoxyl, phosphoryl, phosphate, phosphonate, phosphinate, amino (or quarternized amino), amido, amidine, imine, cyano, nitro, azido, sulfhydryl, alkylthio, sulfate, sulfonate, sulfamoyl, sulfonamido, sulfonyl, heterocyclyl, alkylaryl, haloalkyl, —CN, aryl, heteroaryl, and combinations thereof.

As used herein, "substituted sulfonyl" represents a sulfonyl in which E, R, or both, are independently substituted. Such substituents include, but are not limited to, halogen, azide, alkyl, aralkyl, alkenyl, alkynyl, cycloalkyl, hydroxyl, carbonyl (such as a carboxyl, alkoxycarbonyl, formyl, or an acyl), silyl, ether, ester, thiocarbonyl (such as a thioester, a thioacetate, or a thioformate), alkoxyl, phosphoryl, phosphate, phosphonate, phosphinate, amino (or quarternized amino), amido, amidine, imine, cyano, nitro, azido, sulfhydryl, alkylthio, sulfate, sulfonate, sulfamoyl, sulfonamido, sulfonyl, heterocyclyl, alkylaryl, haloalkyl, —CN, aryl, heteroaryl, and combinations thereof.

As used herein, "sulfate" refers to a sulfonyl, as defined above, wherein E is absent, oxygen, alkoxy, aroxy, substituted alkoxy or substituted aroxy, as defined above, and R is independently hydroxyl, alkoxy, aroxy, substituted alkoxy or substituted aroxy, as defined above. When E is oxygen, the sulfate cannot be attached to another chemical species, such as to form an oxygen-oxygen bond, or other unstable bonds, as understood by one of ordinary skill in the art.

As used herein, the term "sulfonate" refers to a sulfonyl, as defined above, wherein E is oxygen, alkoxy, aroxy, substituted alkoxy or substituted aroxy, as defined above, and R is independently hydrogen, substituted or unsubstituted alkyl, substituted or unsubstituted alkenyl, substituted or unsubstituted alkynyl, substituted or unsubstituted amine, substituted or unsubstituted cycloalkyl, substituted or unsubstituted heterocyclyl, substituted or unsubstituted alkylaryl, substituted or unsubstituted arylalkyl, substituted or unsubstituted aryl, or substituted or unsubstituted heteroaryl, —(CH$_2$)$_m$—R''', R''' represents a hydroxy group, substituted or unsubstituted carbonyl group, an aryl, a cycloalkyl ring, a cycloalkenyl ring, a heterocycle, or a polycycle; and m is zero or an integer ranging from 1 to 8. When E is oxygen, sulfonate cannot be attached to another chemical species, such as to form an oxygen-oxygen bond, or other unstable bonds, as understood by one of ordinary skill in the art.

The term "sulfamoyl" refers to a sulfonamide or sulfonamide represented by the formula

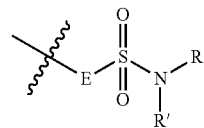

where E is absent, or E is substituted or unsubstituted alkyl, substituted or unsubstituted alkenyl, substituted or unsubstituted alkynyl, substituted or unsubstituted aralkyl, substituted or unsubstituted alkylaryl, substituted or unsubstituted cycloalkyl, substituted or unsubstituted aryl, substituted or unsubstituted heteroaryl, substituted or unsubstituted heterocyclyl, wherein independently of E, R and R' each independently represent a hydrogen, substituted or unsubstituted alkyl, substituted or unsubstituted alkenyl, substituted or unsubstituted alkynyl, substituted or unsubstituted carbonyl, substituted or unsubstituted cycloalkyl, substituted or unsubstituted heterocyclyl, substituted or unsubstituted alkylaryl, substituted or unsubstituted arylalkyl, substituted or unsubstituted aryl, or substituted or unsubstituted heteroaryl, —(CH$_2$)$_m$—R''', or R and R' taken together with the N atom to which they are attached complete a heterocycle having from 3 to 14 atoms in the ring structure; R''' represents a hydroxy group, substituted or unsubstituted carbonyl group, an aryl, a cycloalkyl ring, a cycloalkenyl ring, a heterocycle, or a polycycle; and m is zero or an integer ranging from 1 to 8. In preferred embodiments, only one of R and R' can be a carbonyl, e.g., R and R' together with the nitrogen do not form an imide.

As used herein, "tangible medium of expression" refers to a medium that is physically tangible or accessible and is not a mere abstract thought or an unrecorded spoken word. "Tangible medium of expression" includes, but is not limited to, words on a cellulosic or plastic material, or data stored in a suitable computer readable memory form. The data can be stored on a unit device, such as a flash memory drive or CD-ROM or on a server that can be accessed by a user via, e.g. a web interface.

As used herein, "therapeutic" can refer to treating, healing, and/or ameliorating a disease, disorder, condition, or side effect, or to decreasing in the rate of advancement of a disease, disorder, condition, or side effect. A "therapeutically effective amount" can therefore refer to an amount of a compound that can yield a therapeutic effect.

As used herein, the terms "treating" and "treatment" can refer generally to obtaining a desired pharmacological and/or physiological effect. The effect can be, but does not necessarily have to be, prophylactic in terms of preventing or partially preventing a disease, symptom or condition thereof, such as an NMDA-mediated disease. The effect can be therapeutic in terms of a partial or complete cure of a disease, condition, symptom or adverse effect attributed to the disease, disorder, or condition. The term "treatment" as used herein covers any treatment of an NMDA-mediated disease, in a subject, particularly a human, and can include any one or more of the following: (a) preventing the disease from occurring in a subject which may be predisposed to the disease but has not yet been diagnosed as having it; (b) inhibiting the disease, i.e., arresting its development; and (c) relieving the disease, i.e., mitigating or ameliorating the disease and/or its symptoms or conditions. The term "treatment" as used herein can refer to both therapeutic treatment alone, prophylactic treatment alone, or both therapeutic and prophylactic treatment. Those in need of treatment (subjects in need thereof) can include those already with the disorder and/or those in which the disorder is to be prevented. As used herein, the term "treating", can include inhibiting the disease, disorder or condition, e.g., impeding its progress; and relieving the disease, disorder, or condition, e.g., causing regression of the disease, disorder and/or condition. Treating the disease, disorder, or condition can include ameliorating at least one symptom of the particular disease, disorder, or condition, even if the underlying pathophysiology is not affected, such as treating the pain of a subject by administration of an analgesic agent even though such agent does not treat the cause of the pain.

As used herein, "NMDA receptor-mediated disease" refers to a disease whose pathology or cause (either direct or indirect) is due to dysfunction or aberrant expression, function, and/or activity of an NMDA receptor. This also can be applied to specific NMDA receptor subtypes. Thus, for example, a "tir-heteromeric NMDA receptor-mediated disease" refers to a disease whose pathology or cause (either indirect or direct) is due to dysfunction or aberrant expression, function, and/or activity of an NMDA receptor. Methods of determining NMDA receptor expression, function, and/or activity, as well as if the determined NMDA receptor expression, function, and/or activity is normal, dysfunctional, or aberrant are generally known in the art and will be appreciated by those of ordinary skill in the art. Some of these techniques are discussed herein.

All publications, published patent documents, and patent applications cited herein are hereby incorporated by reference to the same extent as though each individual publication, published patent document, or patent application was specifically and individually indicated as being incorporated by reference.

Overview

N-methyl-D-aspartate (NMDA) are glutamate receptors form ion channels and are found in nerve cells. NMDA receptors play a central role in normal brain function and activity. They are involved in synaptic plasticity, synapse formation underlying memory, learning, and formation of neural networks in the central nervous system. Aberrant expression, function and/or activity of NMDA receptors can contribute to the pathogenesis of various psychiatric and/or neurological diseases and disorders. Indeed, both hyper and hypofunction of NMDA receptors can contribute to development of neurobiological diseases and disorders.

Functional NMDA receptors are tetra-heteromers composed of two obligatory GluN1 subunits and two non-GluN1 subunits of which there are six different gene products, GluN2A-D and GluN3A and B. A disproportionate amount of effort has focused on studying and targeting the he di-heteromeric (DH) combination of NMDA receptors that harbors two GluN1 subunits and two identical GluN2 subunits. Each of the four GluN2 (A-D) subunit containing DH NMDA receptors have been extensively studied for their role in induction of synaptic plasticity (see e.g. Hardingham, G. E. and H. Bading, Coupling of extrasynaptic NMDA receptors to a CREB shut-off pathway is developmentally regulated. Biochim Biophys Acta, 2002. 1600(1-2): p. 148-53, 12445470 and Hardingham, G. E. and H. Bading, Synaptic versus extrasynaptic NMDA receptor signalling: implications for neurodegenerative disorders. Nat Rev Neurosci, 2010. 11(10): p. 682-96, 20842175, 2948541) and excitotoxicity (see e.g., Okamoto, S., et al., Balance between synaptic versus extrasynaptic NMDA receptor activity influences inclusions and neurotoxicity of mutant huntingtin. Nat Med, 2009. 15(12): p. 1407-13, 19915593, 2789858 and Aluclu, M. U., et al., Evaluation of effects of memantine on cerebral ischemia in rats. Neurosciences (Riyadh), 2008. 13(2): p. 113-6, 21063302), while tri-heteromeric (TH) receptors being largely ignored. While GluN2A and GluN2B subunits are the canonical representatives of DH NMDA receptors, recent studies demonstrated that GluN1/2A/2B containing tri-heteromeric (TH) receptors are the predominant NMDA receptors expressed throughout the hippocampus and cortex (see e.g. Al-Hallaq, R. A., et al., NMDA di-heteromeric receptor populations and associated proteins in rat hippocampus. J Neurosci, 2007. 27(31): p. 8334-43, 17670980, PMC2263005; Luo, J., et al., The majority of N-methyl-D-aspartate receptor complexes in adult rat cerebral cortex contain at least three different subunits (NR1/NR2A/NR2B). Mol Pharmacol, 1997. 51(1): p. 79-86, 9016349; Rauner, C. and G. Kohr, Triheteromeric NR1/NR2A/NR2B receptors constitute the major N-methyl-D-aspartate receptor population in adult hippocampal synapses. J Biol Chem, 2011. 286(9): p. 7558-66, 21190942, PMC3045010; Sheng, M., et al., Changing subunit composition of heteromeric NMDA receptors during development of rat cortex. Nature, 1994. 368(6467): p. 144-7, 8139656; Tovar, K. R., M. J. McGinley, and G. L. Westbrook, Triheteromeric NMDA receptors at hippocampal synapses. J Neurosci, 2013. 33(21): p. 9150-60, 23699525, PMC3755730; and Hansen, K. B., et al., Distinct functional and pharmacological properties of Triheteromeric GluN1/GluN2A/GluN2B NMDA receptors. Neuron, 2014. 81(5): p. 1084-1096, 24607230, PMC3957490).

Reduced activity of a predominantly expressed TH NMDA receptor subtype (GluN1/2A/2B) in the human brain is directly connected to the pathogenesis of mental disorders including schizophrenia. Currently, there are no chemical agents available to selectively stimulate the function of GluN1/2A/2B receptors without affecting the activity of other closely related family members. As such there exists a need for the development of NMDA receptor modulating compounds and therapeutics, particularly TH NMDA receptors.

With that said, embodiments disclosed herein can provide compounds that can, in some embodiments, be effective to modulate an NMDA receptor. In some aspects, the compounds can be biased modulators and/or biased allosteric modulators of an NMDA receptor. In some embodiments, the compound can have a structure according to Formula I. Also described herein are methods of using the compounds to treat or prevent a disease or disorder mediated by an NMDA receptor, such as a DH or TH NMDA receptor. Other compositions, compounds, methods, features, and advantages of the present disclosure will be or become apparent to one having ordinary skill in the art upon examination of the following drawings, detailed description, and examples. It is intended that all such additional compositions, compounds, methods, features, and advantages be included within this description, and be within the scope of the present disclosure.

NMDA Receptor Modulators and Formulations

Described here are compounds and formulations thereof, such as pharmaceutical formulations that can be capable of modulating expression, function, and/or activity of one or more NMDA receptors. In some embodiments, one or more of the compounds can be selective for one or a couple NMDA receptors. In some embodiments, one or more of the compounds can be selective for 1, 2, or 3 subunits in an NMDA receptor. In some embodiments, one or more compounds are selective for the GluN1, GluN2A, GluN2B, GluN2C, GluN2D, GluN3A, GluN3B subunit or a combination thereof. In some embodiments, one or more of the compounds are selective for tri-heteromeric NMDA receptors. In some embodiments, one or more of the compounds are selected for GluN1/2A/2B NMDA receptors. In some embodiments, the compound can be capable of binding an NMDA receptor in the LBD cleft.

In some embodiments the compound can be a biased modulator. As used herein the term "biased modulator" refers to a compound that can modulate the expression, function, and/or activity or a receptor in different ways when the compound and/or an antagonist or agonist (either competitive or non-competitive) is provided at different concentrations, dosages, times, and/or to different receptors. For example, at a first concentration or concentration range the compound may stimulate activity of the receptor, but when provided at a second concentration or concentration range, the compound may inhibit the activity of the receptor. In some embodiments, the compound can be a biased modulator of an NMDA receptor or a subunit thereof. The compound can be a biased modulator of a di-heteromeric (DH) NMDA receptor. In some embodiments, the DH receptor is a GluN1/2A or GluN1/2B NMDA receptor. In some embodiments, the compound can be a biased modulator of a tri-heteromeric (TH) NMDA receptor. In some embodiments, the TH receptor is a GluN1/2A/2B NMDA receptor. In some embodiments, the compound can be a biased modulator of one or more subunits of an NMDA receptor. In some embodiments, the subunits can be GluN1, GluN2A, GluN2B, GluN2C, GluN2D, GluN3A, GluN3B, or any combination thereof.

As used herein the term "allosteric modulator" refers to a substance (e.g. a compound, that binds to a site that is not the same one to which the endogenous activator of the receptor would bind (e.g. an allosteric site). In some embodiments, one or more of the compounds herein can be an allosteric modulator of an NMDA receptor. The compound can be an allosteric modulator of a DH NMDA receptor. The compound can be an allosteric modulator of a GluN1/2A and/or GluN1/2B NMDA receptor. The compound can be an allosteric modulator of a TH NMDA receptor. The compound can be an allosteric modulator of a GluN/2A/2B receptor. In some embodiments, the compound can be an allosteric modulator of one or more subunits of an NMDA receptor. In some embodiments, the subunits can be GluN1, GluN2A, GluN2B, GluN2C, GluN2D, GluN3A, GluN3B, or any combination thereof.

In some embodiments, one or more of the compounds described herein can be a biased allosteric modulator. As used herein, "biased allosteric modulator" can referred to a compound that allosterically interacts with a receptor and modulates the receptor's activity in biased way (i.e. it has different effects on the receptor or different receptors when the compound when the compound and/or an antagonist or agonist (either competitive or non-competitive) is provided at different concentrations, dosages, or at different times). In some embodiments, one or more of the compounds herein can be an allosteric modulator of an NMDA receptor. The compound can be a biased allosteric modulator of a DH NMDA receptor. The compound can be a biased allosteric modulator of a GluN1/2A and/or GluN1/2B NMDA receptor. The compound can be a biased allosteric modulator of a TH NMDA receptor. The compound can be a biased allosteric modulator of a GluN/2A/2B receptor. In some embodiments, the compound can be a biased allosteric modulator of one or more subunits of an NMDA receptor. In some embodiments, the subunits can be GluN1, GluN2A, GluN2B, GluN2C, GluN2D, GluN3A, GluN3B, or any combination thereof.

Figure 19:
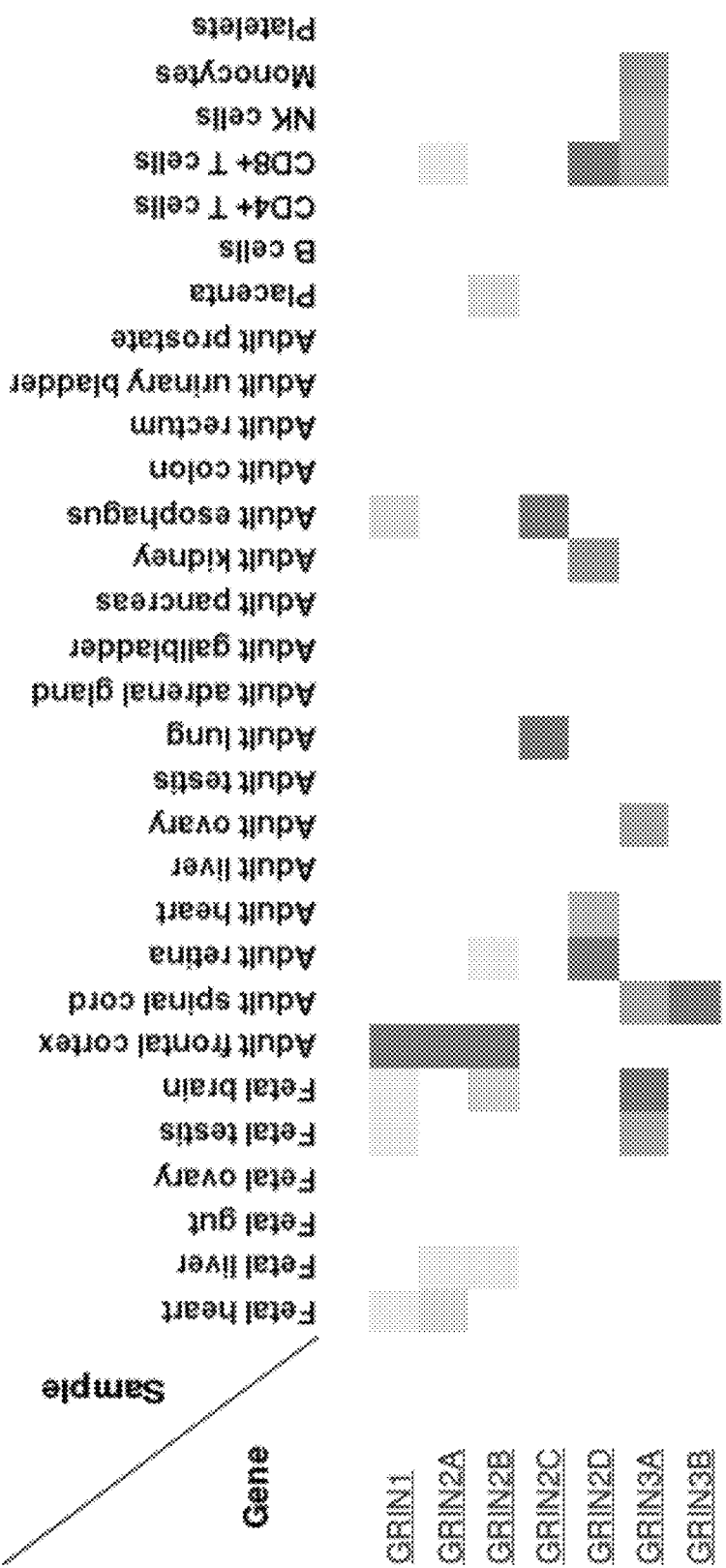
FIG. 19 shows gene/protein expression in various human tissue types of NMDA receptor subunit genes and gene products. The Glu1 subunit is produced by alternative splicing of GRIN1. There are eight variants of the GluN1 subunit. GluN2 subunits are encoded by GRIN2A, GRIN2B, GRIN2C, and GRIN2D.

Each non-GluN1 subunit confers distinct spatiotemporal expression and biophysical properties that result in the varying agonist affinity, magnesium sensitivity, ion conductance, activation kinetics, open probability, mean open time, cellular localization, and downstream signaling mechanisms. See e.g. Traynelis et al. Biochem Rev. 2010. 62(3): 405-496, 20716669, PMC2964903. FIG. 19 shows gene/protein expression in various human tissue types of NMDA receptor subunit genes and gene products. The Glu1 subunit is produced by alternative splicing of GRIN1. There are eight variants of the GluN1 subunit. GluN2 subunits are encoded by GRIN2A, GRIN2B, GRIN2C, and GRIN2D. The subunits that make of the TH Glu1/2A/2B are highly expressed in the hippocampus and cortex. In some embodiments, one or more of the compounds can modulate the expression, function, and/or activity of an NMDA receptor in the hippocampus and/or cortex. In some embodiments, the NMDA receptor is a Glu1/2A/2B receptor.

NMDA Receptor Modulators

In some embodiments, the compound can be a compound of Formula I

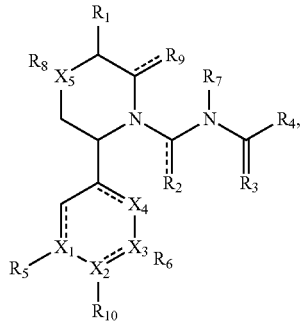

Formula I wherein $R_1$ is selected from the group consisting of: $H_2$, an aldehyde, an alkane, and an alkyl, where each are optionally substituted, wherein $R_2$ and $R_3$ are each individually selected from the group consisting of: S, O, and NH, wherein $R_4$ is selected from the group consisting of: an alkane, an alkene, an alkyl, an aryl, a heterocycle, a bicycloalkane, an alkoxy, and combinations thereof, which can each be optionally substituted, wherein $R_5$, when optionally present, is selected from the group consisting of: H, $H_2$, an alkyl, and a nitrile, which can be optionally substituted, wherein $R_6$, when optionally present, is selected from the group consisting of: H, $H_2$, an alkyl, and a nitrile, which can be optionally substituted, wherein $R_7$ is selected from the group consisting of: H and an alkyl, which can be optionally substituted, wherein $R_8$, when optionally present, is selected from the group consisting of: H, $H_2$, and an alkyl, which can be optionally substituted, wherein $R_9$ is selected from the group consisting of: $H_2$, $=O$, $=N$, and $=S$, wherein $R_{10}$, when optionally present, is H or $H_2$, wherein $X_1$-$X_3$ and $X_5$ are each individually selected from the group consisting of: C, $CH_2$, and N, and wherein $X_4$ is CH, $CH_2$, or N.

Where a group is described herein as being optionally substituted, this includes substitution with a suitable substitutent at any position on ring, in some instances, para, ortho, meta, with isomers being optionally optimized for selectivity for an NMDA receptor or receptor subunit type, efficacy as an NMDA receptor modulator, efficacy as a biased NMDA receptor modulator, and/or efficacy as a biased allosteric NMDA receptor modulator.

In some embodiments, $R_1$ can be selected from the group of: $H_2$,

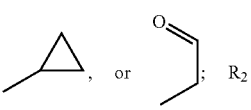

and $R_3$ can each be independently selected from the group of: S, O, and NH; $R_4$ can be selected from the group of:

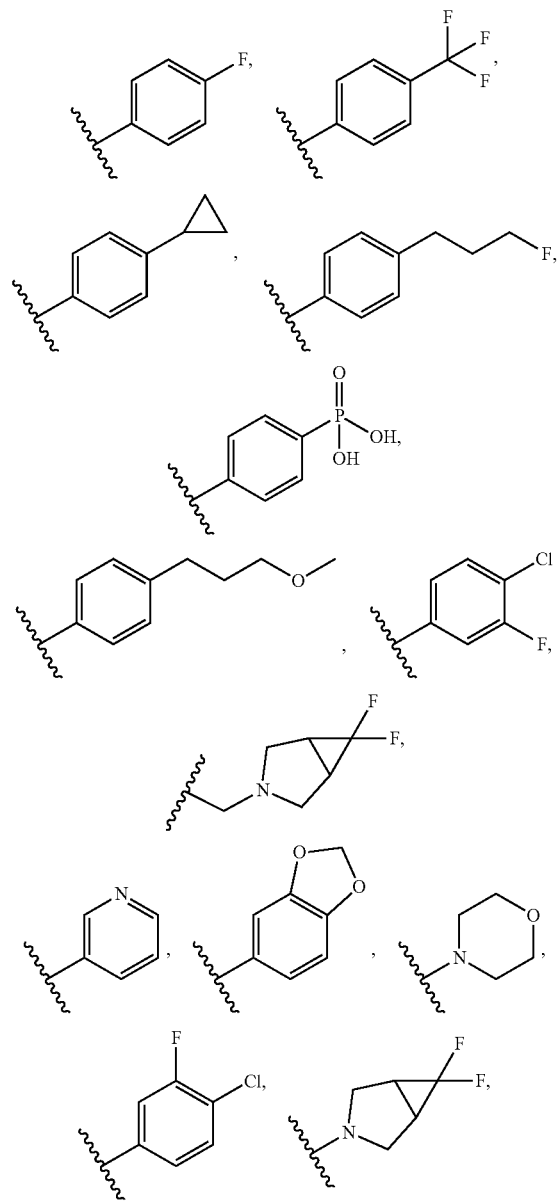

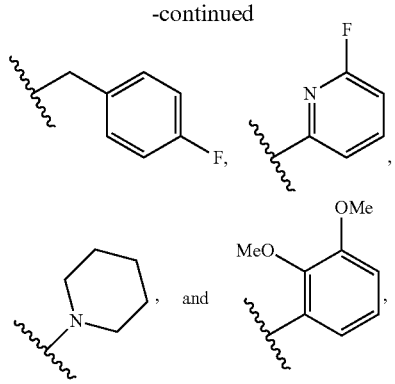

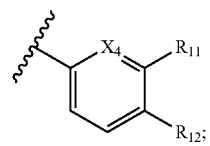

$R_5$, when optionally present, can be selected from the group of: H, $H_2$, —CN; $R_6$, when optionally present, can be selected from the group of: H, $H_2$, nitrile, and $CH_3$; $R_7$ can be H or $CH_3$; $R_8$, when optionally present, can be $H_2$ or $CH_3$; $R_9$ can be $H_2$ or =O; $R_{10}$, when optionally present, can be H or $H_2$; $X_1$ and $X_5$ can each be individually selected from the group of: C, N, and O; $X_2$ and $X_3$ can each be individually selected from the group of: C and N; and $X_4$ can be N or CH.

In some embodiments, $R_1$ can be $H_2$, $R_2$ is O or S; $R_3$ can be O; $R_4$ can be $X_4$ can be N or CH; $R_{11}$ can be F, OMe, or H; and Rig can be F, $CF_3$, $C_1$, OMe, cyclopropyl, —$(CH_2)_3F$, (—$CH_2$)$_3$OMe, or $PO(OH)_2$.

In some embodiments, the compound can be any of compounds (1)-(41) (see e.g. Table 1).

In some embodiments, the compound can be selective for a tri-heteromeric N-methyl-D-aspartate (NMDA) receptor. In some embodiments, the tri-heteromeric NMDA receptor can be GluN1/2A/2B. In some embodiments, the compound is selective for one or more NMDA subunits. Such subunits are described elsewhere herein.

In some embodiments, the compound can be a biased allosteric modulator of an N-methyl-D-aspartate (NMDA) receptor. In some embodiments, the compound can be a biased allosteric modulator of a tri-heteromeric N-methyl-D-aspartate (NMDA) receptor. In some embodiments, the tri-heteromeric NMDA receptor can be GluN1/2A/2B.

In some embodiments, the biased modulator or biased allosteric modulator compound can cause a first effect on an NMDA receptor or subunit at a first concentration or dosage (or range) and a second effect on the NMDA receptor or subunit at a second concentration. In any case the first concentration or dosage (or range thereof) is different than the second concentration or dosage (or range thereof). In some embodiments, the first concentration can range from about 0 to 10, 20, 30, 40, 50, 60, 70, 80, 90, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, 750, 760, 770, 780, 790, 800, 810, 820, 830, 840, 850, 860, 870, 880, 890, 900, 910, 920, 930, 940, 950, 960, 970, 980, 990, 1000 pM, nM µM, mM, or M or be any numerical value with any of these ranges. In some embodiments, the second concentration range can range from about 0 to 10, 20, 30, 40, 50, 60, 70, 80, 90, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, 750, 760, 770, 780, 790, 800, 810, 820, 830, 840, 850, 860, 870, 880, 890, 900, 910, 920, 930, 940, 950, 960, 970, 980, 990, 1000 pM, nM µM, mM, or M or be any numerical value with any of these ranges. In some embodiments, the first effect can be to increase the expression, function, and/or activity of an NMDA receptor or subunit, or decrease the expression, function, an/or activity of an NMDA receptor or subunit and the second effect can be to increase the expression, function, and/or activity of an NMDA receptor or subunit, or decrease the expression, function, an/or activity of an NMDA receptor or subunit. In any case, it will be appreciated that the first and second effect are different than each other.

Methods of Making the NMDA Modulators

The compounds and derivatives thereof can be synthesized via many methods generally known to those of ordinary skill in the art. The present disclosure is not intended to be limited by the particular methods of synthesizing the compounds described herein. The skilled artisan will recognize additional methods of synthesizing the compounds described herein.

Figure 20:
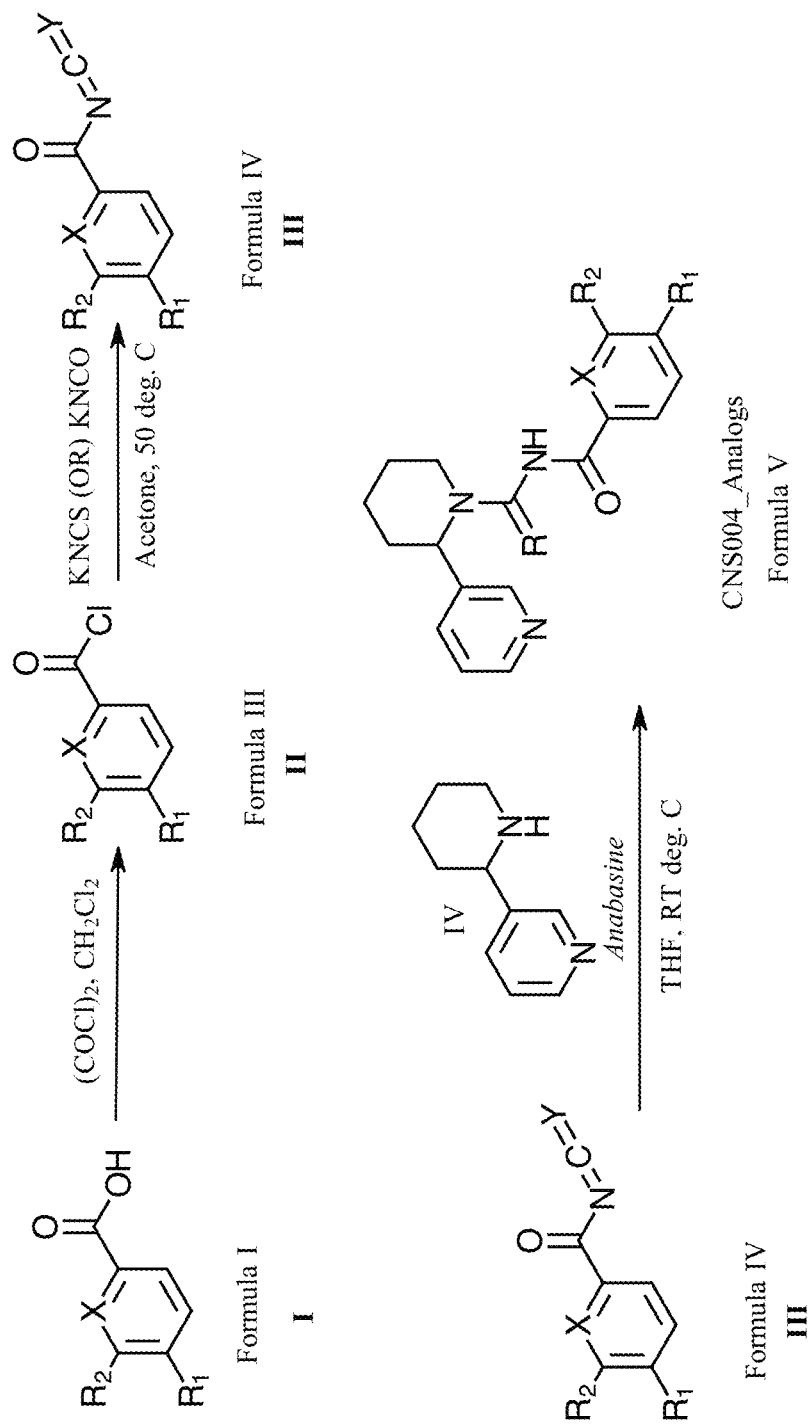
FIG. 20 shows a general synthesis scheme (Scheme I) for synthesis of one or more of the compounds described herein.

In some embodiments, for example, one or more of the compounds can be synthesized using the general synthesis Scheme I shown in FIG. 20. Modifications of Scheme I to generate the compounds described herein will be appreciated by one of ordinary skill in the art in view of this disclosure.

Pharmaceutical Formulations

Also described herein are pharmaceutical formulations that can contain an amount, effective amount, and/or least effective amount, or a biased amount, of one or more compounds according to Formula I as described in greater detail herein and a structural analogue thereof and a pharmaceutically acceptable carrier. In some embodiments, the compound can be present in the pharmaceutical formulation as a pharmaceutically acceptable salt. In some embodiments, the compound(s) can be any one or more of compounds 1-41 as described elsewhere herein or a structural analogue thereof.

The compounds described herein can be provided to a subject in need thereof as an ingredient, such as an active ingredient, in a pharmaceutical formulation. As such, also described are pharmaceutical formulations containing one or more of the compounds and salts thereof, or pharmaceutically acceptable salts thereof described herein. Suitable salts include, hydrobromide, iodide, nitrate, bisulfate, phosphate, isonicotinate, lactate, salicylate, acid citrate, tartrate, oleate, tannate, pantothenate, bitartrate, ascorbate, succinate, maleate, gentisinate, fumarate, gluconate, glucaronate, saccharate, formate, benzoate, glutamate, methanesulfonate, ethanesulfonate, benzenesulfonate, p-toluenesulfonate, camphorsulfonate, napthalenesulfonate, propionate, malonate, mandelate, malate, phthalate, and pamoate.

The pharmaceutical formulations described herein can be administered via any suitable method to a subject in need thereof. In some embodiments, the subject in need thereof has or is suspected of having an NMDA receptor-mediated disease or a symptom thereof. In some embodiments, the subject in need thereof of has or is suspected of having a DH or a TH NMDA receptor-mediated disease or a symptom thereof. In some embodiments, the subject in need thereof has or is suspected of having, a neurobiological disease or disorder, a psychiatric disease or disorder, a cancer, an autoimmune disease or disorder, a thrombosis disease, a heart disease, a kidney disease, a lung disease, or a blood vessel disease, or a combination thereof Pharmaceutically Acceptable Carriers and Auxiliary Ingredients and Agents The pharmaceutical formulations containing an amount, such as an effective amount, least effective amount, biased effective amount, and/or pharmaceutically effective amount of a compound described herein or a derivative thereof can further include a pharmaceutically acceptable carrier. Suitable pharmaceutically acceptable carriers include, but are not limited to water, salt solutions, alcohols, gum arabic, vegetable oils, benzyl alcohols, polyethylene glycols, gelatin, carbohydrates such as lactose, amylose or starch, magnesium stearate, talc, silicic acid, viscous paraffin, perfume oil, fatty acid esters, hydroxy methylcellulose, and polyvinyl pyrrolidone, which do not deleteriously react with the active composition.

The pharmaceutical formulations can be sterilized, and if desired, mixed with auxiliary agents, such as lubricants, preservatives, stabilizers, wetting agents, emulsifiers, salts for influencing osmotic pressure, buffers, coloring, flavoring and/or aromatic substances, and the like which do not deleteriously react with the active compound.

In addition to the amount of a compound and/or derivative thereof, the pharmaceutical formulations can also include an effective amount of auxiliary active agents, including but not limited to, antisense or RNA interference molecules, chemotherapeutics, or antineoplasic agents, hormones, antibiotics, antivirals, immunomodulating agents, antinausea, pain modifying compounds (such as opiates), anti-inflammatory agents, antipyretics, antibiotics, and/or antibodies or fragments thereof.

In some embodiments, the auxiliary active agent is an NMDA receptor agonist, antagonist, or other modulators (in addition to the compounds of the present invention described herein). Exemplary NMDA receptor agonists, antagonists, or other modulators that can be included in the pharmaceutical formulations described herein are discussed in greater detail below.

Effective Amounts of the NMDA Receptor Modulating Compounds and Auxiliary Active Agents In some embodiments, the effective amount, least effective amount, biased effective amount, and/or pharmaceutically effective amount of the NMDA receptor modulating compound (such as any of the compounds described elsewhere herein) or a structural analogue thereof can be a selective modulator, a biased modulator and/or a biased allosteric modulator of an NMDA receptor or subunit. This is also described in greater detail elsewhere herein. The effective amount, least effective amount, biased effective amount, and/or pharmaceutically effective amount of the NMDA receptor modulating compound described elsewhere herein or a structural analogue thereof contained in the pharmaceutical formulation can range from about 0 to 10, 20, 30, 40, 50, 60, 70, 80, 90, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, 750, 760, 770, 780, 790, 800, 810, 820, 830, 840, 850, 860, 870, 880, 890, 900, 910, 920, 930, 940, 950, 960, 970, 980, 990, 1000 pg, ng, µg, mg, or g or be any numerical value with any of these ranges.

In some embodiments, the effective concentration can range from about 0 to 10, 20, 30, 40, 50, 60, 70, 80, 90, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, 750, 760, 770, 780, 790, 800, 810, 820, 830, 840, 850, 860, 870, 880, 890, 900, 910, 920, 930, 940, 950, 960, 970, 980, 990, 1000 pM, nM, µM, mM, or M or be any numerical value with any of these ranges. In embodiments, where the amount is a biased effective amount the first biased effective amount and the second biased effective amount can each range from about 0 to 10, 20, 30, 40, 50, 60, 70, 80, 90, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, 750, 760, 770, 780, 790, 800, 810, 820, 830, 840, 850, 860, 870, 880, 890, 900, 910, 920, 930, 940, 950, 960, 970, 980, 990, 1000 pg, ng, µg, mg, or g or be any numerical value with any of these ranges, where the first and second biased effective amount are not the same amount or range. In some embodiments, the first biased effective and the second biased effective concentration can each range from about 0 to 10, 20, 30, 40, 50, 60, 70, 80, 90, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, 750, 760, 770, 780, 790, 800, 810, 820, 830, 840, 850, 860, 870, 880, 890, 900, 910, 920, 930, 940, 950, 960, 970, 980, 990, 1000 pM, nM, µg, mM, or M or be any numerical value with any of these ranges, where the first biased effective concentration or range is not the same as the second biased effective concentration or range.

In embodiments where there is an auxiliary active agent contained in the pharmaceutical formulation, the effective amount of the auxiliary active agent will vary depending on the auxiliary active agent. In some embodiments, the auxiliary active agent can be an NMDA receptor agonist or antagonist. In some embodiments, the auxiliary active agent can be an endogenous NMDA receptor agonist, partial agonists, or antagonist. In some embodiments, the endogenous NMDA receptor agonist can be glycine, glutamate or a combination thereof. Other suitable NMDA receptor agonists, partial agonist, allosteric modulators and the like that can be administered or included in the pharmaceutical formulation as an auxiliary active ingredient can include, but are not limited to aspartate, alanine (D-alanine and L-alanine), homocysteic acid, ibotenic acid, milacemide, quinolinic acid, sarcosine, serine (D- and L-serine), spermidine, spermine, tetrazolyglycine, cerebrosterol, cholesterol, dehydroepiandrosterone, dehydroepiandrosterone sulfate, nebostinel, pregnenolone sulfate, memantine and derivatives thereof (e.g. neramexane), N-methyl-D-aspartic acid, 3,5-Dibromo-L-phenylalanine, rapastinel (GLYX-13) and apimostinel (NRX-1074), Aminocyclopropanecarboxylic acid, cycloserine, HA-966, and homoquinolinic acid. Suitable antagonists include, but are not limited to, 4-Chlorokynurenine, 7-Chlorokynurenic acid, agmatine, argiotoxin-636, APS, AP7, CGP-37849, Delucemine, Dextromethorphan, dextrorphan, dexanabinol, diethyl ether, diphenidine, dizocilpine, eliprodil, esketamine, hodgkinsine, ifenprodil, kaitocephalin, ketamine, kynurenic acid, lanicemine, LY-235959, Memantine, methoxetamine, medafotel, nitrous oxide, PEAQX, Perzinfotel, phencyclidine, phenylalanine, psychotridine, selfotel, tiletamine, traxoprodil, xenon, amantadine, atomoxetine, dextropropoxyphene, ethanol, guaifenesin, huperzine A, ibogaine, ketobemidone, methadone, minocycline, tramadol, nitromemantine, 25-hydroxycholesterol, conantokins, aminoglycosides, CDKS, polyamines, reelin, and major histocompatibility complex proteins.

In some embodiments, the effective amount of the auxiliary active agent can range from 0 to 10, 20, 30, 40, 50, 60, 70, 80, 90, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, 750, 760, 770, 780, 790, 800, 810, 820, 830, 840, 850, 860, 870, 880, 890, 900, 910, 920, 930, 940, 950, 960, 970, 980, 990, 1000 pg, ng, µg, mg, or g or be any numerical value with any of these ranges. In other embodiments, the effective amount of the auxiliary active agent can range from about 0 to 10, 20, 30, 40, 50, 60, 70, 80, 90, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, 750, 760, 770, 780, 790, 800, 810, 820, 830, 840, 850, 860, 870, 880, 890, 900, 910, 920, 930, 940, 950, 960, 970, 980, 990, 1000 IU or be any numerical value with any of these ranges. In further embodiments, the effective amount of the auxiliary active agent can range from 0 to 10, 20, 30, 40, 50, 60, 70, 80, 90, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, 750, 760, 770, 780, 790, 800, 810, 820, 830, 840, 850, 860, 870, 880, 890, 900, 910, 920, 930, 940, 950, 960, 970, 980, 990, 1000 pL, nL, µL, mL, or L or be any numerical value with any of these ranges. In some embodiments, the concentration of the auxiliary active agent can range from about 0 to 10, 20, 30, 40, 50, 60, 70, 80, 90, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, 750, 760, 770, 780, 790, 800, 810, 820, 830, 840, 850, 860, 870, 880, 890, 900, 910, 920, 930, 940, 950, 960, 970, 980, 990, 1000 pM, nM, µM, mM, or M or be any numerical value with any of these ranges. In yet other embodiments, the effective amount of the auxiliary active agent can range from about 0, to 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 99.1, 99.2, 99.3, 99.4, 99.5, 99.6, 99.7, 99.8, 99.9% w/w, v/v, or w/v of the total pharmaceutical formulation.

In some embodiments, the effective amount of the NMDA modulating compound of the present invention can range from about, 0, to 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 99.1, 99.2, 99.3, 99.4, 99.5, 99.6, 99.7, 99.8, 99.9% w/w, v/v, or w/v of the total pharmaceutical formulation.

The auxiliary active agent can be included in the pharmaceutical formulation or can exist as a stand-alone compound or pharmaceutical formulation that can be administered contemporaneously or sequentially with the compound, derivative thereof, or pharmaceutical formulation thereof. In embodiments where the auxiliary active agent is a stand-alone compound or pharmaceutical formulation, the effective amount of the auxiliary active agent can vary depending on the auxiliary active agent used. In some of these embodiments, the effective amount of the auxiliary active agent can range from 0 to 10, 20, 30, 40, 50, 60, 70, 80, 90, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, 750, 760, 770, 780, 790, 800, 810, 820, 830, 840, 850, 860, 870, 880, 890, 900, 910, 920, 930, 940, 950, 960, 970, 980, 990, 1000 pg, ng, µg, mg, or g or be any numerical value with any of these ranges. In other embodiments, the effective amount of the auxiliary active agent can range from about 0 to 10, 20, 30, 40, 50, 60, 70, 80, 90, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, 750, 760, 770, 780, 790, 800, 810, 820, 830, 840, 850, 860, 870, 880, 890, 900, 910, 920, 930, 940, 950, 960, 970, 980, 990, 1000 IU or be any numerical value with any of these ranges. In some embodiments, the concentration of the auxiliary active agent can range from about 0 to 10, 20, 30, 40, 50, 60, 70, 80, 90, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, 750, 760, 770, 780, 790, 800, 810, 820, 830, 840, 850, 860, 870, 880, 890, 900, 910, 920, 930, 940, 950, 960, 970, 980, 990, 1000 pM, nM, µM, mM, or M or be any numerical value with any of these ranges. In further embodiments, the effective amount of the auxiliary active agent can range from 0 to 10, 20, 30, 40, 50, 60, 70, 80, 90, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, 750, 760, 770, 780, 790, 800, 810, 820, 830, 840, 850, 860, 870, 880, 890, 900, 910, 920, 930, 940, 950, 960, 970, 980, 990, 1000 pL, nL, µL, mL, or L or be any numerical value with any of these ranges. In yet other embodiments, the effective amount of the auxiliary active agent can range from about, to 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 99.1, 99.2, 99.3, 99.4, 99.5, 99.6, 99.7, 99.8, 99.9% w/w, v/v, or w/v of the total auxiliary active agent pharmaceutical formulation. In additional embodiments, the effective amount of the auxiliary active agent can range from about, to 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 99.1, 99.2, 99.3, 99.4, 99.5, 99.6, 99.7, 99.8, 99.9% w/w, v/v, or w/v of the total pharmaceutical formulation.

Dosage Forms

In some embodiments, the pharmaceutical formulations described herein can be in a dosage form. The dosage form can be administered to a subject in need thereof. The dosage form can be effective generate specific concentration, such as an effective concentration, at a given site in the subject in need thereof. In some cases, the dosage form contains a greater amount of the active ingredient than the final intended amount needed to reach a specific region or location within the subject to account for loss of the active components such as via first and second pass metabolism.

The dosage forms can be adapted for administration by any appropriate route. Appropriate routes include, but are not limited to, oral (including buccal or sublingual), rectal, intraocular, inhaled, intranasal, topical (including buccal, sublingual, or transdermal), vaginal, parenteral, subcutaneous, intramuscular, intravenous, internasal, and intradermal. Other appropriate routes are described elsewhere herein. Such formulations can be prepared by any method known in the art.

Dosage forms adapted for oral administration can discrete dosage units such as capsules, pellets or tablets, powders or granules, solutions, or suspensions in aqueous or non-aqueous liquids; edible foams or whips, or in oil-in-water liquid emulsions or water-in-oil liquid emulsions. In some embodiments, the pharmaceutical formulations adapted for oral administration also include one or more agents which flavor, preserve, color, or help disperse the pharmaceutical formulation. Dosage forms prepared for oral administration can also be in the form of a liquid solution that can be delivered as a foam, spray, or liquid solution.

The oral dosage form can be administered to a subject in need thereof.

Where appropriate, the dosage forms described herein can be microencapsulated.

The dosage form can also be prepared to prolong or sustain the release of any ingredient. In some embodiments, a compound described herein (e.g. an NMDA modulating compound), auxiliary active ingredient, and/or pharmaceutically acceptable salt thereof can be the ingredient whose release is delayed. Suitable methods for delaying the release of an ingredient include, but are not limited to, coating or embedding the ingredients in material in polymers, wax, gels, and the like. Delayed release dosage formulations can be prepared as described in standard references such as "Pharmaceutical dosage form tablets," eds. Liberman et. al. (New York, Marcel Dekker, Inc., 1989), "Remington—The science and practice of pharmacy", 20th ed., Lippincott Williams & Wlkins, Baltimore, MD, 2000, and "Pharmaceutical dosage forms and drug delivery systems", 6th Edition, Ansel et al., (Media, PA: Wlliams and Wlkins, 1995). These references provide information on excipients, materials, equipment, and processes for preparing tablets and capsules and delayed release dosage forms of tablets and pellets, capsules, and granules. The delayed release can be anywhere from about an hour to about 3 months or more.

Examples of suitable coating materials include, but are not limited to, cellulose polymers such as cellulose acetate phthalate, hydroxypropyl cellulose, hydroxypropyl methylcellulose, hydroxypropyl methylcellulose phthalate, and hydroxypropyl methylcellulose acetate succinate; polyvinyl acetate phthalate, acrylic acid polymers and copolymers, and methacrylic resins that are commercially available under the trade name EUDRAGIT® (Roth Pharma, Westerstadt, Germany), zein, shellac, and polysaccharides.

Coatings may be formed with a different ratio of water soluble polymer, water insoluble polymers, and/or pH dependent polymers, with or without water insoluble/water soluble non polymeric excipient, to produce the desired release profile. The coating is either performed on the dosage form (matrix or simple) which includes, but is not limited to, tablets (compressed with or without coated beads), capsules (with or without coated beads), beads, particle compositions, "ingredient as is" formulated as, but not limited to, suspension form or as a sprinkle dosage form.

Where appropriate, the dosage forms described herein can be a liposome. In these embodiments, compound, derivative thereof, auxiliary active ingredient, and/or pharmaceutically acceptable salt thereof are incorporated into a liposome. In some embodiments, a compound described herein (e.g. an NMDA modulator), auxiliary active ingredient, and/or pharmaceutically acceptable salt thereof can be integrated into the lipid membrane of the liposome. In other embodiments, a compound described herein (e.g. an NMDA modulator), derivative thereof, auxiliary active ingredient, and/or pharmaceutically acceptable salt thereof are contained in the aqueous phase of the liposome. In embodiments where the dosage form is a liposome, the pharmaceutical formulation is thus a liposomal formulation.

The liposomal formulation can be administered to a subject in need thereof.

Dosage forms adapted for topical administration can be formulated as ointments, creams, suspensions, lotions, powders, solutions, pastes, gels, sprays, aerosols, or oils. In some embodiments for treatments of the eye or other external tissues, for example the mouth or the skin, the pharmaceutical formulations are applied as a topical ointment or cream. When formulated in an ointment, a compound described herein (e.g. an NMDA modulator), auxiliary active ingredient, and/or pharmaceutically acceptable salt thereof can be formulated with a paraffinic or water-miscible ointment base. In other embodiments, the active ingredient can be formulated in a cream with an oil-in-water cream base or a water-in-oil base. Dosage forms adapted for topical administration in the mouth include lozenges, pastilles, and mouth washes.

Dosage forms adapted for nasal or inhalation administration include aerosols, solutions, suspension drops, gels, or dry powders. In some embodiments, the compound, derivative thereof, auxiliary active ingredient, and/or pharmaceutically acceptable salt thereof in a dosage form adapted for inhalation is in a particle-size-reduced form that is obtained or obtainable by micronization. In some embodiments, the particle size of the size reduced (e.g. micronized) compound or salt or solvate thereof, is defined by a $D_{50}$ value of about 0.5 to about 10 microns as measured by an appropriate method known in the art. Dosage forms adapted for administration by inhalation also include particle dusts or mists. Suitable dosage forms wherein the carrier or excipient is a liquid for administration as a nasal spray or drops include aqueous or oil solutions/suspensions of an active ingredient, which may be generated by various types of metered dose pressurized aerosols, nebulizers, or insufflators.

The nasal/inhalation formulations can be administered to a subject in need thereof.

In some embodiments, the dosage forms are aerosol formulations suitable for administration by inhalation. In some of these embodiments, the aerosol formulation contains a solution or fine suspension of a compound described herein (e.g. an NMDA modulator) or a structural analogue thereof, auxiliary active ingredient, and/or pharmaceutically acceptable salt thereof and a pharmaceutically acceptable aqueous or non-aqueous solvent. Aerosol formulations can be presented in single or multi-dose quantities in sterile form in a sealed container. For some of these embodiments, the sealed container is a single dose or multi-dose nasal or an aerosol dispenser fitted with a metering valve (e.g. metered dose inhaler), which is intended for disposal once the contents of the container have been exhausted.

Where the aerosol dosage form is contained in an aerosol dispenser, the dispenser contains a suitable propellant under pressure, such as compressed air, carbon dioxide, or an organic propellant, including but not limited to a hydrofluorocarbon. The aerosol formulation dosage forms in other embodiments are contained in a pump-atomizer. The pressurized aerosol formulation can also contain a solution or a suspension of a compound, derivative thereof, auxiliary active ingredient, and/or pharmaceutically acceptable salt thereof. In further embodiments, the aerosol formulation also contains co-solvents and/or modifiers incorporated to improve, for example, the stability and/or taste and/or fine particle mass characteristics (amount and/or profile) of the formulation. Administration of the aerosol formulation can be once daily or several times daily, for example 2, 3, 4, or 8 times daily, in which 1, 2, or 3 doses are delivered each time. The aerosol formulations can be administered to a subject in need thereof.

For some dosage forms suitable and/or adapted for inhaled administration, the pharmaceutical formulation is a dry powder inhalable formulations. In addition to the compound described herein (e.g. an NMDA modulator) or a structural analogue thereof, auxiliary active ingredient, and/or pharmaceutically acceptable salt thereof, such a dosage form can contain a powder base such as lactose, glucose, trehalose, manitol, and/or starch. In some of these embodiments, the compound, derivative thereof, auxiliary active ingredient, and/or pharmaceutically acceptable salt thereof is in a particle-size reduced form. In further embodiments, a performance modifier, such as L-leucine or another amino acid, cellobiose octaacetate, and/or metals salts of stearic acid, such as magnesium or calcium stearate.

In some embodiments, the aerosol formulations are arranged so that each metered dose of aerosol contains a predetermined amount of an active ingredient, such as the one or more of the compounds described herein.

Dosage forms adapted for vaginal administration can be presented as pessaries, tampons, creams, gels, pastes, foams, or spray formulations. Dosage forms adapted for rectal administration include suppositories or enemas. The vaginal formulations can be administered to a subject in need thereof.

Dosage forms adapted for parenteral administration and/or adapted for injection can include aqueous and/or non-aqueous sterile injection solutions, which can contain antioxidants, buffers, bacteriostats, solutes that render the composition isotonic with the blood of the subject, and aqueous and non-aqueous sterile suspensions, which can include suspending agents and thickening agents. The dosage forms adapted for parenteral administration can be presented in a single-unit dose or multi-unit dose containers, including but not limited to sealed ampoules or vials. The doses can be lyophilized and re-suspended in a sterile carrier to reconstitute the dose prior to administration. Extemporaneous injection solutions and suspensions can be prepared in some embodiments, from sterile powders, granules, and tablets.

The parenteral formulations can be administered to a subject in need thereof.

For some embodiments, the dosage form contains a predetermined amount of a a compound described herein (e.g. an NMDA modulator) or a structural analogue thereof, auxiliary active ingredient, and/or pharmaceutically acceptable salt thereof per unit dose. In an embodiment, the predetermined amount of the compound described herein (e.g. an NMDA modulator), auxiliary active ingredient, and/or pharmaceutically acceptable salt thereof can be an effective amount, a least effect amount, biased effective amount, and/or a pharmaceutically effective amount. In some aspects, the predetermined amount can be effective to modulate an NMDA receptor or a subunit thereof. In some aspects, the predetermined amount can be effective, to selectively modulate an NMDA receptor or a subunit thereof. In some embodiments, the predetermined amount can be effective to increase the expression, activity, and/or function of an NMDA receptor. In some embodiments, the predetermined amount can be effective decrease the expression, activity, and/or function of an NMDA receptor.

In other embodiments, the predetermined amount of the compound and/or derivative thereof can be an appropriate fraction of the effective amount of the active ingredient. Such unit doses may therefore be administered once or more than once a day, month, or year (e.g. 1, 2, 3, 4, 5, 6, or more times per day, month, or year). Such pharmaceutical formulations may be prepared by any of the methods well known in the art.

Kits

The pharmaceutical formulations provided herein can be presented as a combination kit. As used herein, the terms "combination kit" or "kit of parts" refers to the compounds, or pharmaceutical formulations and additional components that are used to package, sell, market, deliver, and/or administer the combination of elements or a single element, such as the active ingredient, contained therein. Such additional components include but are not limited to, packaging, syringes, blister packages, bottles, and the like. When one or more of the components (e.g. active agents) contained in the kit are administered simultaneously, the combination kit can contain the active agents in a single pharmaceutical formulation (e.g. a tablet) or in separate pharmaceutical formulations.

When the agents are not administered simultaneously, the combination kit can contain each agent in separate pharmaceutical formulations. The separate pharmaceutical formulations can be contained in a single package or in separate packages within the kit. In some embodiments, the combination kit also includes instructions printed on or otherwise contained in a tangible medium of expression. The instructions can provide information regarding the content of the compound or pharmaceutical formulations contained therein, safety information regarding the content of the compound(s) or pharmaceutical formulation(s) contained therein, information regarding the dosages, indications for use, and/or recommended treatment regimen(s) for the compound(s) and/or pharmaceutical formulations contained therein. In some embodiments, the instructions can provide directions for administering the compounds, pharmaceutical formulations, or salts thereof to a subject having an NMDA-mediated disease or disorder. In some aspects, the instructions can provide directions for administering the compounds, pharmaceutical formulations, or salts thereof to a subject having an NMDA-mediate disease or disorder. In some aspects, the kit provides a co-therapeutic, such as a separate auxiliary active ingredient. In some aspects the auxiliary active ingredient is an NMDA receptor agonist, antagonist, or other modulator. Such auxiliary active ingredients are described elsewhere herein. In some aspects, the instructions include information and recommended treatment regimens for these auxiliary active agents and any combination effect these may have on the efficacy of the NMDA modulator compound or any changes to dosing of the NMDA modulator and/or auxiliary ingredient when the two are used in combination. In some aspects the kit further includes an auxiliary active agent. In some embodiments, the auxiliary active agent is an NMDA receptor antagonist, agonist, or other NMDA receptor modulator. Exemplary auxiliary NMDA receptor antagonists, agonists or other NMDA receptor modulators are discussed in greater detail elsewhere herein.

Methods of Modulating NMDA Receptors and Treating NMDA-Receptor Mediated Diseases Any amount of the compounds (e.g. NMDA modulating compounds) and pharmaceutical formulations described herein can be administered to a subject in need thereof one or more times per day, week, month, or year. In some embodiments, the pharmaceutical formulation administered contains an effective amount, a least effective amount, biased effective amount and/or a pharmaceutically effective amount of the compound of any one of Formula I or any other compound described herein or a structural analogue thereof. For example, the pharmaceutical formulations can be administered in a daily dose. This amount may be given in a single dose per day. In other embodiments, the daily dose may be administered over multiple doses per day, in which each containing a fraction of the total daily dose to be administered (sub-doses). In some embodiments, the number of doses delivered per day is 2, 3, 4, 5, or 6. In further embodiments, the compounds, formulations, or salts thereof are administered one or more times per week, such as 1, 2, 3, 4, 5, or 6 times per week. In other embodiments, the compounds, formulations, or salts thereof are administered one or more times per month, such as 1 to 5 times per month. In still further embodiments, the compounds, formulations, or salts thereof are administered one or more times per year, such as 1 to 11 times per year.

Neurological disorders affect more than 50 million Americans each year. It is increasingly recognized that many neurological and psychiatric disorders are linked to synaptic defects mediated by the dysfunction of NMDAR (Traynelis, S. F., *Glutamate receptor ion channels: structure, regulation, and function*. Pharmacol. Rev., 2010. 62: p. 405-496 and Paoletti, P., C. Bellone, and Q. Zhou, *NMDA receptor subunit diversity: impact on receptor properties, synaptic plasticity and disease*. Nature Rev. Neurosci., 2013. 14: p. 383-400). Direct contribution of NMDAR dysfunction is well-studied in the following brain disorders: stroke (Lai, T.

W., W. C. Shyu, and Y. T. Wang, *Stroke intervention pathways: NMDA receptors and beyond*. Trends Mol Med, 2011. 17(5): p. 266-75, 2131065), neuropathic pain (Matsumura, S., et al., *Impairment of CaMKII activation and attenuation of neuropathic pain in mice lacking NR2B phosphorylated at Tyr1472*. Eur J Neurosci, 2010. 32(5): p. 798-810, 20722721), Alzheimer's disease (Kotermanski, S. E. and J. W. Johnson, *Mg2+ imparts NMDA receptor subtype selectivity to the Alzheimer's drug memantine*. J Neurosci, 2009. 29(9): p. 2774-9, 19261873, PMC2679254), Huntington's disease (Milnerwood, A. J. and L. A. Raymond, *Early synaptic pathophysiology in neurodegeneration: insights from Huntington's disease*. Trends Neurosci, 2010. 33(11): p. 513-23, 20850189), Parkinson's disease (Sgambato-Faure, V. and M. A. Cenci, *Glutamatergic mechanisms in the dyskinesias induced by pharmacological dopamine replacement and deep brain stimulation for the treatment of Parkinson's disease*. Prog Neurobiol, 2012. 96(1): p. 69-86, 22075179), traumatic brain injury (Wortzel, H. S. and D. B. Arciniegas, *Treatment of post-traumatic cognitive impairments*. Curr Treat Options Neurol, 2012. 14(5): p. 493-508, 22865461, 3437653), post-traumatic stress disorder (Yamamoto, S., et al., *Effects of single prolonged stress and D-cycloserine on contextual fear extinction and hippocampal NMDA receptor expression in a rat model of PTSD*. Neuropsychopharmacology, 2008. 33(9): p. 2108-16, 17957211), white matter injury (Henson, M. A., et al., *Influence of the NR3A subunit on NMDA receptor functions*. Prog Neurobiol, 2010. 91(1): p. 23-37, 20097255, 2883719), autism spectrum disorders (Won, H., et al., *Autistic-like social behaviour in Shank2-mutant mice improved by restoring NMDA receptor function*. Nature, 2012. 486(7402): p. 261-5, 22699620), depression (Autry, A. E., et al., *NMDA receptor blockade at rest triggers rapid behavioural antidepressant responses*. Nature, 2011. 475(7354): p. 91-5, 21677641, 3172695), cognitive impairments (Parsons, C. G., A. Stoffler, and W. Danysz, *Memantine: a NMDA receptor antagonist that improves memory by restoration of homeostasis in the glutamatergic system—too little activation is bad, too much is even worse*. Neuropharmacology, 2007. 53(6): p. 699-723, 17904591), schizophrenia (Moghaddam, B. and D. Javitt, *From revolution to evolution: the glutamate hypothesis of schizophrenia and its implication for treatment*. Neuropsychopharmacology, 2012. 37(1): p. 4-15, 21956446, 3238069), epilepsy (Niimura, M., et al., *Changes in phosphorylation of the NMDA receptor in the rat hippocampus induced by status epilepticus*. J Neurochem, 2005. 92(6): p. 1377-85, 15748156), and anti-NMDAR encephalopathy (Dalmau, J., et al., *Anti-NMDA-receptor encephalitis: case series and analysis of the effects of antibodies*. Lancet Neurol, 2008. 7(12): p. 1091-8, 18851928, 2607118). In some embodiments, the compound(s) and pharmaceutical formulation(s) described herein can be administered to a subject to treat a neurologic disease or psychiatric disease where NMDA receptors mediate pathogenesis of the disease, including, but not limited to the diseases mentioned above.

Increasing number of studies report the direct involvement of NMDA receptors in various stages of cancer, including uncontrolled proliferation, metastasis and invasiveness. Particularly NMDA receptors are reported to play crucial role in brain cancers, such as glioblastoma. See e.g. Zeng, Q., et al., Synaptic proximity enables NMDAR signaling to promote brain metastasis. Nature, 2019. 573 (7775): p. 526-531, 31534217 and Muller-Langle, A., et al., NMDA Receptor-Mediated Signaling Pathways Enhance Radiation Resistance, Survival and Migration in Glioblastoma Cells-A Potential Target for Adjuvant Radiotherapy. Cancers (Basel), 2019. 11(4), 30970642, PMC6520759. In some embodiments, the compound(s) and pharmaceutical formulation(s) described herein can be administered to a subject to treat a cancer where NMDA receptors mediate pathogenesis of disease, such as brain and other cancers.

In some embodiments, the compounds and pharmaceutical formulations thereof described herein can have an anti-thrombic effect. NMDA receptors are expressed in platelets. See e.g. Kalev-Zylinska, M. L., et al., *N-methyl-D-aspartate receptors amplify activation and aggregation of human platelets*. Thromb Res, 2014. 133(5): p. 837-47, 24593912. Modifying NMDA receptors in platelets can therefore be helpful to treat bleeding disorders. In some embodiments, the compound(s) and pharmaceutical formulation(s) described herein can be administered to a subject to treat a bleeding disease or disorder where NMDA receptors mediate pathogenesis of disease.

NMDA receptors can play a role in autoimmune diseases. For example, NMDA receptors are involved in autoimmune disorders including Systemic Lupus Erythematosus (Schwarting, A., et al., *Fatigue in SLE: diagnostic and pathogenic impact of anti-N-methyl-D-aspartate receptor (NMDAR) autoantibodies*. Ann Rheum Dis, 2019. 78(9): p. 1226-1234, 31186256). In some embodiments, the compound(s) and pharmaceutical formulation(s) described herein can be administered to a subject to treat an autoimmune disease or disorder where NMDA receptors mediate pathogenesis of disease, including but not limited to, SLE.

NMDA receptors can play a role in heart diseases. For example, the involvement of NMDA receptors in cardiac function has been recently demonstrated in the experimental animals, thus dysfunction of the NMDA receptors can lead to heart diseases. See e.g. Makhro, A., et al., *Cardiac N-methyl D-aspartate Receptors as a Pharmacological Target*. J Cardiovasc Pharmacol, 2016. 68(5): p. 356-373, 27525575). In some embodiments, the compound(s) and pharmaceutical formulation(s) described herein can be administered to a subject to treat cardiac or heart disease or disorder where NMDA receptors mediate pathogenesis of disease.

NMDA receptors can play a role in renal diseases. For example, renal NMDA receptors independently stimulate proximal reabsorption and glomerular filtration (Deng, A. and S. C. Thomson, *Renal NMDA receptors independently stimulate proximal reabsorption and glomerular filtration*. Am J Physiol Renal Physiol, 2009. 296(5): p. F976-82, 19279130, PMC2681359). Thus, dysfunction of the renal NMDA receptors can lead to renal diseases. In some embodiments, the compound(s) and pharmaceutical formulation(s) described herein can be administered to a subject to treat a renal or kidney disease or disorder where NMDA receptors mediate pathogenesis of disease.

NMDA receptors play a role in vascular remodeling and have been shown to be involved in the development of pulmonary arterial hypertension (Dumas, S. J., et al., *NMDA-Type Glutamate Receptor Activation Promotes Vascular Remodeling and Pulmonary Arterial Hypertension*. Circulation, 2018. 137(22): p. 2371-2389, 29444988). In some embodiments, the compound(s) and pharmaceutical formulation(s) described herein can be administered to a subject to treat a vascular disease or disorder, such as hypertension, or disorder where NMDA receptors mediate pathogenesis of disease.

In some embodiments, the subject in need thereof to which the pharmaceutical formulation is administered to can have an NMDA-mediated disease or disorder. In some embodiments, the disease or disorder can be a neurobiological disease or disorder, a psychiatric disease or disorder, a cancer, an autoimmune disease or disorder, a thrombosis disease, a heart disease, a kidney disease, a lung disease, or a blood vessel disease, or a combination thereof.

In embodiments where more than one of compounds, formulations, additional therapeutic agents, salts thereof, or pharmaceutically acceptable salts thereof are administered to a subject in need thereof sequentially; the sequential administration may be close in time or remote in time. For example, administration of the second compound, formulation, or other therapeutic agent can occur within seconds or minutes (up to about 1 hour) after administration of the first agent (close in time). In other embodiments, administration of the second compound, formulation, or other therapeutic agent occurs at some other time that is more than an hour after administration of the first agent.

The amount of pharmaceutical formulations described herein can be administered in an amount ranging from about 0.01 mg to about 1000 mg per day, as calculated as the free or unsalted compound as described herein.

Co-Therapies

The pharmaceutical formulations provided herein can be administered in combinations with or include one or more other auxiliary agents. Suitable auxiliary agents are described elsewhere herein. In some embodiments, the auxiliary agent is an NMDA receptor agonist, agonist, or modulator. The compound(s), and/or formulation(s), and/or additional therapeutic agent(s) can be administered simultaneously or sequentially by any convenient route in separate or combined pharmaceutical formulations. The additional therapeutic agents can be provided in their optically pure form or a pharmaceutically acceptable salt thereof.

Further embodiments are illustrated in the following Examples which are given for illustrative purposes only and are not intended to limit the scope of the invention.

EXAMPLES

Now having described the embodiments of the present disclosure, in general, the following Examples describe some additional embodiments of the present disclosure. While embodiments of the present disclosure are described in connection with the following examples and the corresponding text and figures, there is no intent to limit embodiments of the present disclosure to this description. On the contrary, the intent is to cover all alternatives, modifications, and equivalents included within the spirit and scope of embodiments of the present disclosure. The following examples are put forth so as to provide those of ordinary skill in the art with a complete disclosure and description of how to perform the methods and use the probes disclosed and claimed herein. Efforts have been made to ensure accuracy with respect to numbers (e.g., amounts, temperature, etc.), but some errors and deviations should be accounted for. Unless indicated otherwise, parts are parts by weight, temperature is in ° C., and pressure is at or near atmospheric. Standard temperature and pressure are defined as 20° C. and 1 atmosphere.

Example 1—NMDA Modulating Compounds

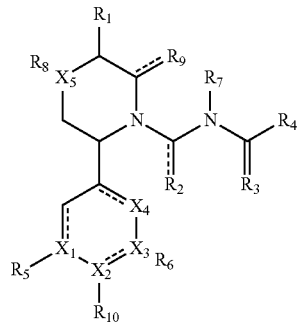

Formula I

TABLE 1

| | | | | | | | | | | | | | | | | | |
|---|---|---|---|---|---|---|---|---|---|---|---|---|---|---|---|---|---|
| ID | No | $R_1$ | $R_2$ | $R_3$ | $R_4$ | $R_5$ | $R_6$ | $R_7$ | $R_8$ | $R_9$ | $R_{10}$ | $X_1$ | $X_2$ | $X_3$ | $X_4$ | $X_5$ |
| CNS004 | 1 | $H_2$ | S | O | 4-F-phenyl | — | H | H | $H_2$ | $H_2$ | H | N | C | C | CH | C |
| CNS0041 | 2 | $H_2$ | S | O | 4-CF$_3$-phenyl | H | — | H | $H_2$ | $H_2$ | H | C | C | N | CH | C |
| CNS0042 | 3 | $H_2$ | S | S | 4-F-phenyl | H | — | H | $H_2$ | $H_2$ | H | C | C | N | CH | C |

CNS004 and Exemplary CNS004 Analogues

TABLE 1-continued
CNS004 and Exemplary CNS004 Analogues
| ID | No | R₁ | R₂ | R₃ | R₄ | R₅ | R₆ | R₇ | R₈ | R₉ | R₁₀ | X₁ | X₂ | X₃ | X₄ | X₅ |
|---|---|---|---|---|---|---|---|---|---|---|---|---|---|---|---|---|
| CNS0043 | 4 | H₂ | O | O | 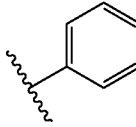 | H | — | H | H₂ | H₂ | H | C | C | N | CH | C |
| CNS0044 | 5 | H₂ | S | O | 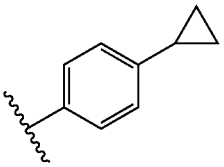 [SMILES: *c1ccc(C2CC2)cc1] | H | — | H | H₂ | H₂ | H | C | C | N | CH | C |
| CNS0045 | 6 | H₂ | S | O | 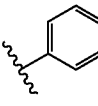 | H | — | H | H₂ | H₂ | H | C | C | N | CH | C |
| CNS0046 | 7 | H₂ | S | O | 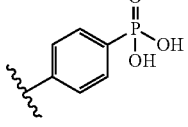 | H | — | H | H₂ | H₂ | H | C | C | N | CH | C |
| CNS0047 | 8 | H₂ | S | O | 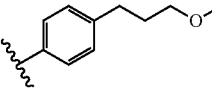 | H | — | H | H₂ | H₂ | H | C | C | N | CH | C |
| CNS0048 | 9 | H₂ | S | O | 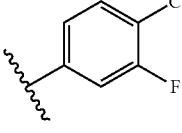 | H | — | H | H₂ | H₂ | H | C | C | N | CH | C |
| CNS0049 | 10 | H₂ | S | O | 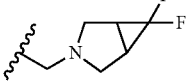 | H | — | H | H₂ | H₂ | H | C | C | N | CH | C |
| CNS00491 | 11 | 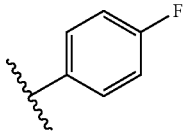 [SMILES: *c1ccc(F)cc1] | S | O |  | — | H | H | H₂ | H₂ | H | N | C | C | CH | C |
| CNS00492 | 12 | 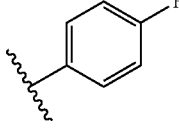 | S | O | 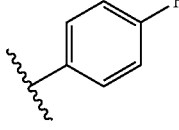 | — | H | H | H₂ | H₂ | H | N | C | C | CH | C |
| CNS00493 | 13 | H₂ | S | O |  | —CN | H | H | H₂ | H₂ | H | C | C | C | CH | C |

TABLE 1-continued
CNS004 and Exemplary CNS004 Analogues
| ID | No | $R_1$ | $R_2$ | $R_3$ | $R_4$ | $R_5$ | $R_6$ | $R_7$ | $R_8$ | $R_9$ | $R_{10}$ | $X_1$ | $X_2$ | $X_3$ | $X_4$ | $X_5$ |
|----|----|-------|-------|-------|-------|-------|-------|-------|-------|-------|----------|-------|-------|-------|-------|-------|
| NA | 14 | $H_2$ | S | O | 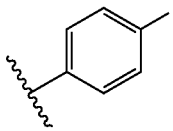 | H | H | H | $H_2$ | $H_2$ | H | C | C | C | CH | C |
| NA | 15 | $H_2$ | O | O | 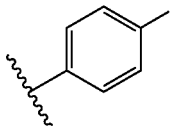 | H | — | H | $H_2$ | $H_2$ | H | C | C | N | CH | C |
| NA | 16 | $H_2$ | S | O | 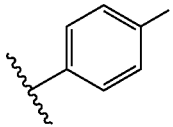 | H | H | H | $H_2$ | $H_2$ | H | C | C | C | N | C |
| NA | 17 | $H_2$ | S | O | 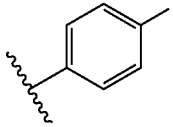 | H | — | $CH_3$ | $H_2$ | $H_2$ | H | C | C | N | CH | C |
| NA | 18 | $H_2$ | S | O | 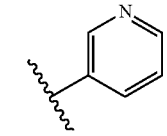 [SMILES: *c1cccnc1] | H | — | H | $H_2$ | $H_2$ | H | C | C | N | CH | C |
| NA | 19 | $H_2$ | S | O | 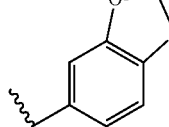 | H | — | H | $H_2$ | $H_2$ | H | C | C | N | CH | C |
| NA | 20 | $H_2$ | S | O | 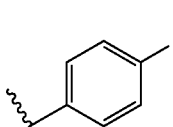 | — | H | H | $H_2$ | $H_2$ | H | N | C | C | CH | C |
| NA | 21 | $H_2$ | S | O | 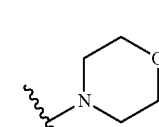 | — | H | H | $H_2$ | $H_2$ | H | N | C | C | CH | C |
| NA | 22 | $H_2$ | S | O | 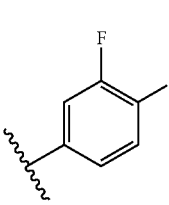 | — | H | H | $H_2$ | $H_2$ | H | N | C | C | CH | C |

TABLE 1-continued

CNS004 and Exemplary CNS004 Analogues

| ID | No | R₁ | R₂ | R₃ | R₄ | R₅ | R₆ | R₇ | R₈ | R₉ | R₁₀ | X₁ | X₂ | X₃ | X₄ | X₅ |
|---|---|---|---|---|---|---|---|---|---|---|---|---|---|---|---|---|
| NA | 23 | H₂ | S | O | 3,3-difluoro-bicyclo[3.1.0]hexan-N-yl | — | H | H | H₂ | H₂ | H | N | C | C | CH | C |
| NA | 24 | H₂ | O | O | 4-fluorophenyl | — | H | H | H₂ | H₂ | H | N | C | C | CH | C |
| NA | 25 | H₂ | S | S | 4-fluorophenyl | — | H | H | H₂ | H₂ | H | N | C | C | CH | C |
| NA | 26 | H₂ | NH | O | 4-fluorophenyl | — | H | H | H₂ | H₂ | H | N | C | C | CH | C |
| NA | 27 | H₂ | S | O | 4-fluorobenzyl | — | H | H | H₂ | H₂ | H | N | C | C | CH | C |
| NA | 28 | H₂ | S | O | 4-fluorophenyl | — | H | H | — | H₂ | H | N | C | C | CH | O |
| NA | 29 | H₂ | S | O | 4-fluorophenyl | — | H | H | H | H₂ | H | N | C | C | CH | N |
| NA | 30 | H₂ | S | O | 4-fluorocyclohexa-1,4-dien-1-yl | — | H | H | CH₃ | H₂ | H | N | C | C | CH | N |
| NA | 31 | H₂ | S | O | 4-fluorophenyl | — | H | H | H₂ | =O | H | N | C | C | CH | C |
| NA | 32 | H₂ | S | O | 4-fluorophenyl | — | H | H | H₂ | H₂ | — | N | N | C | CH | C |

TABLE 1-continued

CNS004 and Exemplary CNS004 Analogues

| ID | No | $R_1$ | $R_2$ | $R_3$ | $R_4$ | $R_5$ | $R_6$ | $R_7$ | $R_8$ | $R_9$ | $R_{10}$ | $X_1$ | $X_2$ | $X_3$ | $X_4$ | $X_5$ |
|---|---|---|---|---|---|---|---|---|---|---|---|---|---|---|---|---|
| NA | 33 | $H_2$ | S | O | 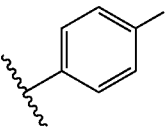 | — | — | H | $H_2$ | $H_2$ | H | N | C | N | CH | C |
| NA | 34 | $H_2$ | S | O | 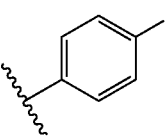 | — | H | H | $H_2$ | $H_2$ | H | N | C | C | N | C |
| NA | 35 | $H_2$ | S | O | 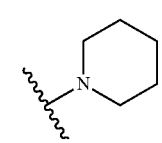 [SMILES: *N1CCCCC1] | — | H | H | $H_2$ | $H_2$ | H | N | C | C | CH | C |
| NA | 36 | $H_2$ | S | O | 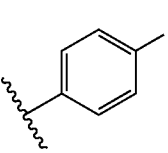 | — | $H_2$ | H | $H_2$ | $H_2$ | O | $CH_2$ | $CH_2$ | $CH_2$ | C | |
| NA | 37 | $H_2$ | S | O | 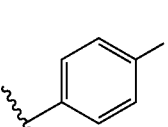 | H | $H_2$ | H | $H_2$ | $H_2$ | $H_2$ | N | $CH_2$ | $CH_2$ | $CH_2$ | C |
| NA | 38 | $H_2$ | S | O | 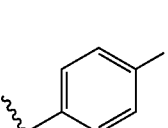 | — | $CH_3$ | H | $H_2$ | $H_2$ | H | N | C | C | CH | C |
| NA | 39 | $H_2$ | S | O | 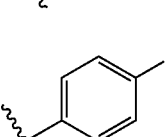 | $H_2$ |  | H | $H_2$ | $H_2$ | H | C | C | C | CH | C |
| CNS0050 | 40 | $H_2$ | S | O | 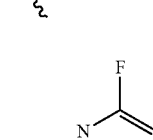 | H | — | H | $H_2$ | $H_2$ | H | C | C | N | CH | C |
| CNS0049A | 41 | $H_2$ | S | O | 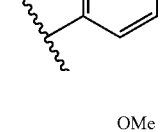 | H | H | H | $H_2$ | $H_2$ | — | C | N | C | CH | C |

TABLE 2

Properties of CNS004 and Exemplary CNS004 Analogues

| No. | Compound ID | Molecular Formula | Mol. Wt | Structure | Net Wt. | Salt Form | Purity (%) | Appearance |
|---|---|---|---|---|---|---|---|---|
| 2 | CNS0041 | $C_{19}H_{18}F_3N_3OS$ | 393.43 | Chemical Formula: $C_{19}H_{18}F_3N_3OS$; Molecular Weight: 393.43 | 330 mg | No salt | 99.88 | White Solid |
| 3 | CNS0042 | $C_{18}H_{18}FN_3S_2$ | 359.48 | Chemical Formula: $C_{18}H_{18}FN_3S_2$; Molecular Weight: 359.48 | 102 mg | No salt | 86.00 | Yellow Solid |
| 4 | CNS0043 | $C_{18}H_{18}FN_3O_2$ | 327.36 | Chemical Formula: $C_{18}H_{18}FN_3O_2$; Molecular Weight: 327.36 | 170 mg | No salt | 99.72 | White Solid |
| 5 | CNS0044 | $C_{21}H_{23}N_3OS$ | 365.50 | Chemical Formula: $C_{21}H_{23}N_3OS$; Molecular Weight: 365.50 | 470 mg | No salt | 98.47 | White Solid |

TABLE 2-continued

Properties of CNS004 and Exemplary CNS004 Analogues

| No. | Compound ID | Molecular Formula | Mol. Wt | Structure | Net Wt. | Salt Form | Purity (%) | Appearance |
|---|---|---|---|---|---|---|---|---|
| 6 | CNS0045 | $C_{21}H_{24}FN_3OS$ | 385.50 | 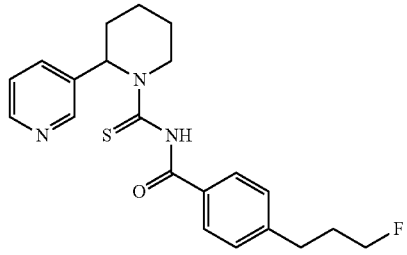Chemical Formula: $C_{21}H_{24}FN_3OS$<br>Molecular Weight: 385.50 | 170 mg | No salt | 99.33 | White Solid |
| 7 | CNS0046 | $C_{18}H_{20}N_3O_4PS$ | 405.41 | 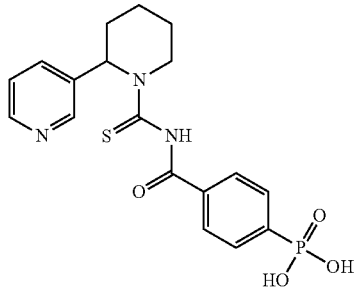Chemical Formula: $C_{18}H_{20}N_3O_4PS$<br>Molecular Weight: 405.41 | 37 mg | Purified by PREP using NH4OAc | 97.46 | White Solid |
| 8 | CNS0047 | $C_{22}H_{27}N_3O_2S$ | 397.54 | 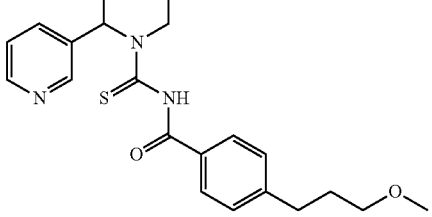Chemical Formula: $C_{22}H_{27}N_3O_2S$<br>Molecular Weight: 397.54 | 240 mg | No salt | 99.72 | White Solid |
| 9 | CNS0048 | $C_{18}H_{17}ClFN_3OS$ | 377.86 | 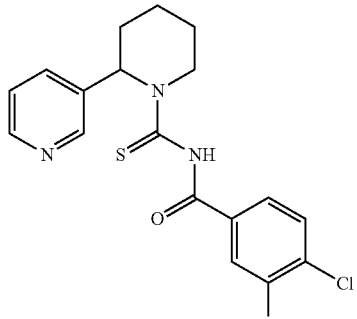Chemical Formula: $C_{18}H_{17}ClFN_3OS$<br>Molecular Weight: 377.86 | 160 mg | No salt | 99.42 | White Solid |

TABLE 2-continued

Properties of CNS004 and Exemplary CNS004 Analogues

| No. | Compound ID | Molecular Formula | Mol. Wt | Structure | Net Wt. | Salt Form | Purity (%) | Appearance |
|---|---|---|---|---|---|---|---|---|
| 40 | CNS0049A | $C_{20}H_{23}N_3O_3S$ | 385.48 | Chemical Formula: $C_{20}H_{23}N_3O_3S$; Molecular Weight: 385.48 | 500 mg | No salt | 99.92 | White Solid |
| 41 | CNS0050 | $C_{17}H_{17}FN_4OS$ | 344.41 | Chemical Formula: $C_{17}H_{17}FN_4OS$; Molecular Weight: 344.41 | 72 mg | No salt | 96.65 | White Solid |
| 1 | CNS004 | $C_{18}H_{18}FN_3OS$ | 343.42 | Chemical Formula: $C_{18}H_{18}FN_3OS$; Molecular Weight: 343.42 | 770 mg | No salt | 99.81 | Off-white Solid |

TABLE 3

Properties of CNS004 and Exemplary CNS004 Analogues

| No. | 2 | 3 | 4 | 5 | 6 | 7 | 8 | 9 | 10 | 11 | 12 | 13 |
|---|---|---|---|---|---|---|---|---|---|---|---|---|
| Mol. Wt. | 393.43 | 359.42 | 327.36 | 365.50 | 385.50 | 405.41 | 397.41 | 377.86 | 380.46 | 386.46 | 383.49 | 367.44 |
| cLogP | 4.41 | 4.10 | 1.46 | 4.47 | 4.36 | 1.92 | 1.396 | 4.38 | 1.92 | 3.08 | 4.55 | 4.60 |
| HBD | 1 | 1 | 1 | 1 | 1 | 3 | 1 | 1 | 1 | 1 | 1 | 1 |
| HBA | 4 | 3 | 5 | 4 | 4 | 7 | 5 | 4 | 5 | 5 | 4 | 3 |
| PSA | 44.7 | 27.63 | 61.77 | 44.7 | 44.7 | 102.23 | 53.93 | 44.7 | 47.96 | 61.77 | 44.7 | 56.13 |
| No acids | −ve | −ve | −ve | −ve | −Ve | +ve | −ve | −ve | −Ve | +ve | −ve | −ve |
| NRB | 4 | 3 | 3 | 4 | 7 | 4 | 8 | 3 | 4 | 5 | 4 | 3 |
| Notes/Score | 7 | 7 | 7 | 7 | 6 | 3 | 6 | 7 | 6 | 7/Electrophile/Chiral | 6 | 7 |

Figure 18:
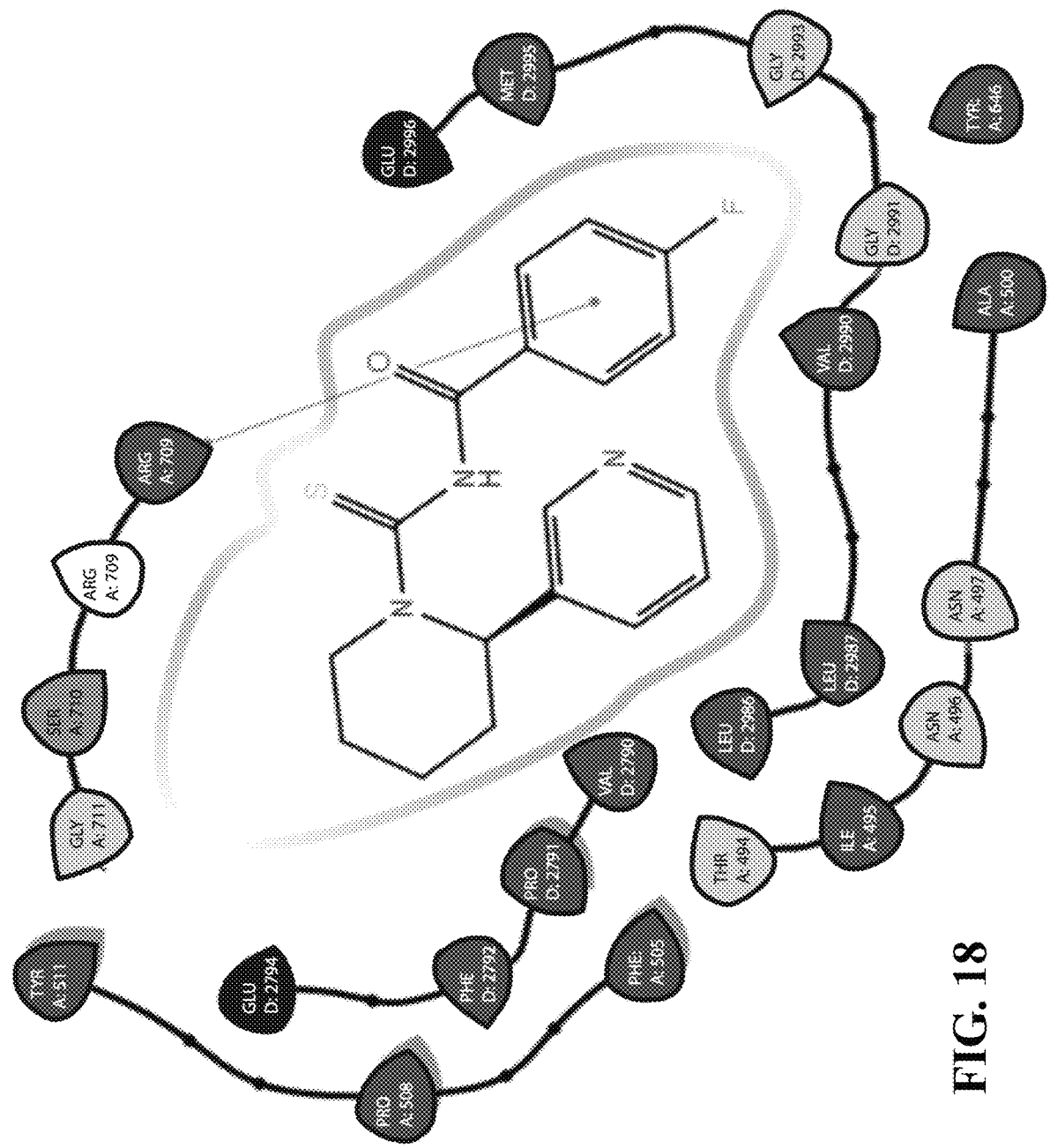
FIG. 18 shows the chemical room formed by the amino acids present within 4 Å radius around CNS004 docked GluN1/2A LBD interface. Hydrophobic (*), polar (#), charged (negative (−), positive (+)) residues are marked. Light gray line indicates a pi-stacking interaction. Discontinued black lines represent fragments of GluN1 (A-chain) or 2A (D-chain) polypeptide chains.

FIG. 18 shows the chemical room formed by the amino acids present within 4 Å radius around CNS004 docked GluN1/2A LBD interface. Hydrophobic (*), polar (#), charged (negative (−), positive (+)) residues are marked. Light gray line indicates a pi-stacking interaction. Discontinued black lines represent fragments of GluN1 (A-chain) or 2A (D-chain) polypeptide chains.

Below are structures for exemplary compounds 1-41.

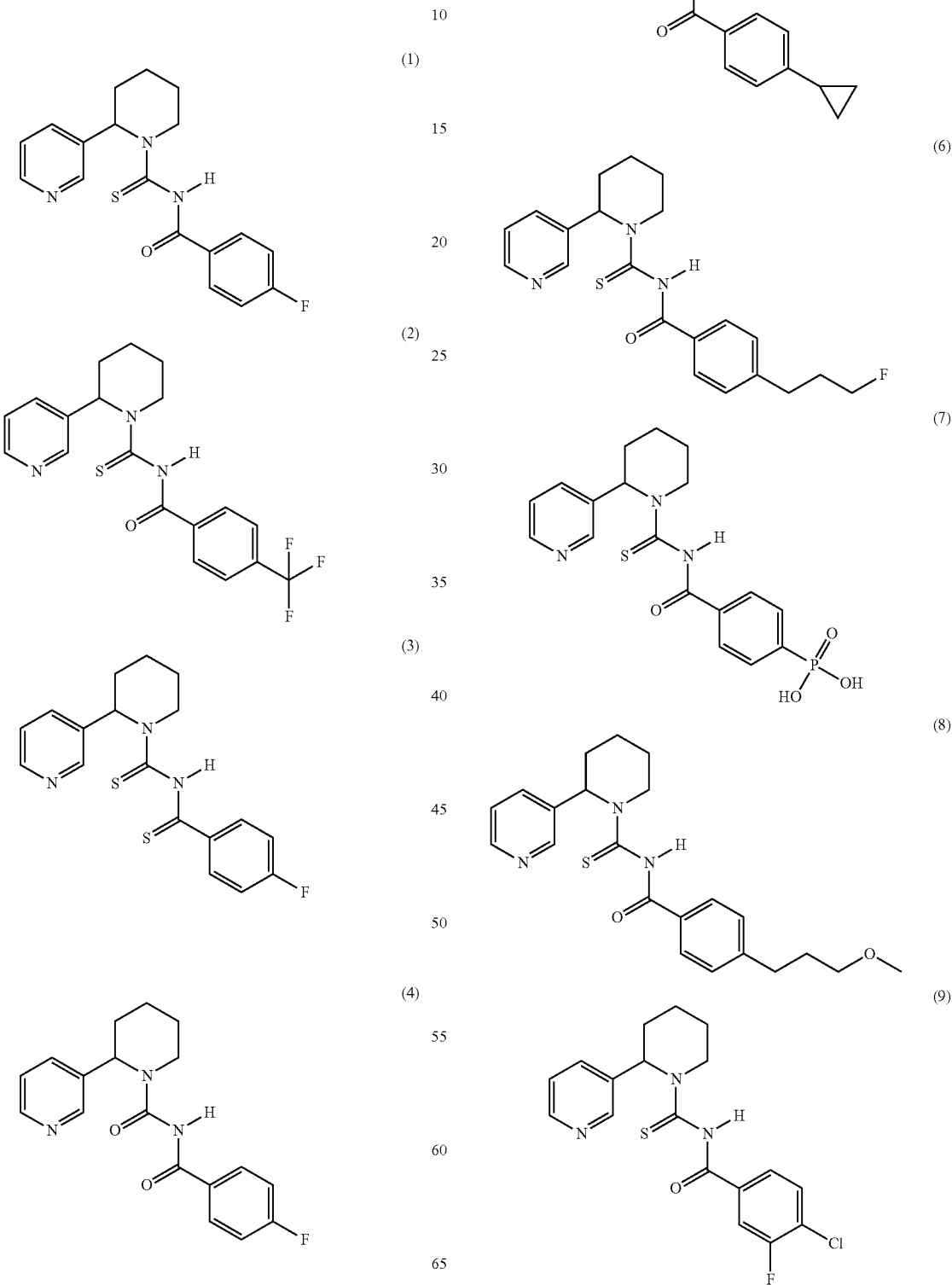

(10)
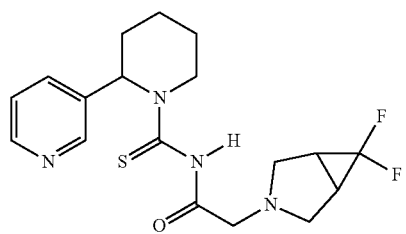
(11)
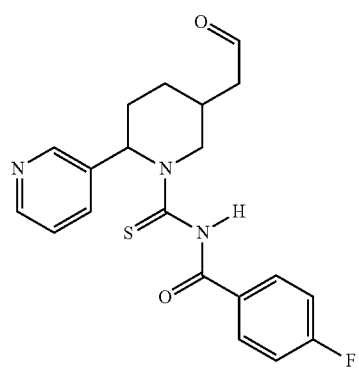
(12)
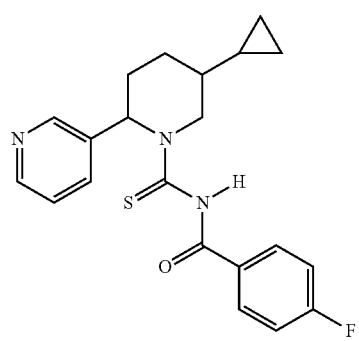
(13)
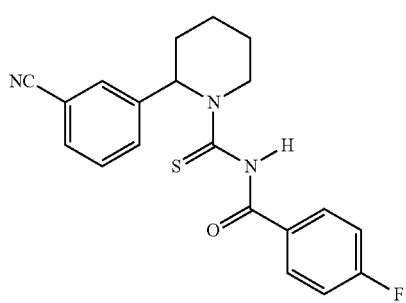
(14)
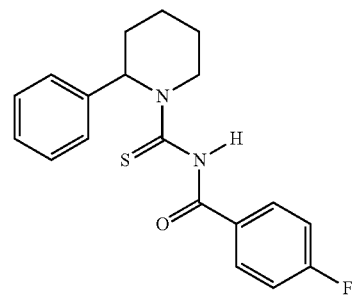
(15)
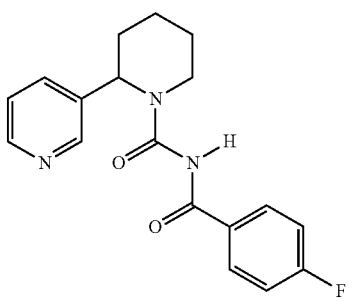
(16)
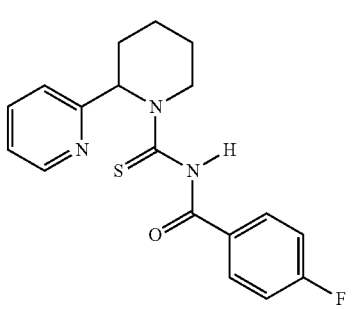
(17)
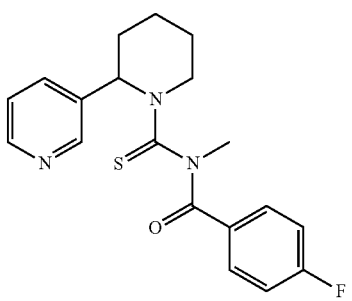
(18)
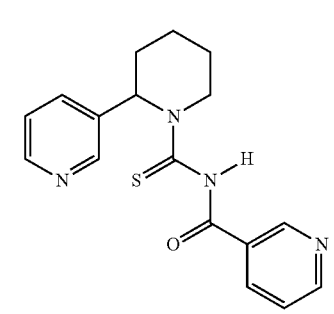
(19)
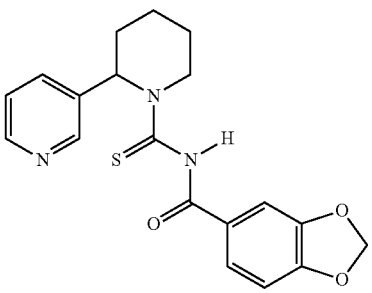

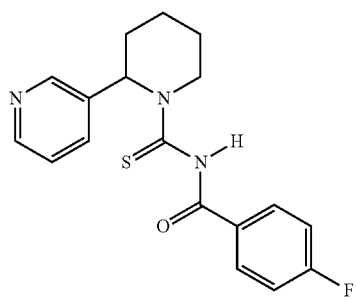
(20)
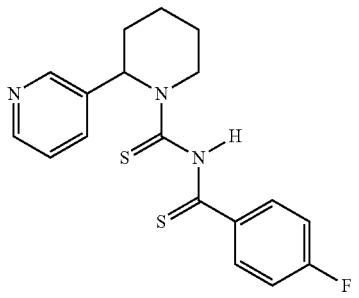
(25)
(21)
(26)
(22)
(27)
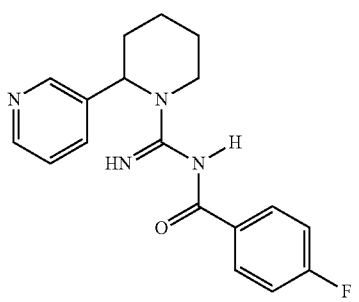
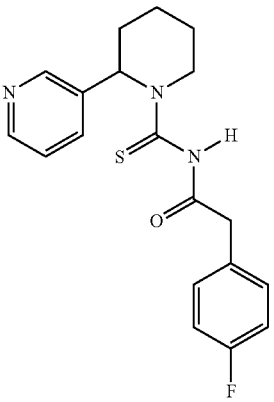
(23)
(28)
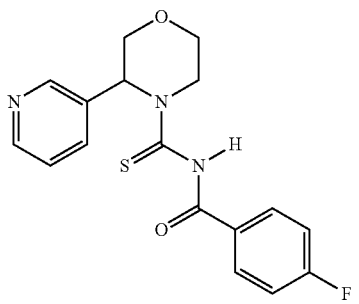
(24)
(29)
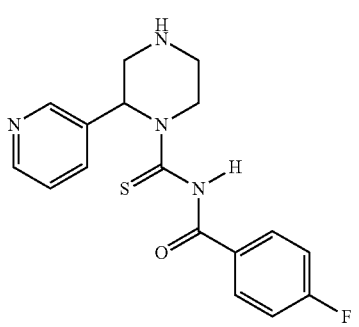

(30) 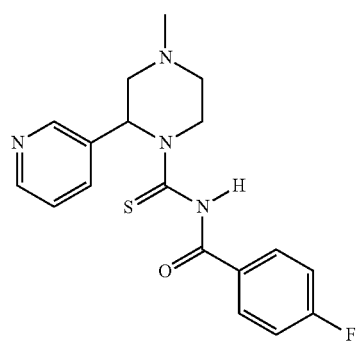
(31) 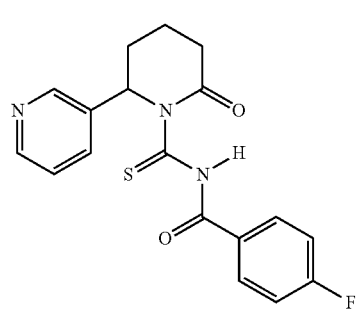
(32) 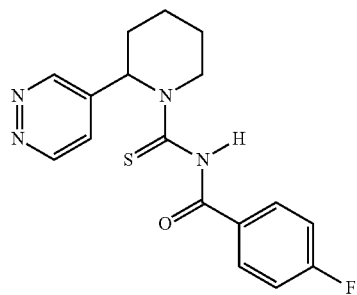
(33) 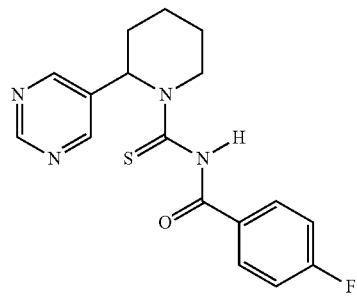
(33) 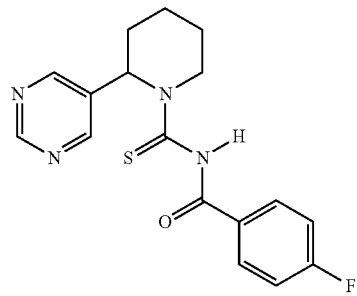
(34) 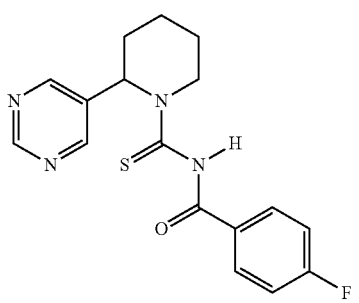
(35) 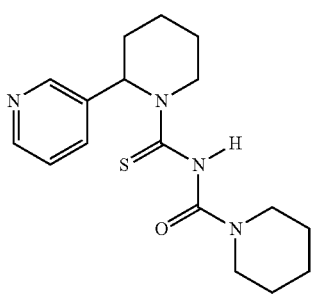
(36) 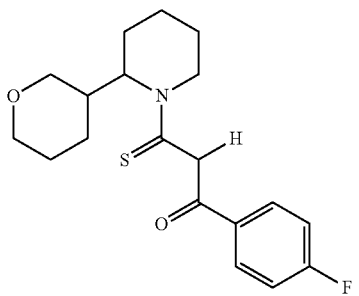
(37) 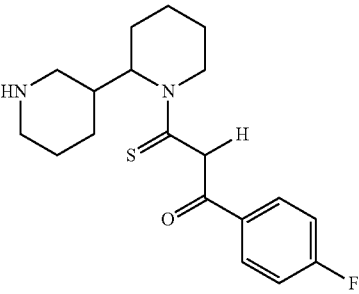
(38) 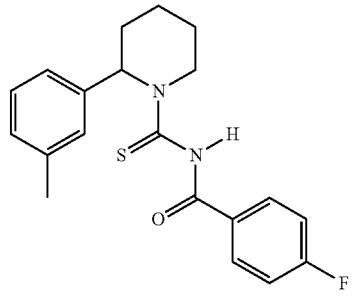

-continued (39)

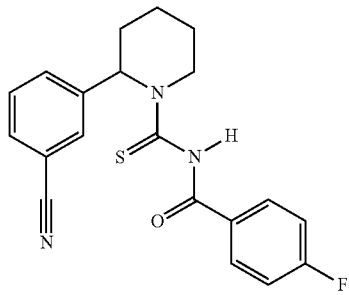

(40)

(41)

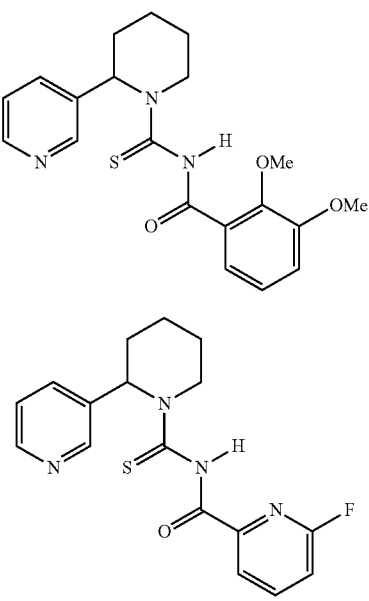

Figure 1B:
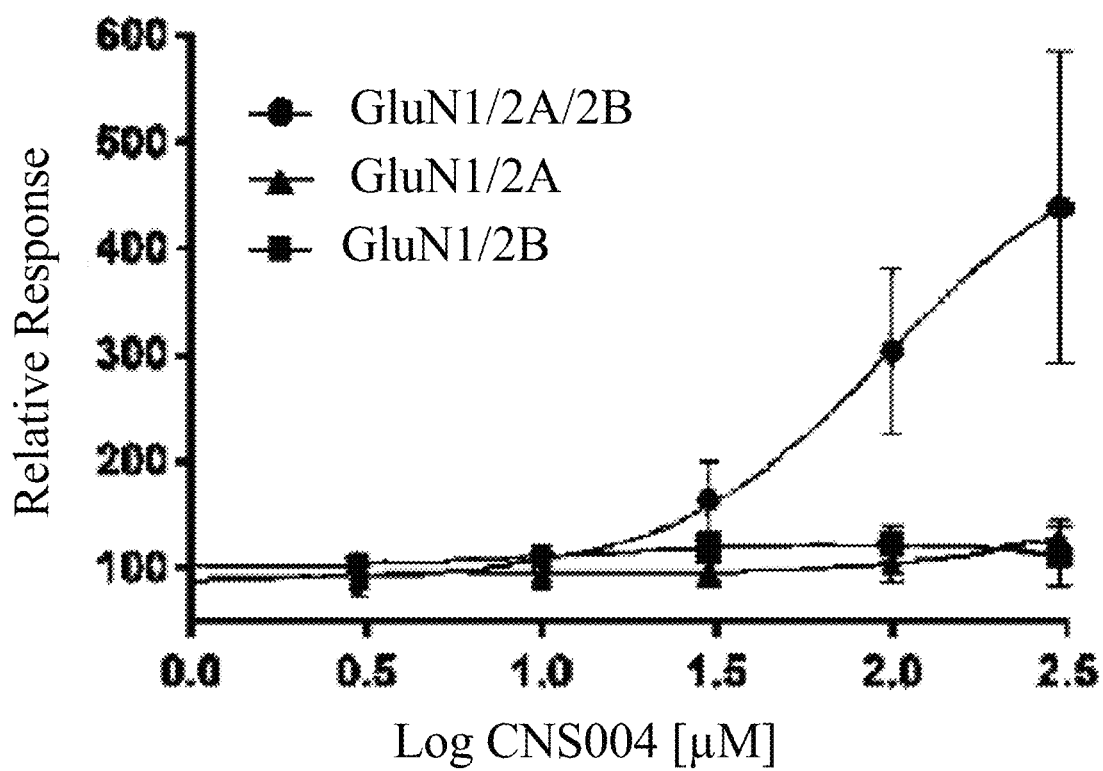
Figure 1C:
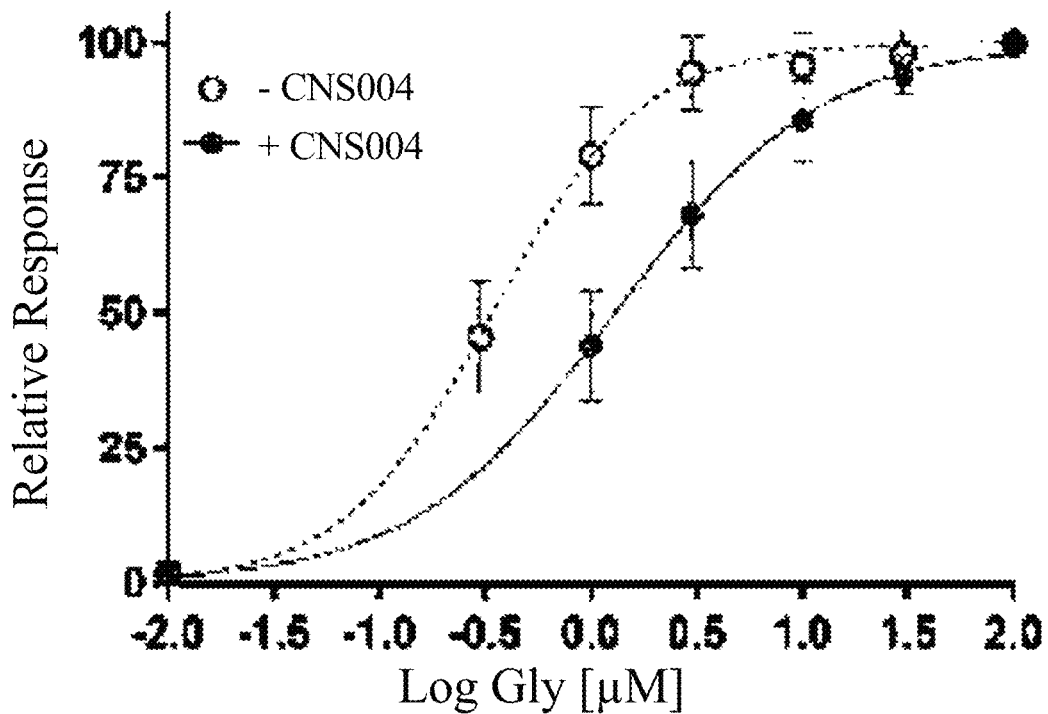
Figure 1D:
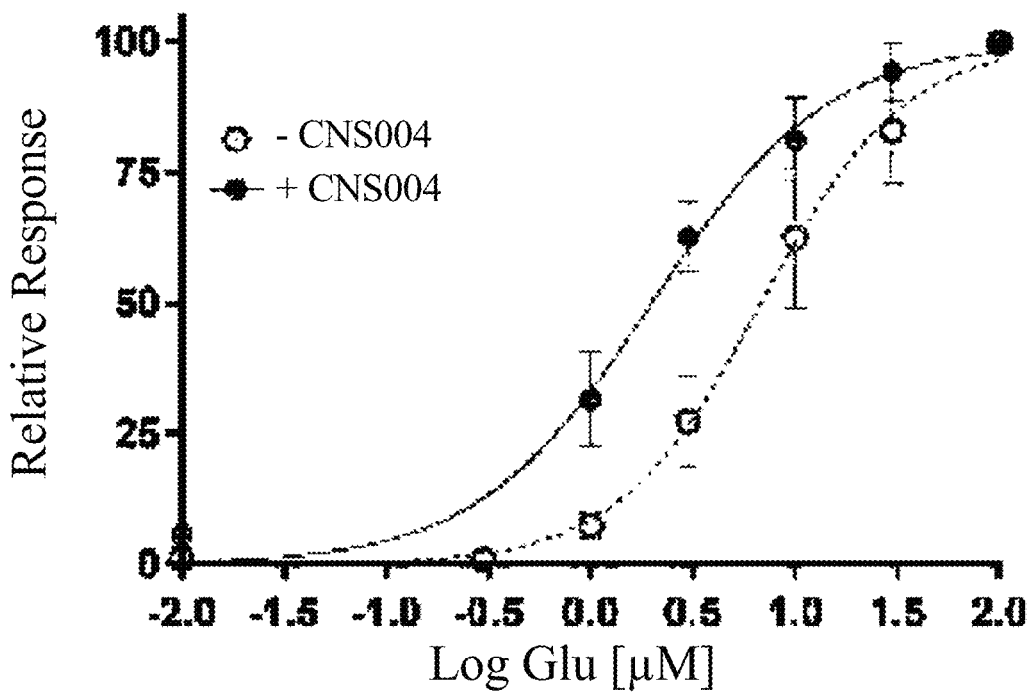
Figure 1E:
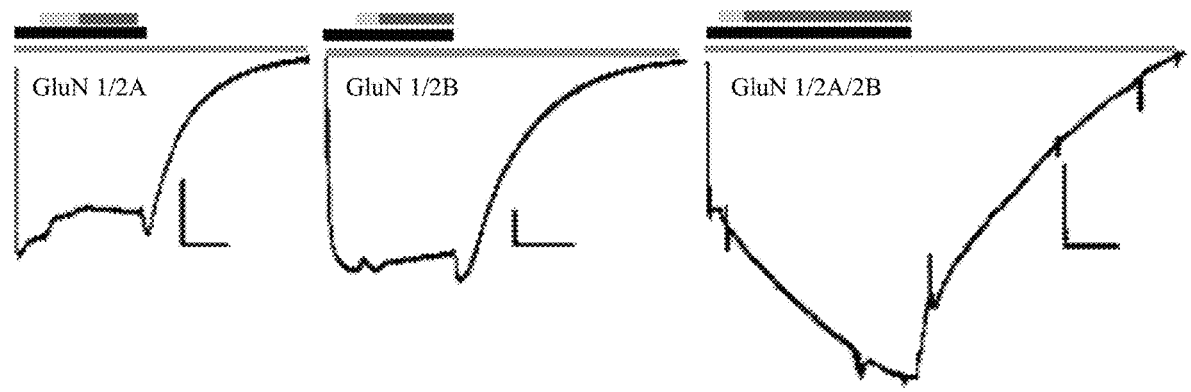

Example 2—Identification and Evaluation of GluN1/2A/2B Receptor Selective Molecules FIGS. 1A-1E can demonstrate that CNS004 selectively potentiates GluN1/2A/2B containing triheteromeric (TH) NMDA receptors. FIG. 1A shows a chemical structure for a compound referred interchangeably herein as Compound 1, CNS004, and CNS4, having the Chemical Name: (4-Fluoro-N-(2-(pyridin-3-yl)piperidine-1-carbonothioyl)benzamide). FIG. 1B shows an averaged dose response curve (DRC) that can demonstrate that CNS004 has minimal activity on GluN1/2A ($EC_{50}$ not determined, n=3) and GluN1/2B ($EC_{50}$ not determined, n=4) diheteromeric receptors, but potentiates GluN1/2A/2B ($EC_{50}$: 160±15.39 µM; $R^2$, 0.99±0.004, n=5, calculated by log agonist vs response using GraphPad Prism 7) containing triheteromeric receptors. Agonist induced maximum response was normalized to 100% in the y-axis; numbers more than 100 represents the potentiation. Averaged glycine (FIG. 1C) DRC in the presence and absence of 100 µM CNS004 can demonstrate that CNS004 significantly reduced glycine potency on GluN1/2A/2B receptors [$EC_{50}$, 0.36±0.04 µM; $R^2$, 0.99±0.002 (n=4) and 1.44±0.26 µM, $R^2$, 0.96±0.064 (n=5) without and with CNS004 respectively, p<0.05, unpaired Kolmogorov-Smirnov test]. In contrast, CNS004 significantly increased glutamate (FIG. 1D) potency on GluN1/2A/2B receptors [$EC_{50}$, 7.47±1.48 µM; $R^2$, 1.00±0.002 (n=5) and 1.98±0.17 µM; $R^2$, 0.99±0.005 (n=4) without and with CNS004 respectively, p<0.05, unpaired Kolmogorov-Smirnov test]. (FIG. 1E) Traces represent agonist currents, recorded from the xenopus oocytes expressing recombinant GluN1/2A, GluN1/2B and GluN1/2A/2B TH receptors, using two electrode voltage clamp electrophysiology technique with −60 mV holding potential. Light (10 µM) and dark (100 µM) gray bars indicate CNS004 agonist application. Black, 100 µM glycine and 100 µM glutamate Scale: X=60 sec, Y=500 nA current. Note: CNS004 did not activate the receptor in the absence of agonist glutamate or glycine. Pre-application of CNS004 alone did not change the agonist induced current response.

Figures 2A, 2B, 2C:
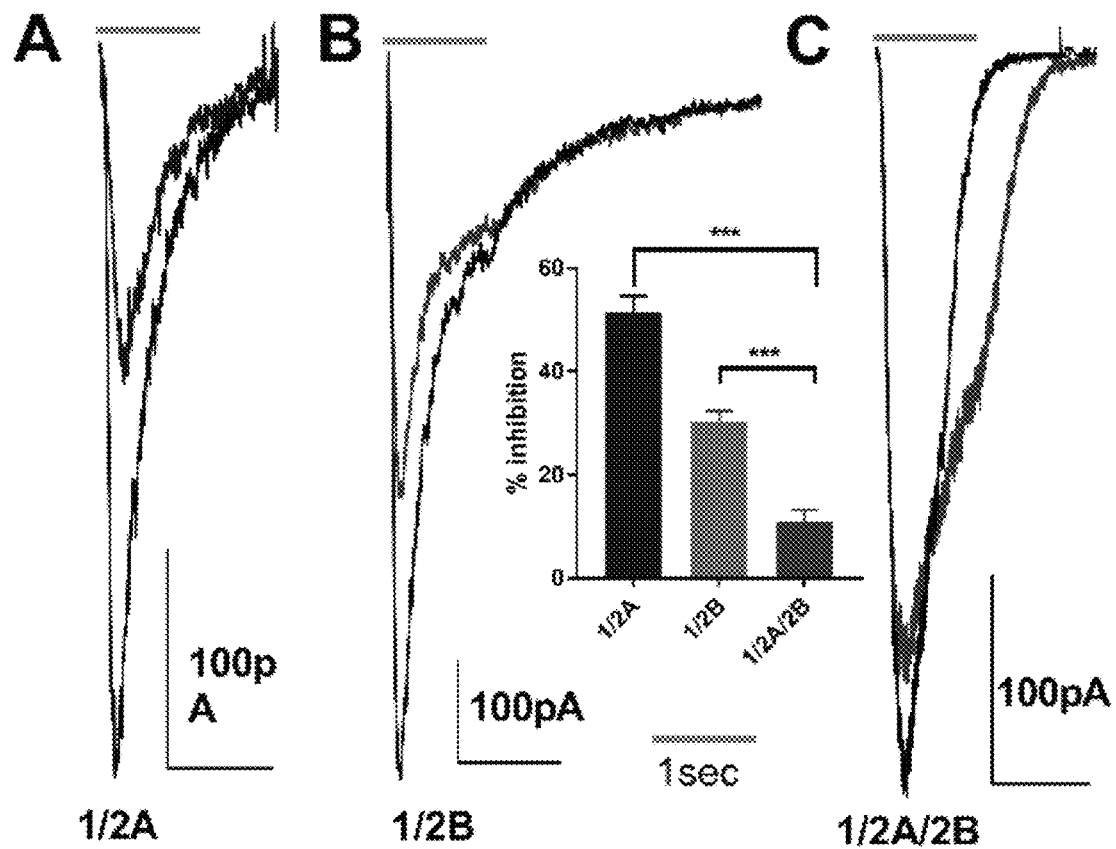
FIGS. 2A-2C show the averaged and normalized current responses of GluN1/2A (FIG. 2A), GluN1/2B (FIG. 2B) and GluN1/2A/2B (FIG. 2C) receptors induced by 30 μM glycine and 100 μM glutamate (agonist, grey) or agonist plus 100 μM CNS004 (matching greyscale with receptor subtypes) with associated maximum inducible current (Imax) and percentage inhibition statistics. These results were obtained from patch clamp electrophysiology assay using HEK293T cells expressing above mentioned recombinant NMDA receptor subtypes (as labelled).

FIGS. 2A-2C show the averaged and normalized current responses of GluN1/2A (FIG. 2A), GluN1/2B (FIG. 2B) and GluN1/2A/2B (FIG. 2C) receptors induced by 30 µM glycine and 100 µM glutamate (agonist, grey) or agonist plus 100 µM CNS004 (matching greyscale with receptor subtypes) with associated maximum inducible current (Imax) and percentage inhibition statistics. These results were obtained from patch clamp electrophysiology assay using HEK293T cells expressing above mentioned recombinant NMDA receptor subtypes (as labelled). Methods for TEVC and patch clamp are as described with respect to Example 5 herein.

Figures 3A, 3B, 3C, 3D:
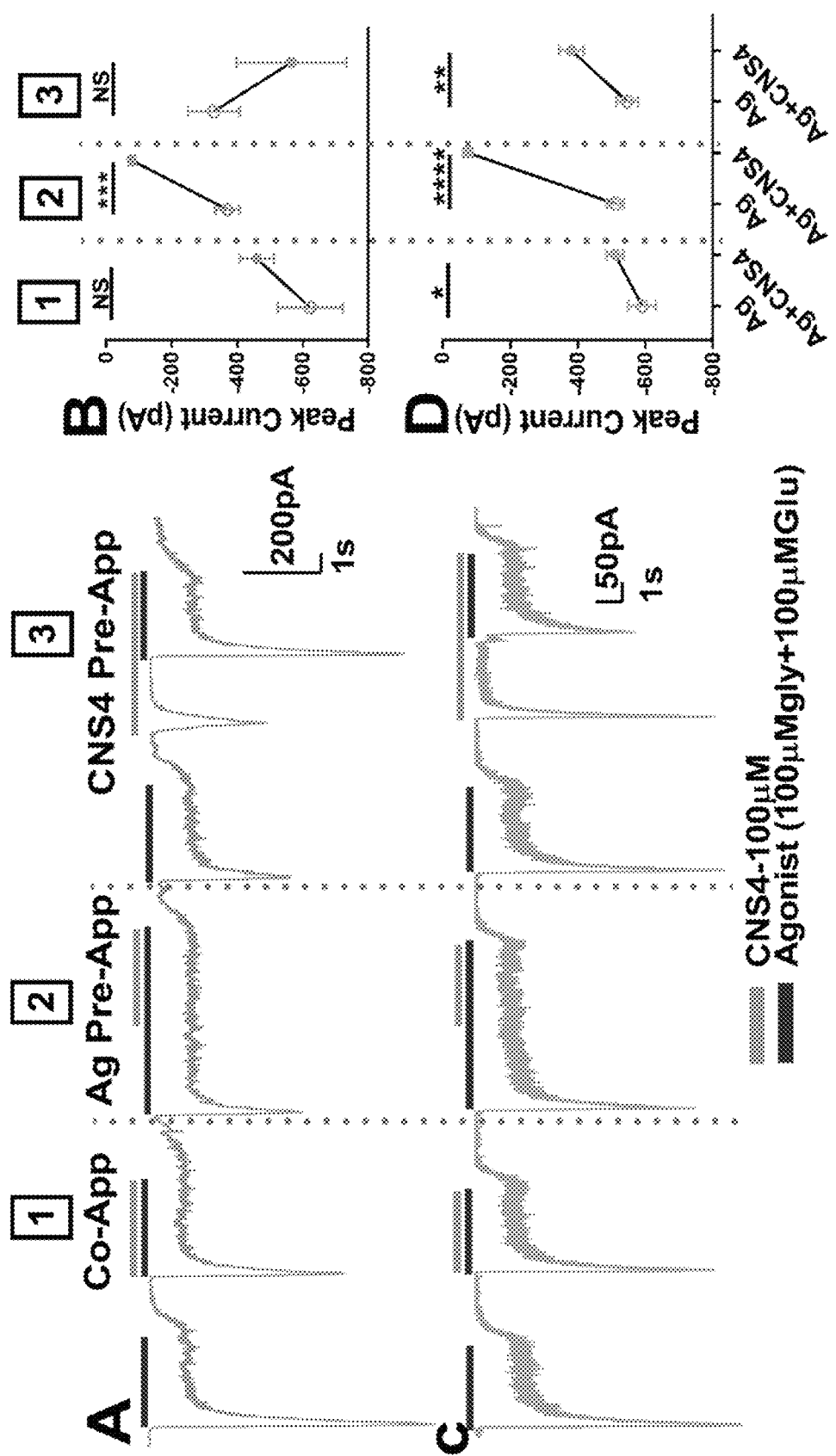
FIGS. 3A-3D show normalized traces represent current responses of GluN1/2A (FIG. 3A) and GluN1/2A/2B (FIG. 3C) NMDA receptors subtypes induced by 100 μM glycine and 100 μM glutamate (agonist, black) and/or 100 μM CNS004 (red). A three component [agonist co-application with CNS4 (1), agonist pre-application (2) and CNS4 pre-application (3)] continuous recording was performed. One full sweep was 52 sec with thirteen equal (4 sec) segments including agonist and/or CNS4 and external solution application.
Figures 4A, 4B, 4C, 4D:
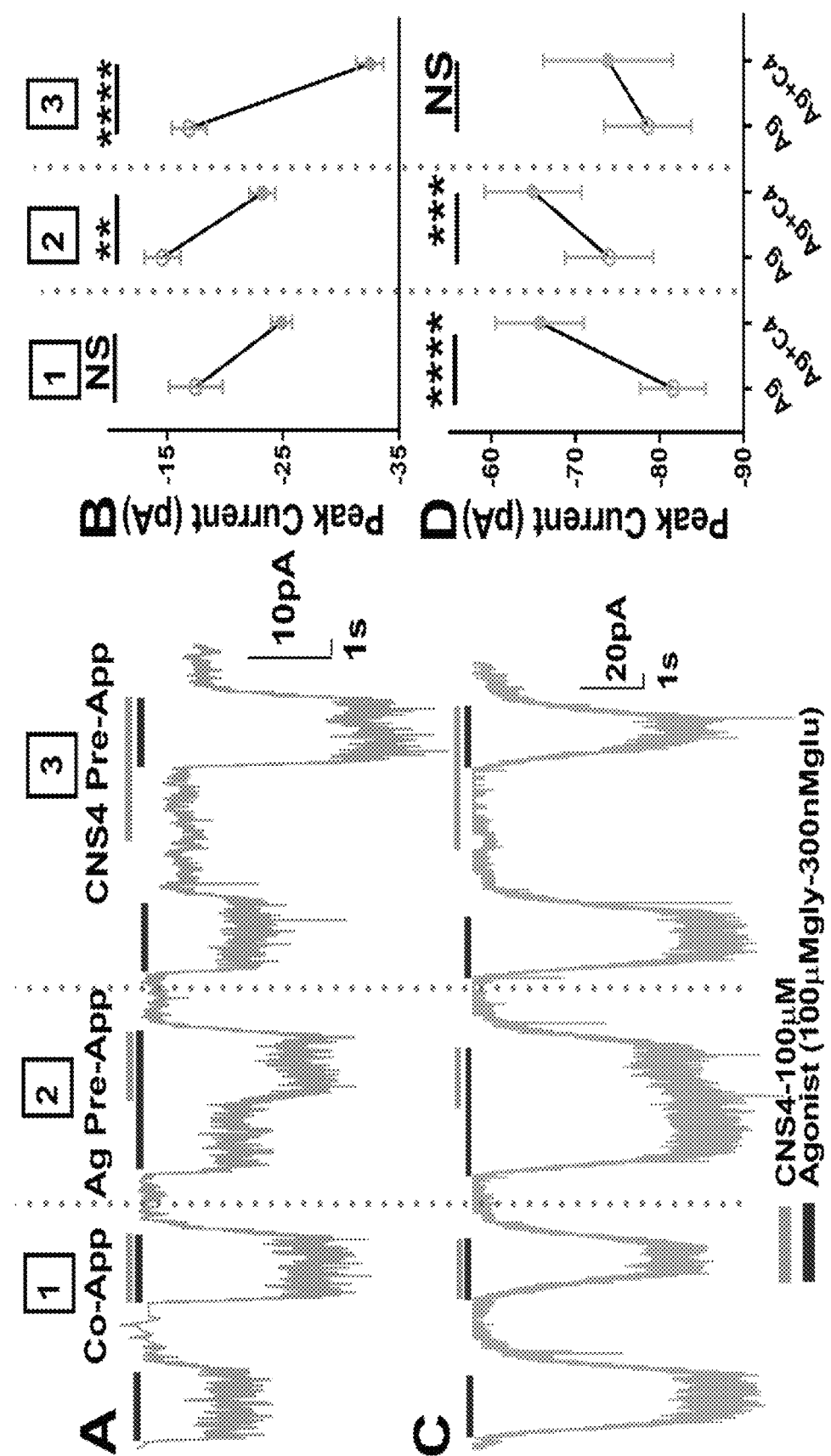
FIGS. 4A-4D show normalized traces generated under a similar protocol as described in relation to FIGS. 3A-3D, except a reduced (100 μM glycine and 300 nM glutamate) agonist concentration was used. * represents statistical significance (of paired student's t-test). =p<0.01, **=p<0.0001. 1/2A, n=5 traces; 1/2A/2B, n=20 traces. NS, not significant.
Figures 5A, 5B, 5C, 5D, 5E, 5F:
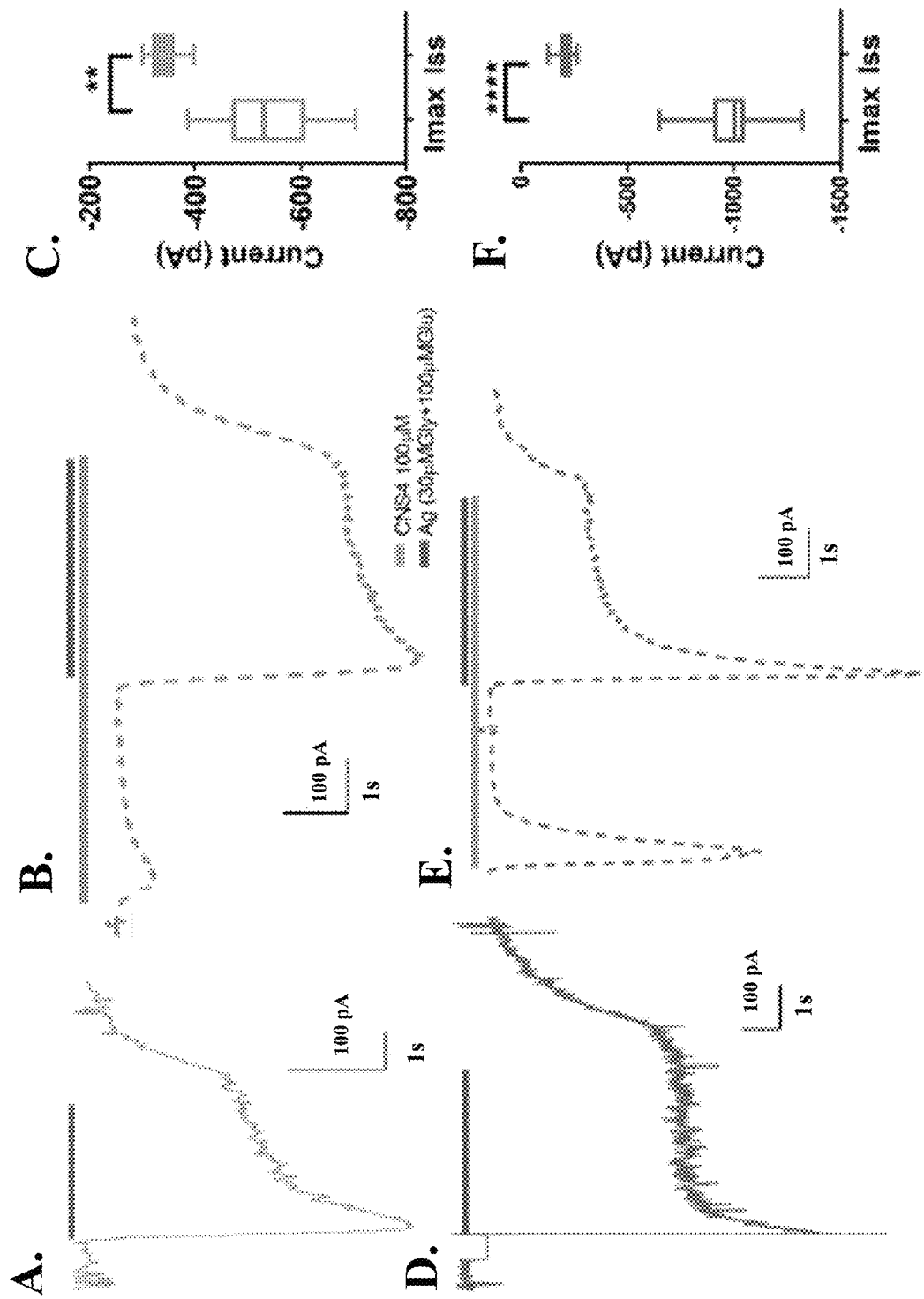
FIGS. 5A-5I can demonstrate that 1/2A (FIGS. 5A-5C and 5G and label 2A in FIG. 5I) and 1/2A/2B (FIGS. 5D-5F and 5H and label TH in FIG. 5I)) receptors were activated by agonist alone (FIGS. 5A and 5D) or CNS4 pre-application and followed by co-application of agonist+CNS4. None of the cells used for CNS4 pre-application assay (FIGS. 5B and 5E) had exposure to agonist alone solution. Therefore, cells had exposure to agonist only after pre-occupied with CNS4. During this assay, very first sweep did not produce a transient peak, nonetheless as the recording repeated on the same cell the peak started appearing. However, this peak is smaller than equivalent peak presented in FIGS. 3A-3D, where cells had exposure to agonist alone immediately before CNS4 pre-application. Superimposition of traces (FIGS. 5G-5H) from two independent agonist alone and CNS4 pre-application assays reveal the difference in desensitization rate as estimated by the ratio of maximum inducible current (Imax) to steady state current (Iss), FIG. 5I 1/2A, n=9 traces, 1/2A/2B, N=18 traces. * represent statistical significance (of paired (C&F) or unpaired (I) student's t-test). =p<0.01, **=p<0.0001.
Figure 5G:
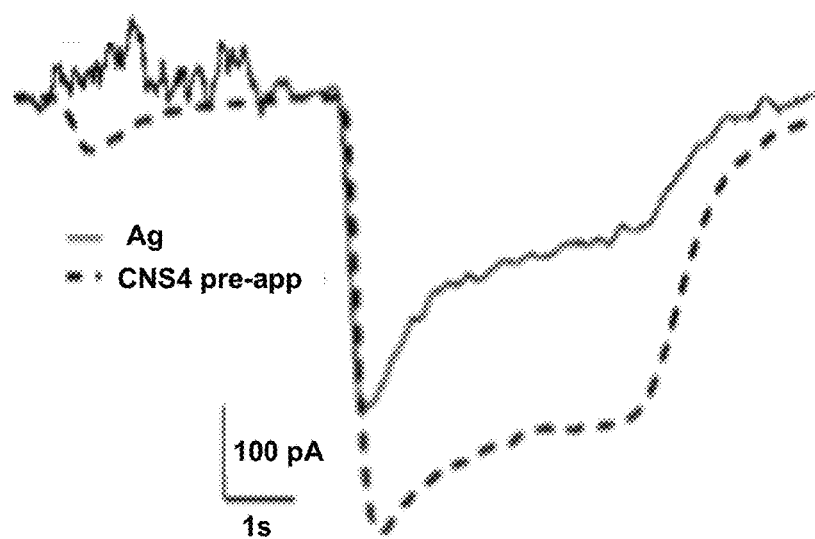
Figure 5H:
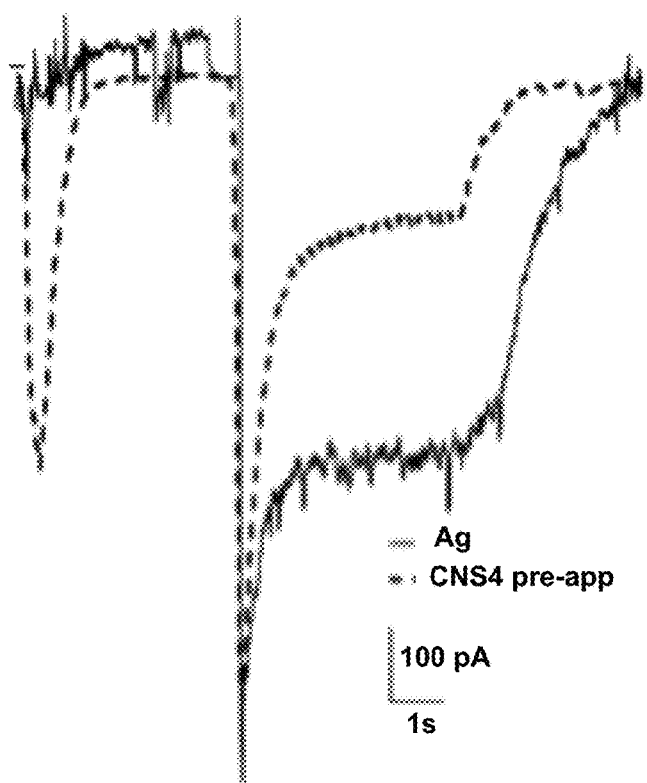
Figure 5I:
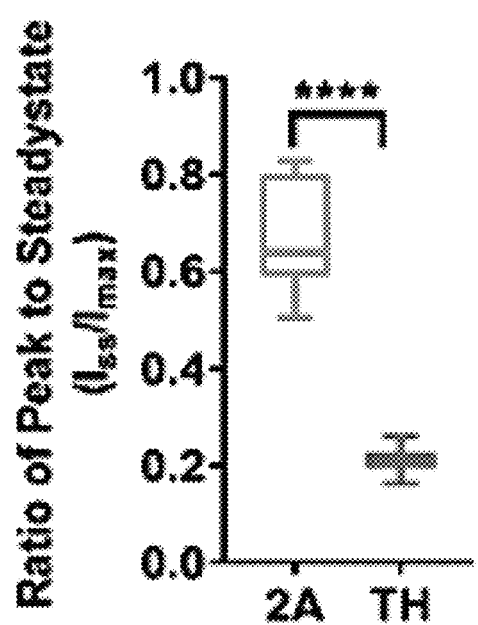
Figures 6A, 6B, 6C, 6D, 6E, 6F:
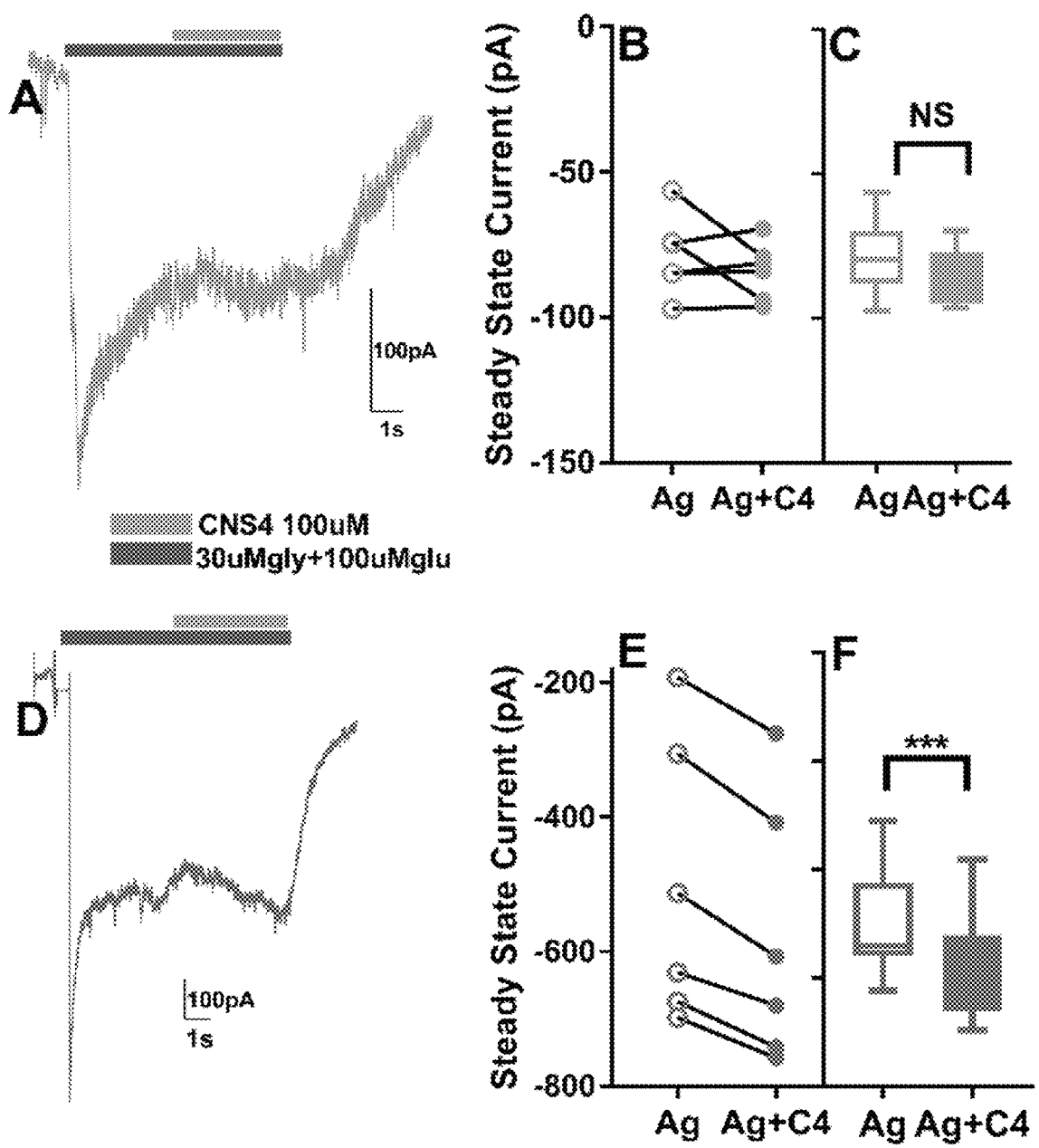
FIGS. 6A-6F show averaged and normalized traces represent current responses of GluN1/2A (FIG. 6A) and GluN1/2A/2B (FIG. 6B) NMDA receptors subtypes induced by 30 μM glycine and 100 μM glutamate (agonist, black) and 100 μM CNS004 (gray). Filled and unfilled circles represent the steady-state currents observed in the presence and absence of CNS004 in GluN1/2A (FIGS. 6A-6C) and GluN1/2A/2B (FIGS. 6D-6F) and whisker bars represent average and SEM. *represent statistical significance (of paired student's t-test). ***=p<0.001. NS, not significant.

FIGS. 3A-3D show normalized traces represent current responses of GluN1/2A (FIG. 3A) and GluN1/2A/2B (FIG. 3C) NMDA receptors subtypes induced by 100 µM glycine and 100 µM glutamate (agonist, black) and/or 100 µM CNS004 (red). A three component [agonist co-application with CNS4 (1), agonist pre-application (2) and CNS4 pre-application (3)] continuous recording was performed. One full sweep was 52 sec with thirteen equal (4 sec) segments including agonist and/or CNS4 and external solution application. FIGS. 3B and 3D represent changes in agonist (Ag) induced peak current amplitude without (unfilled circle) and with (filled) CNS4. * represent statistical significance (of paired student's t-test). *=p<0.05, ****=p<0.0001. 1/2A, n=5 traces; 1/2A/2B, n=8 traces, NS, not significant. These results were obtained from patch clamp electrophysiology assay using HEK293T cells expressing above mentioned recombinant NMDA receptor subtypes after transient transfection. Integrated recordings with 4 s agonist exposure exhibited a peak, steady state, and deactivation current after each agonist application. While component-1 and 2 are largely similar, component-3 reveals the difference between 1/2A and 1/2A/2B receptor pharmacology. A rapid and completely reversible (transient) peak that occurs soon after CNS4 alone indicates that CNS4 can potentiate these receptors from the leftover remnant agonist (which could not activate the receptor otherwise) after 4 s washout period. Remarkably, CNS4 pre-occupancy flipped the peak current amplitudes between in 1/2A and 1/2A/2B receptors (see FIGS. 3B and 3D component-3), compared to co-application component. These results motivate us for further studies on other subunits. To confirm that the CNS4 pre-application (transient) peak is due the remnant agonist, a similar assay was performed with subsaturating agonist concentration (100 µM glycine and 300 nM glutamate, FIGS. 4A-4D).

FIGS. 4A-4D show normalized traces generated under a similar protocol as described in relation to FIGS. 3A-3D, except a reduced (10004 glycine and 300 nM glutamate) agonist concentration was used. * represents statistical significance (of paired student's t-test). =p<0.01, **=p<0.0001. 1/2A, n=5 traces; 1/2A/2B, n=20 traces. NS, not significant. Remarkable differences were observed with current amplitude in all three components of reduced glutamate (300 nM) assay. 1/2A receptor currents are largely potentiated by CNS4, which inhibits 1/2A/2B currents. At component-3, the CNS4 alone induced peak is not observed in this set of recordings. This suggests that the transient peak observed with saturating concentration of agonist (FIGS. 3A-3D, component-3) is potentiation of remnant (leftover after 4 s wash) agonists. To study whether the transient peak appears only after agonist application prior to component-3 (CNS4 pre-app), another set of recording for component-3 alone without previous agonist exposure was performed. See FIGS. 5A-5I.

FIGS. 5A-5I can demonstrate that 1/2A (FIGS. 5A-5C and 5G and label 2A in FIG. 5I) and 1/2A/2B (FIGS. 5D-5F and 5H and label TH in FIG. 5I)) receptors were activated by agonist alone (FIGS. 5A and 5D) or CNS4 pre-application and followed by co-application of agonist+CNS4. None of the cells used for CNS4 pre-application assay (FIGS. 5B and 5E) had exposure to agonist alone solution. Therefore, cells had exposure to agonist only after pre-occupied with CNS4. During this assay, very first sweep did not produce a transient peak, nonetheless as the recording repeated on the same cell the peak started appearing. However, this peak is smaller than equivalent peak presented in FIGS. 3A-3D, where cells had exposure to agonist alone immediately before CNS4 pre-application. Superimposition of traces (FIGS. 5G-5H) from two independent agonist alone and CNS4 pre-application assays reveal the difference in desensitization rate as estimated by the ratio of maximum inducible current (Imax) to steady state current (Iss), FIG. 5I. 1/2A, n=9 traces, 1/2A/2B, N=18 traces. * represent statistical significance (of paired (C&F) or unpaired (I) student's t-test). =p<0.01, **=p<0.0001.

FIGS. 6A-6F show averaged and normalized traces represent current responses of GluN1/2A (FIG. 6A) and GluN1/2A/2B (FIG. 6B) NMDA receptors subtypes induced by 30 μM glycine and 100 μM glutamate (agonist, black) and 100 μM CNS004 (gray). Filled and unfilled circles represent the steady-state currents observed in the presence and absence of CNS004 in GluN1/2A (FIGS. 6A-6C) and GluN1/2A/2B (FIGS. 6D-6F) and whisker bars represent average and SEM. *represent statistical significance (of paired student's t-test). ***=p<0.001. NS, not significant.

FIGS. 16A-16H can demonstrate that co-application of agonist and CNS004 potentiates steady-state currents in GluN1/2A and GluN1/2A/2B NMDA receptors. Averaged and normalized traces represent current responses of GluN1/2A (FIG. 16A) and GluN1/2A/2B (FIG. 16D) receptors activated by agonist (30 μM glycine and 100 μM glutamate, black bar) and agonist plus CNS004 (100 μM, dark grey bar) in external solution (light grey bar). Superimposed agonist and agonist plus CNS004 traces reveal potentiation of steady-state currents in GluN1/2A (FIG. 16B) and GluN1/2A/2B (FIG. 16E) receptors. Filled and unfilled circles represent the steady-state currents observed in the presence and absence of CNS004 in GluN1/2A (FIGS. 16C-16D) and GluN1/2A/2B (FIGS. 16G-16H) and whisker bars represent average and SEM. These results were obtained from patch clamp electrophysiology assay using HEK293T cells expressing above mentioned recombinant NMDA receptor subtypes. * represent statistical significance (of paired student's t-test). =p<0.01*=p<0.001.

FIGS. 17A-17G can demonstrate that CNS004 pre-application promotes desensitization in GluN1/2A/2B Only. Averaged and normalized traces represent current responses of GluN1/2A (FIG. 17A) and GluN1/2A/2B (FIG. 17D) receptors activated by agonist (30 μM glycine and 100 μM glutamate, dark grey bar), and pre-application of CNS004 (100 μM, light gray bar) alone before applying agonist plus CNS004. Whisker bars represent average (and SEM) Imax and steady-state currents observed after CNS004 pre-application in GluN1/2A (FIG. 17B) and GluN1/2A/2B (FIG. 17E) receptors. Superimposed traces reveal CNS004 pre-application induced changes in peak and steady-state currents with GluN1/2A (FIG. 17C) and a steep reduction in steady-state currents with GluN1/2A/2B (FIG. 17F) receptor. Whisker bars (FIG. 17G) represent average (and SEM) of peak to steady-state in GluN1/2A (FIG. 17A) and GluN1/2A/2B (FIG. 17D) receptors. These results were obtained from patch clamp electrophysiology assay using HEK293T cells expressing above mentioned recombinant NMDA receptor subtypes. * represent statistical significance (of unpaired student's t-test). =p<0.01*=p<0.001, ****=p<0.0001.

Example 3—Neuronal Toxicity of CNS004

Figure 7:
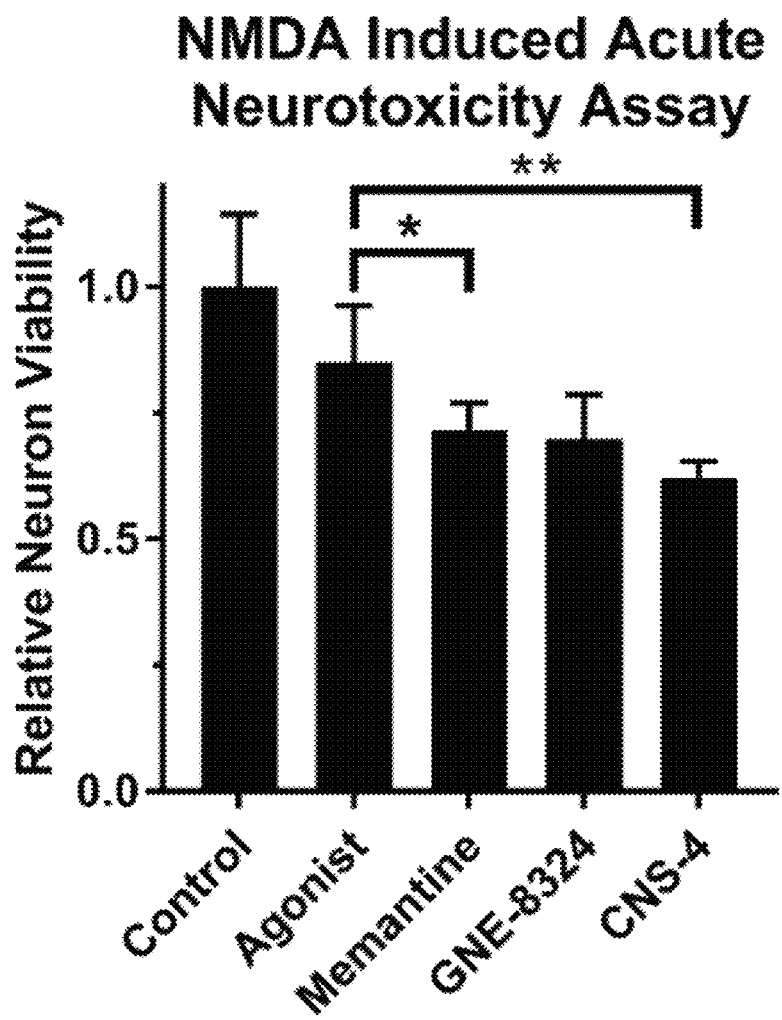
FIG. 7 shows a graph that can demonstrate NMDA induced neurotoxicity of the CNS4 compound. DIV12 rat primary cortical neurons were treated with NMDA receptor agonist (Ag:100 μM NMDA and 100 μM glycine) in the Mg2+ and nutrient free media for about 5 minutes before supplementing neurobasal media with B27 in which they grew originally. An untreated control group received plain media and other groups received memantine (an uncompetitive antagonist, 10 μM memantine+Ag) or GNE8324 (a 1/2A selective potentiator, 50 μM-GNE+Ag) or CNS4 (100 μM CNS004+Ag). 12 hrs after treatment an MTT assay was performed as per manufacturer direction (abcam, cat #ab211091). Note: Lower concentrations of agonist (or CNS4) may produce different results (as learned from FIGS. 3A and 4A).

FIG. 7 shows a graph that can demonstrate NMDA induced neurotoxicity of the CNS4 compound. DIV12 rat primary cortical neurons were treated with NMDA receptor agonist (Ag:100 μM NMDA and 100 μM glycine) in the Mg2+ and nutrient free media for about 5 minutes before supplementing neurobasal media with B27 in which they grew originally. An untreated control group received plain media and other groups received memantine (an uncompetitive antagonist, 10 μM memantine+Ag) or GNE8324 (a 1/2A selective potentiator, 50 μM-GNE+Ag) or CNS4 (100 μM CNS004+Ag). 12 hrs after treatment an MTT assay was performed as per manufacturer direction (abcam, cat #ab211091). Note: Lower concentrations of agonist (or CNS4) may produce different results (as learned from FIGS. 3A and 4A).

Example 4—CNS004 Potentiates Agonist Induced Steady-Stage Currents in GluN1/2A/2B Subtype of NMDA Receptors Methods for TEVC and patch clamp are as described with respect to Example 5 herein.

Figure 8A:
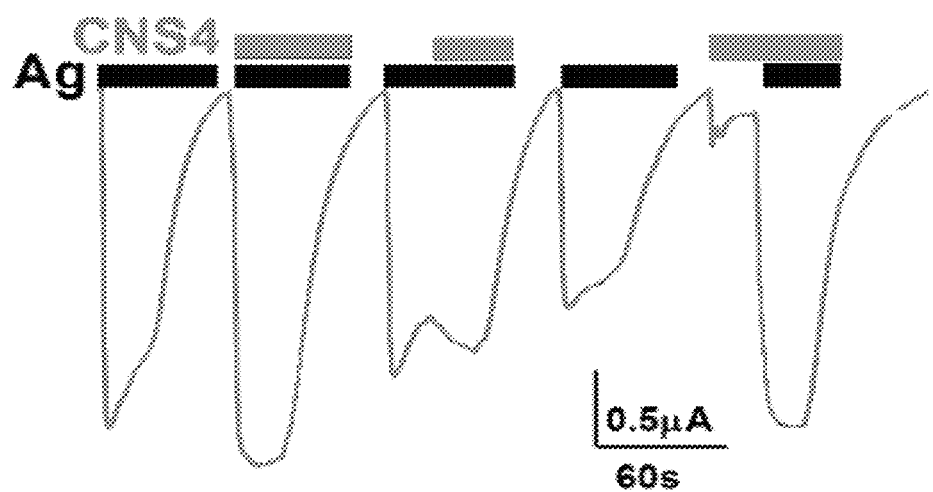
FIGS. 8A-8D can demonstrate that CNS004 can dissect triheteromeric GluN1/2A/2B NMDA receptors from diheteromeric Glu1/2A or GluN1/2B containing NMDA receptors. Traces represent current responses of GluN1/2A (FIG. 8A), GluN1/2B (FIG. 8B) and GluN1/2A/2B (FIG. 8C) receptors subtypes induced by agonist [100 μM glycine+100 μM glutamate (black line)] and 100 μM CNS004 (gray line). Integrated TEVC recordings show the effect of CNS004 in three different [co-application with agonist (1), pre-application of agonist (2), and pre-application of CNS004 (3)] sequence of applications.
Figure 8B:
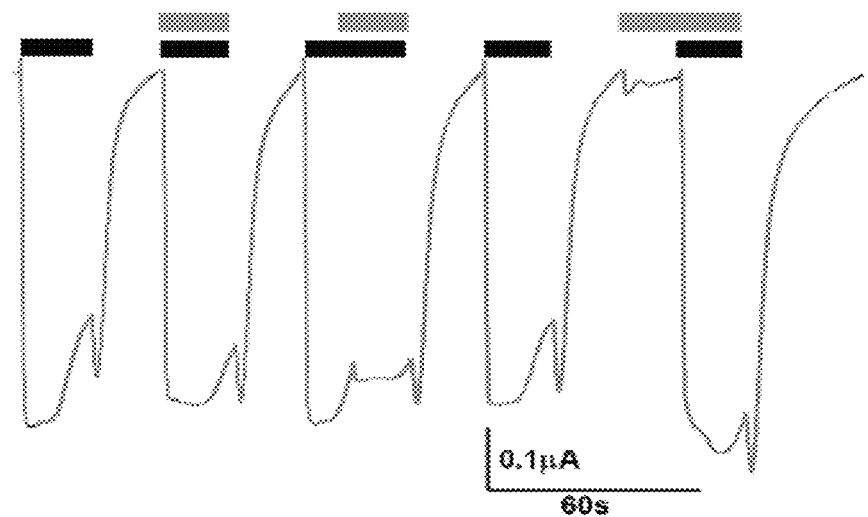
Figure 8C:
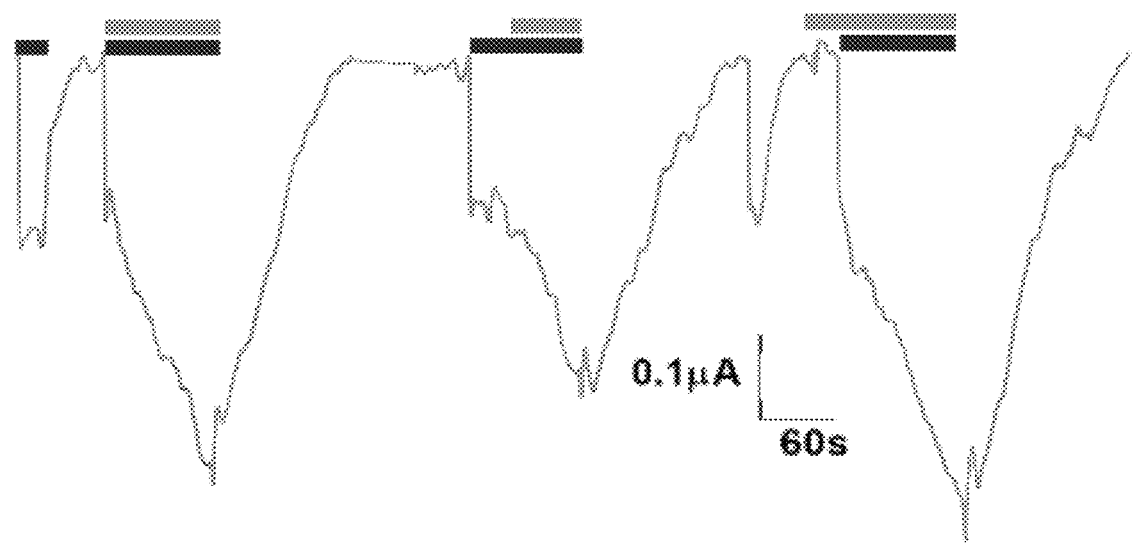
Figure 8D:
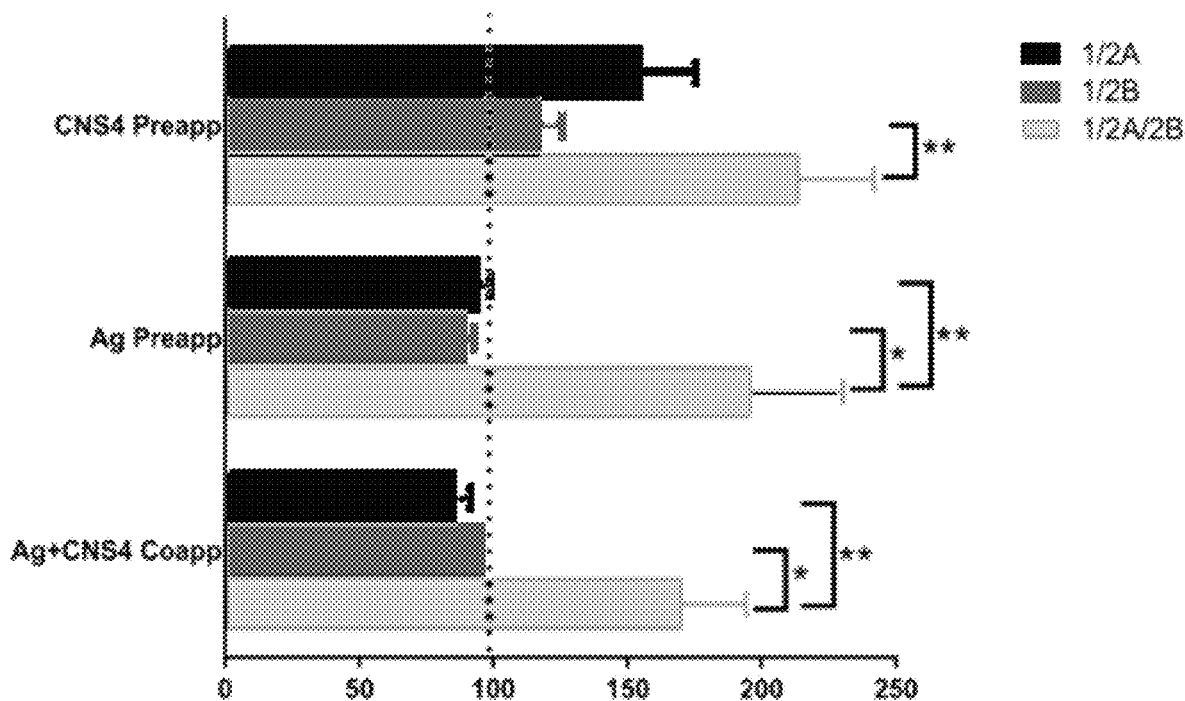

FIGS. 8A-8D can demonstrate that CNS004 can dissect triheteromeric GluN1/2A/2B NMDA receptors from diheteromeric Glu1/2A or GluN1/2B containing NMDA receptors. Traces represent current responses of GluN1/2A (FIG. 8A), GluN1/2B (FIG. 8B) and GluN1/2A/2B (FIG. 8C) receptors subtypes induced by agonist [100 μM glycine+100 μM glutamate (black line)] and 100 μM CNS004 (gray line). Integrated TEVC recordings show the effect of CNS004 in three different [co-application with agonist (1), pre-application of agonist (2), and pre-application of CNS004 (3)] sequence of applications. FIG. 8D. Histograms represent the CNS004 induced potentiation in GluN1/2A/2B in all three different applications. Dotted line indicates agonist induced maximum current (100%). * represent statistical significance (of paired student's t-test). *=p<0.05, **=p<0.01.

Example 5—CNS004 Exhibits NDMA Receptor Subunit Selectivity as Measured by TEVC Assays Two-electrode voltage clamp)TEVC) and patch clamp electrophysiology techniques were used to study CNS004 induced changes in NMDA receptor functions. Briefly, appropriate combinations of cRNA encoding different NMDA receptor subunits were injected into Xenopus oocytes and incubated at about 18° C. for about 2-4 days before TEVC assays. TEVC assays were performed with a −60 mV holding potential. CNS004 effect on endogenous agonist (glutamate) and co-agonist (glycine) activated NMDA receptors was evaluated. The results are discussed below.

Patch clamp electrophysiology was also performed. Briefly, HEK293T cells were transfected with cDNA encoding NMDA receptor subunits 18-24 hours prior to patch clamp procedures. The effect of CNS004 on the agonist induced NMDA receptor function was evaluated at −80 mV.

Figure 9A:
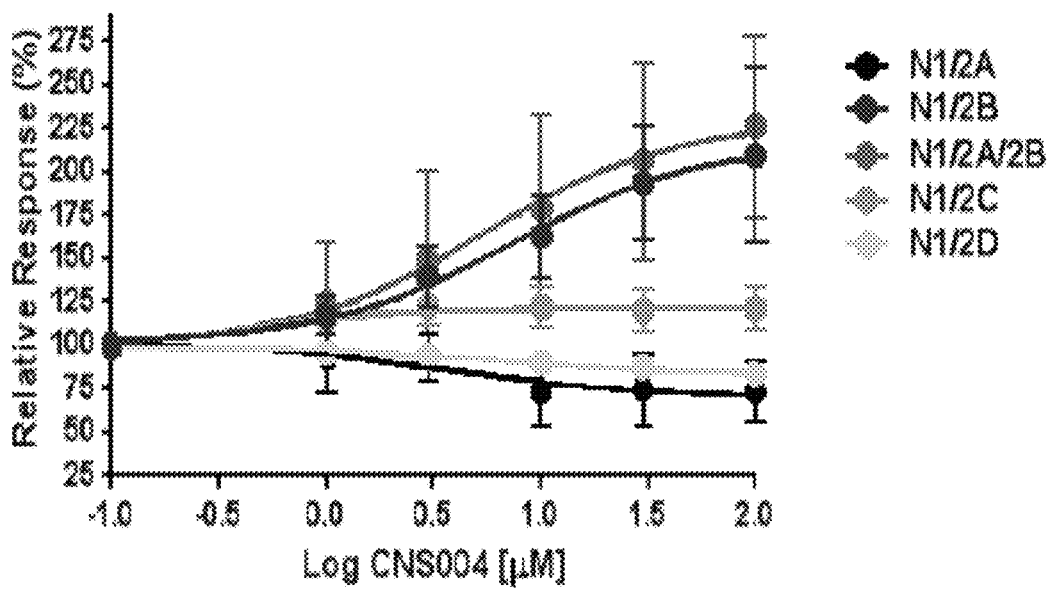
FIGS. 9A-9I can demonstrate that CNS004 can dissect triheteromeric GluN1/2A/2B NMDA receptors from diheteromeric Glu1/2A or GluN1/2B containing NMDA receptors.
Figure 9B:
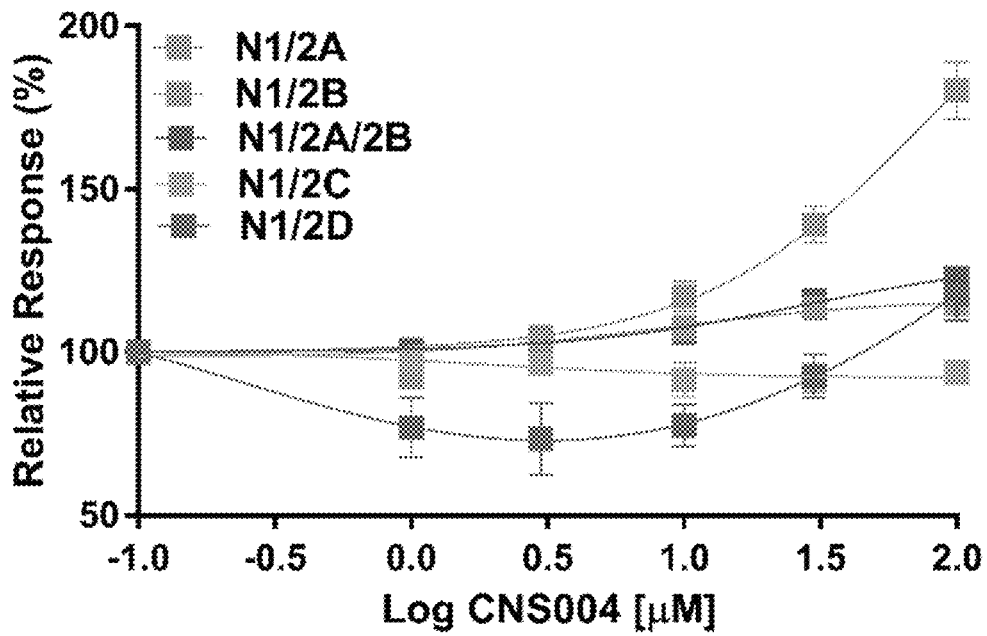
Figure 9C:
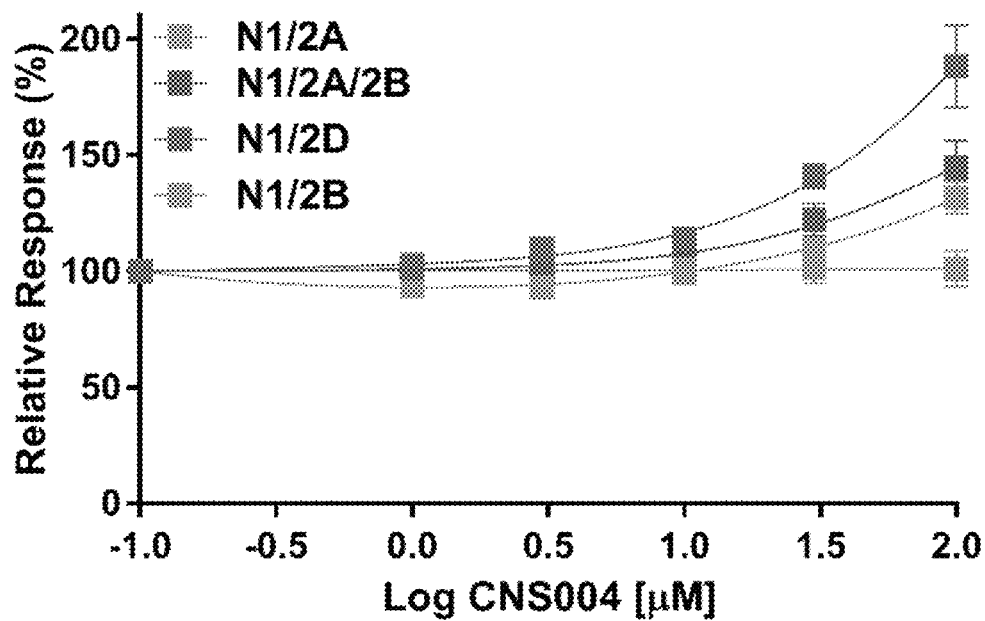
Figure 9D:
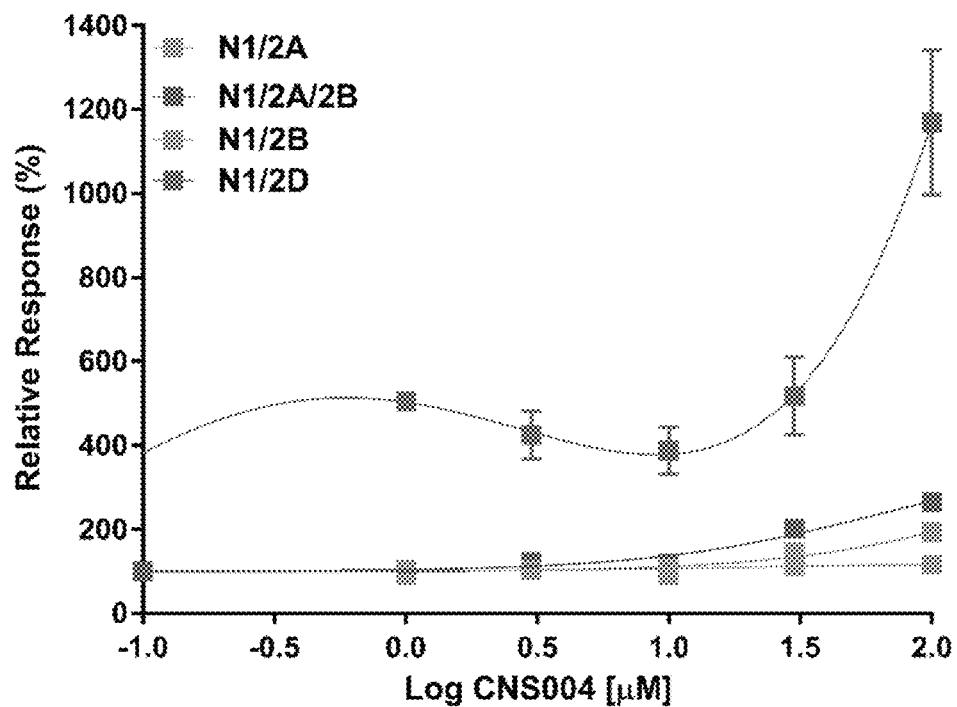
Figure 9E:
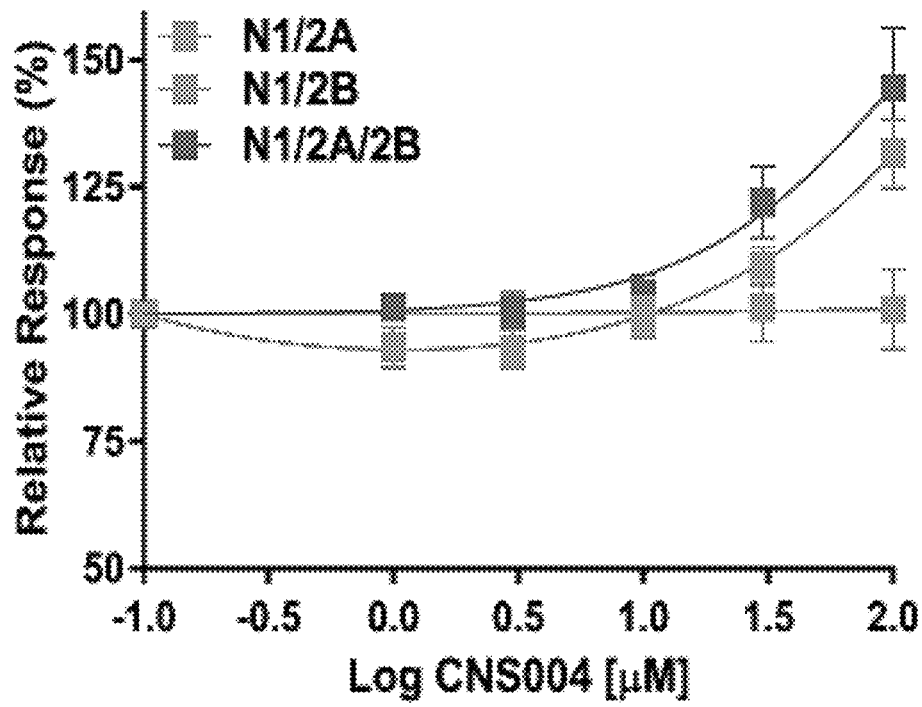
Figure 9F:
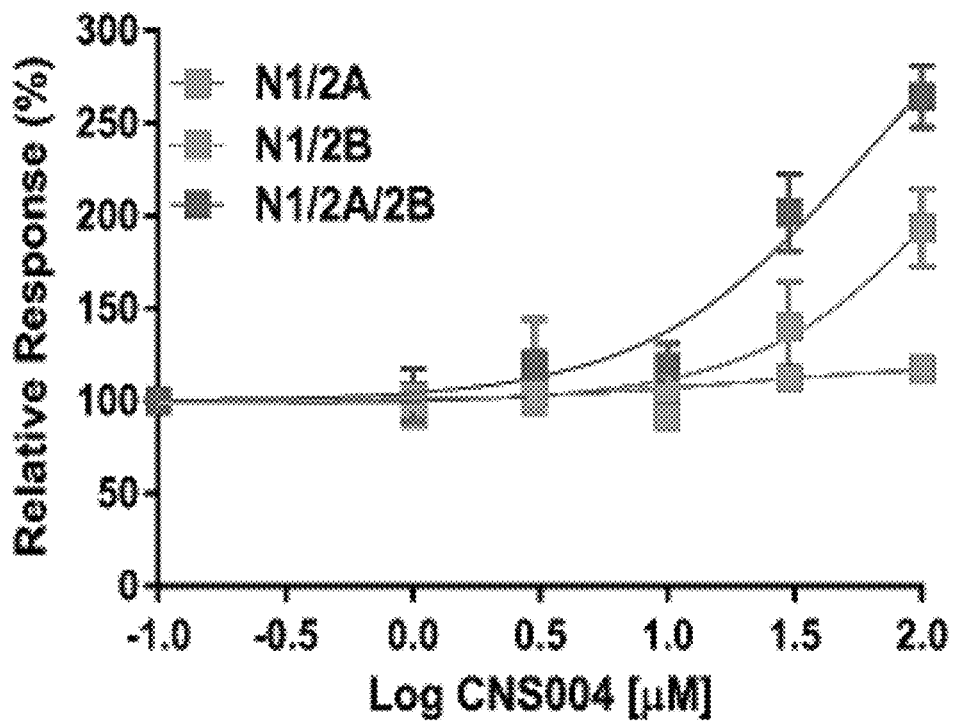
Figure 9G:
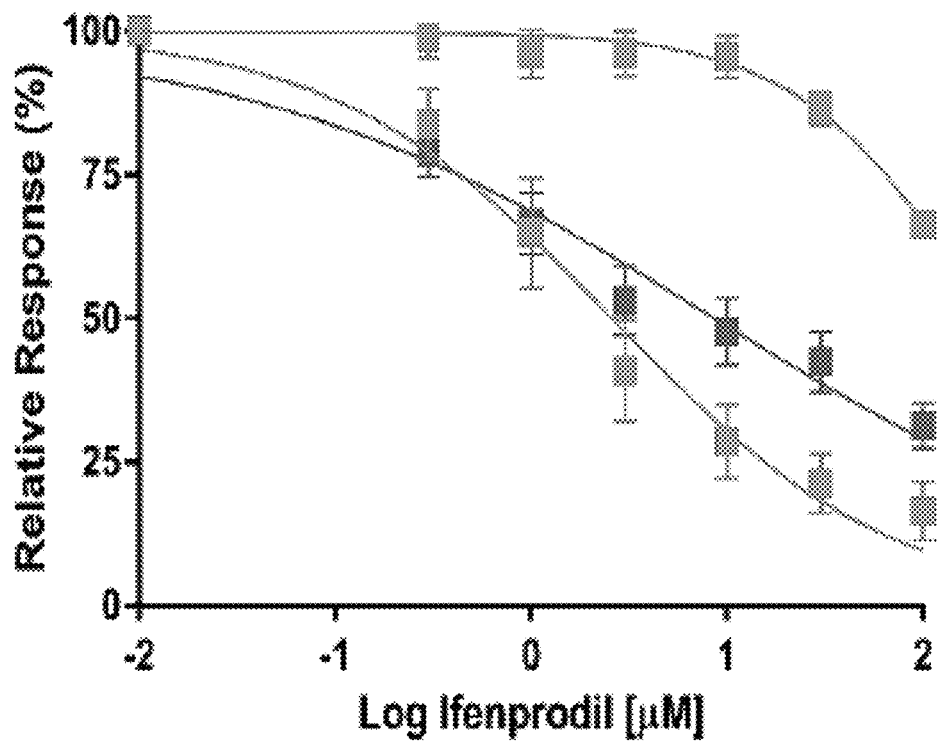
Figure 9H:
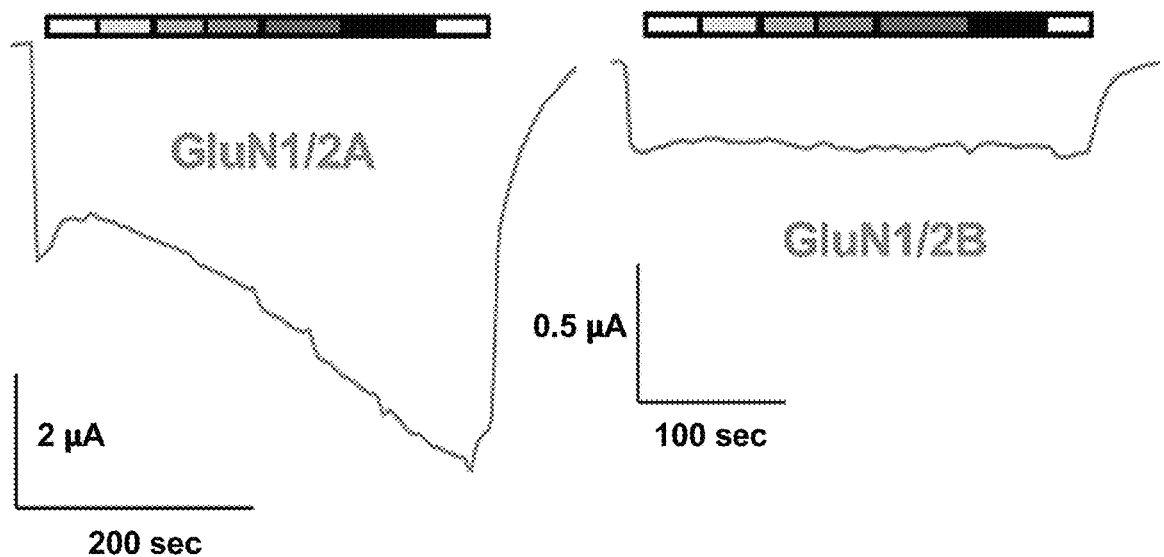
Figure 9I:
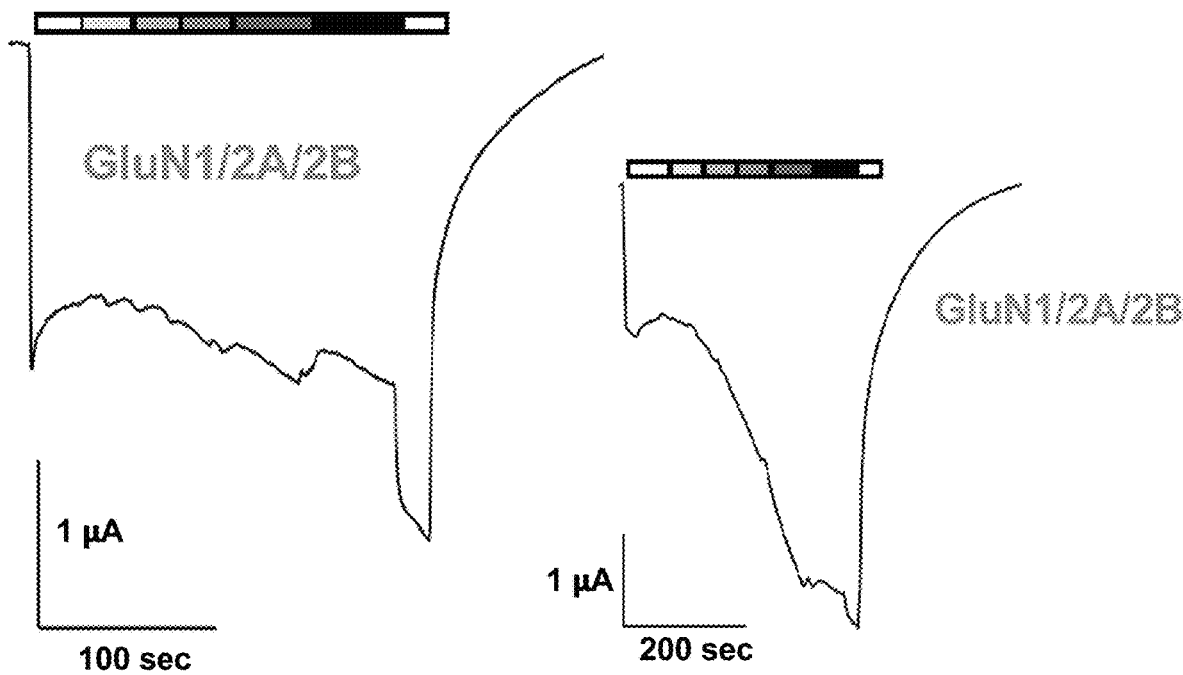

FIGS. 9A-9I can demonstrate that CNS004 can dissect triheteromeric GluN1/2A/2B NMDA receptors from diheteromeric Glu1/2A or GluN1/2B containing NMDA receptors. FIG. 9A. CNS004 dissects triheteromeric GluN1/2A/2B receptors from diheteromeric GluN1/2A containing NMDA receptors. Averaged and normalized dose response curves (DRC) show that CNS004 potentiates GluN1/2A/2B ($EC_{50}$:38.97±22.41 μM; $R^2$, 0.96±0.016, n=6) containing triheteromeric and GluN1/2B ($EC_{50}$: 8.67±2.77 μM; $R^2$, 0.98±0.009, n=9) diheteromeric receptors. It minimally inhibited GluN1/2A ($EC_{50}$: ND, n=6), GluN1/2D ($EC_{50}$: ND, n=5) and no activity on GluN1/2C ($EC_{50}$: ND, n=6) containing NMDA receptors. Agonist (10 μM glycine and 10 μM glutamate) induced maximum response is normalized to 100% in the y-axis; Numbers more than 100 at y-axis represent the potentiation. ND, not determined. FIGS. 9B-9D. are similar assays as that performed in association with FIG. 9A but performed using different agonist concentration, FIG. 9B (100 μM gly-100 μM glu), FIG. 9C (100 μM gly-300 μM glu), and FIG. 9D (100 μM gly-300 nM glu). FIGS. 9E and 9F are the same as FIGS. 9C and 9D, but without receptor 1/2D data shown. FIG. 9G can demonstrate that GluN1/2B selective antagonist, ifenprodil, exhibits an intermediate selectivity for GluN1/2A/2B receptor. FIG. 9H Representative CNS004 (1-300 μM) dose-response curves for GluN1/2A, GluN1/2B and GluN1/2A/2B NMDA receptors in 100 μM glutamate and 100 μM glycine concentrations. FIG. 9I. A representative 1-300 μM CNS004 dose-response curve for GluN1/2A/2B NMDA receptors in 10 μM glutamate and 10 μM glycine concentrations.

Figure 10A:
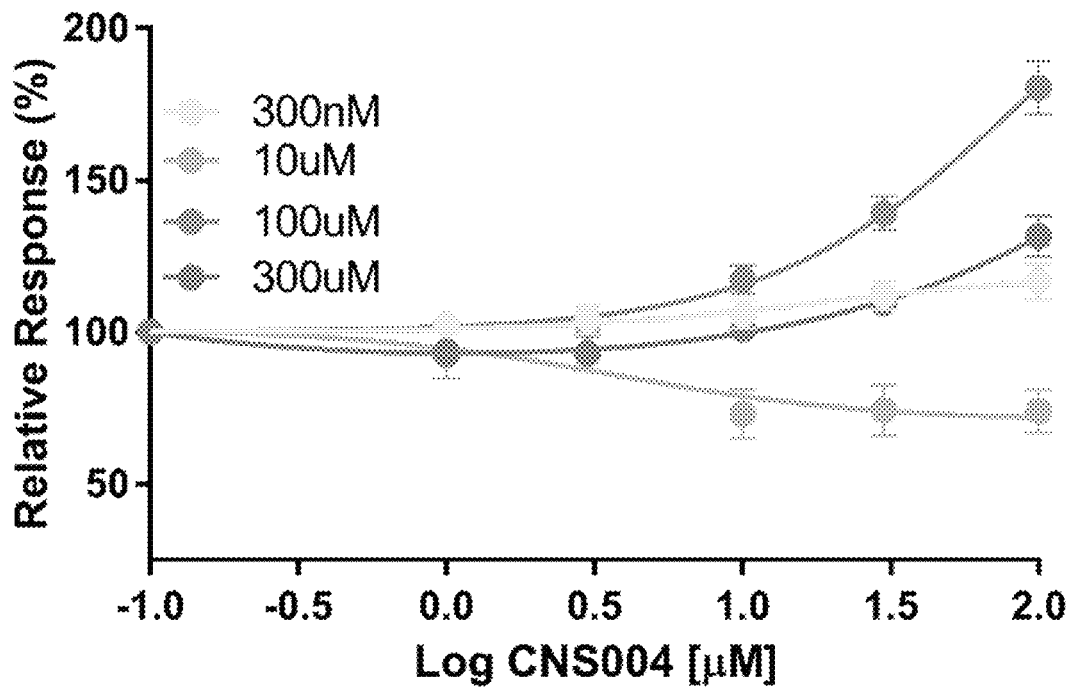
FIGS. 10A-10D show FIG. 10A (GluN1/2A), FIG. 10B (GluN1/2B), FIG. 10C (GluN1/2D), FIG. 10D (GluN1/2A/2B) shows the agonist concentration dependent effect of CNS004. All recordings were made with 100 uM glycine (except 10 uM glutamate recordings in which glycine was 10 uM) and glutamate concentration at provided in the figure.
Figure 10B:
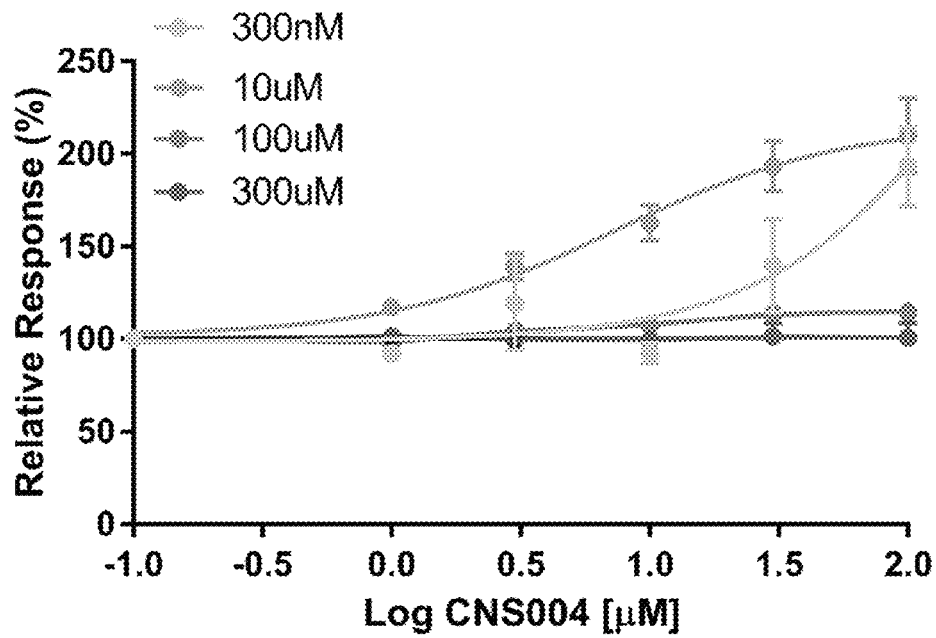
Figure 10C:
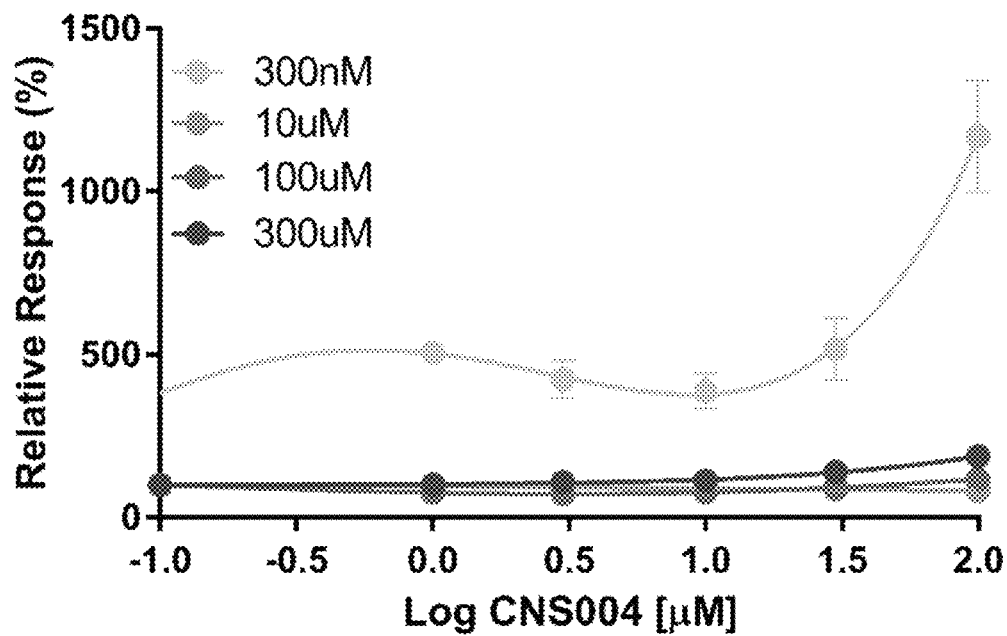
Figure 10D:
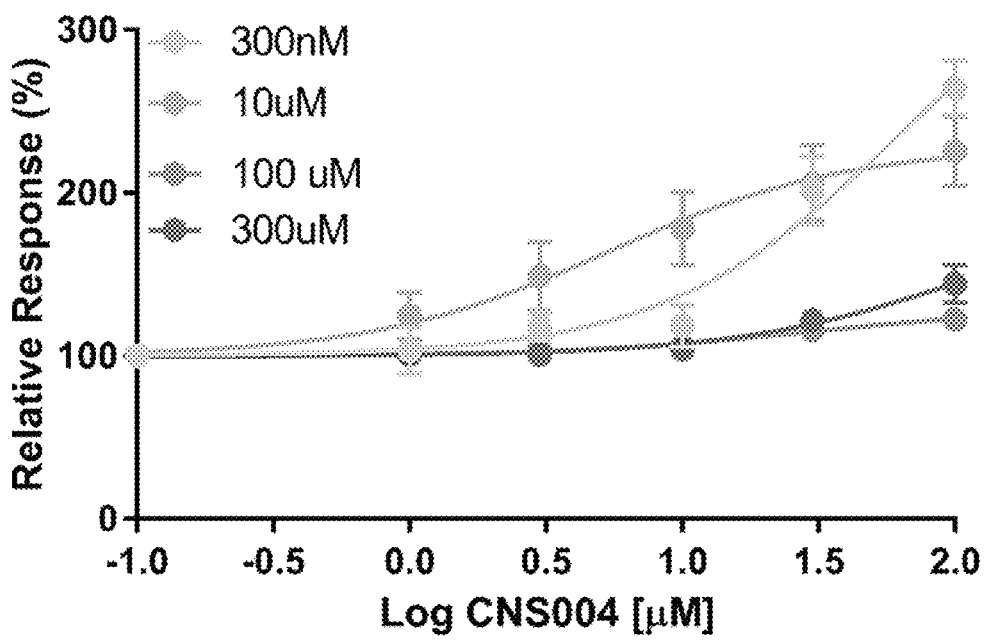
Figures 11A, 11B, 11C, 11D, 11E, 11F:
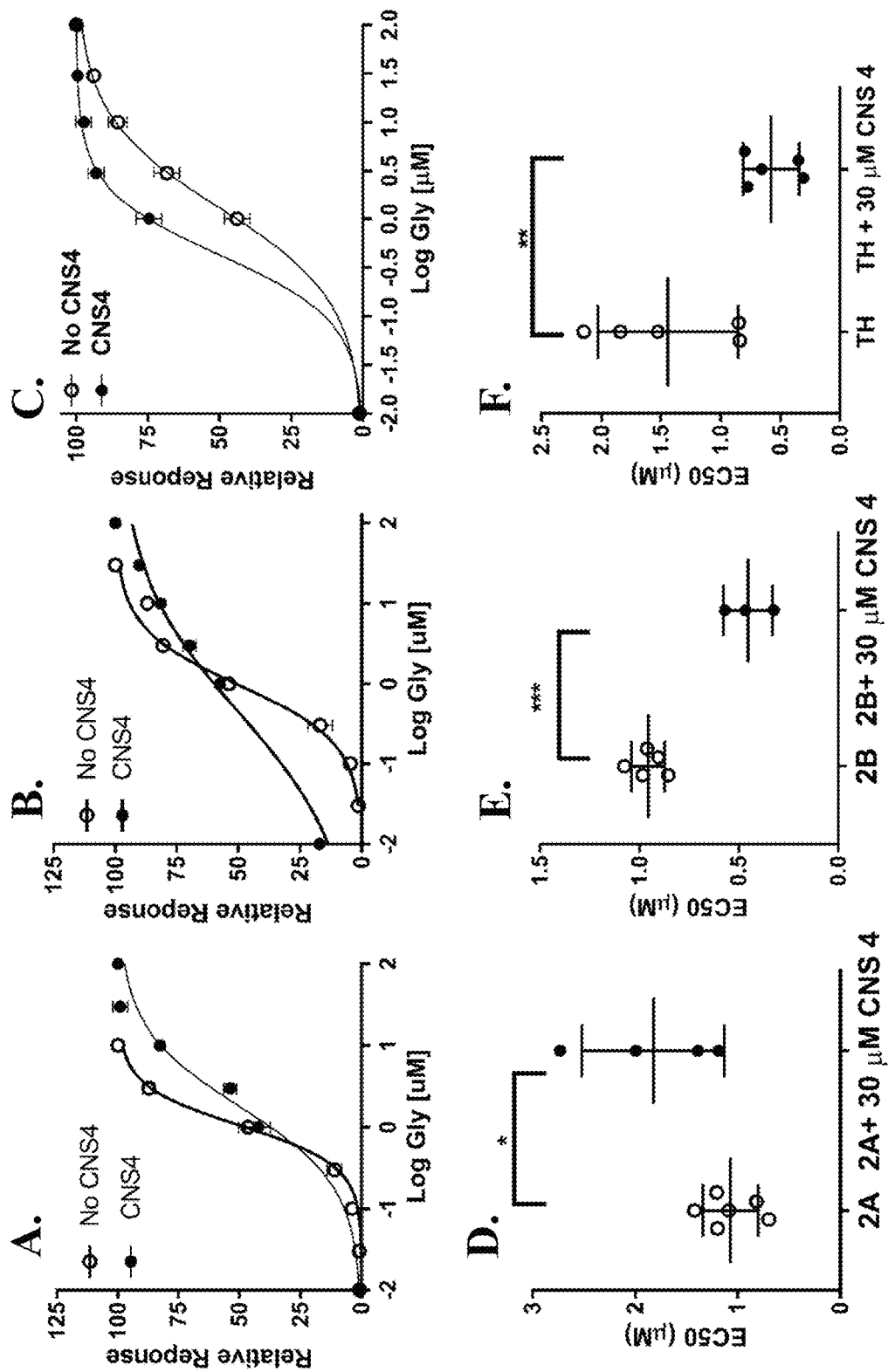
FIGS. 11A-11F show glycine dose response curves in the absence or presence of 30 uM CNS4 on GluN1/2A, GluN1/2B and GluN1/2A/2B receptors. There was an increase in glycine potency in all three receptor subtypes. Glutamate concentration was 100 uM.
Figures 12A, 12B, 12C, 12D, 12E, 12F:
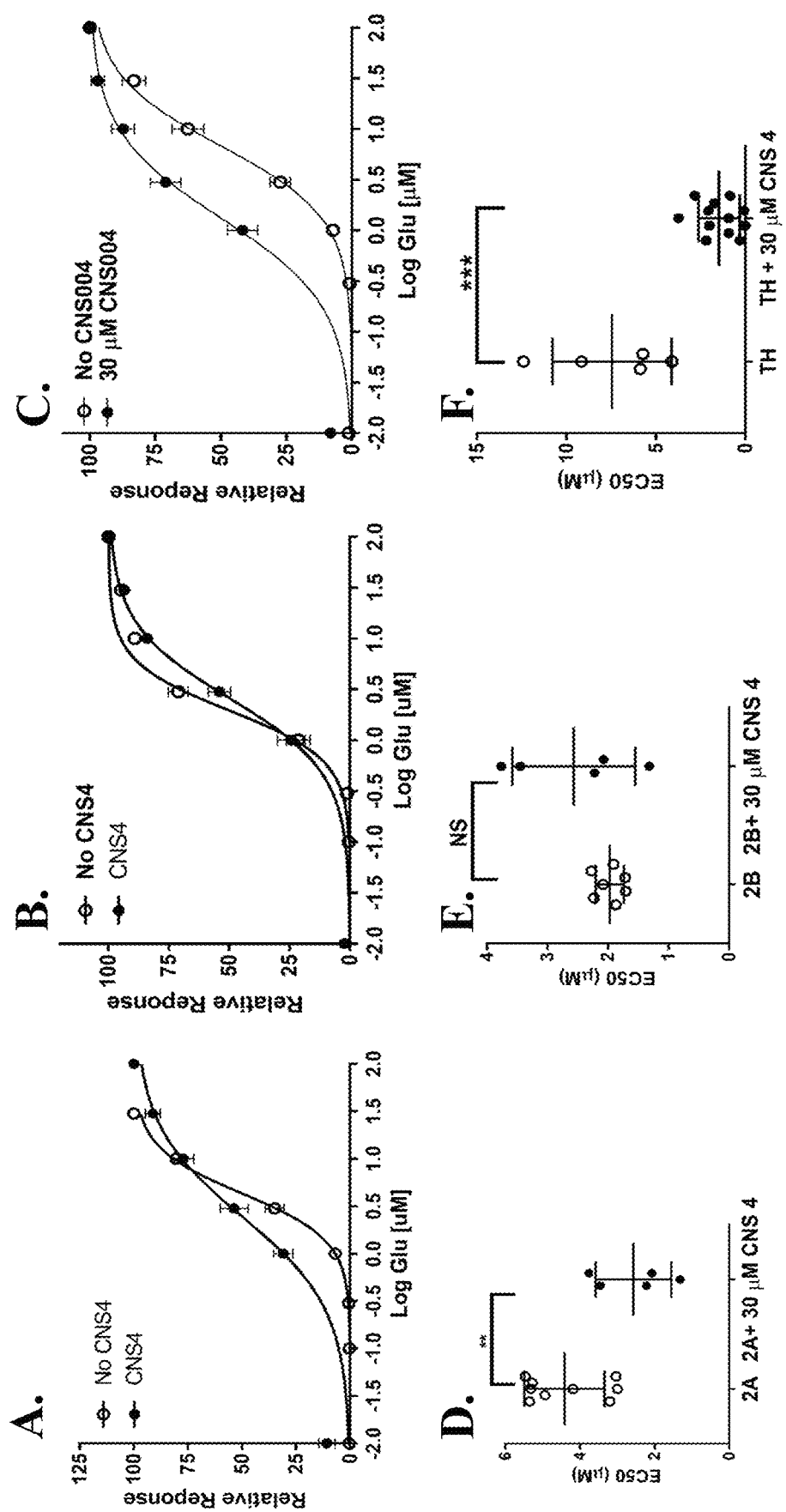
FIGS. 12A-12F show glutamate dose response curves in the absence or presence of 30 uM CNS4 on GluN1/2A, GluN1/2B and GluN1/2A/2B receptors. There was an increase in glutamate potency in GluN1/2A and TH receptors. Glycine concentration was 100 uM.

FIGS. 10A-10D show FIG. 10A (GluN1/2A), FIG. 10B (GluN1/2B), FIG. 10C (GluN1/2D), FIG. 10D (GluN1/2A/2B) shows the agonist concentration dependent effect of CNS004. All recordings were made with 100 uM glycine (except 10 uM glutamate recordings in which glycine was 10 uM) and glutamate concentration at provided in the figure.

Figure 14A:
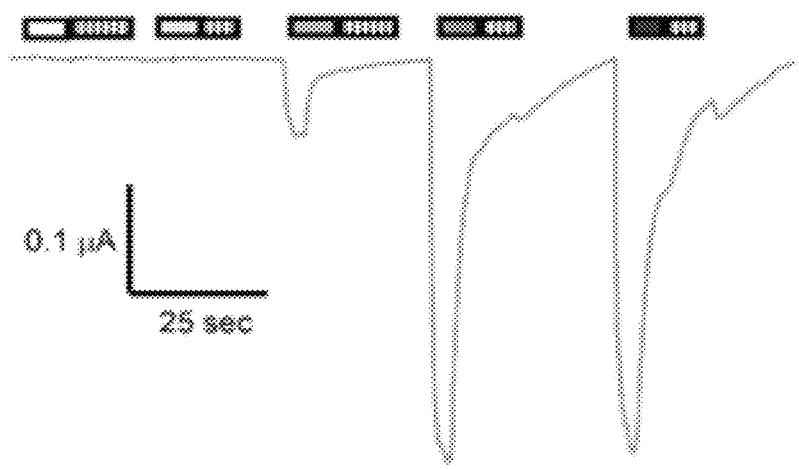
FIGS. 14A-14B show representative traces from TEVC assay, using xenopus oocytes expressing recombinant NMDA receptor subtypes (as labelled), with increasing (0, 1, 10, 100 nM & 100 μM) glycine (as marked with gradient grey bars above the traces) and constant glutamate (100 μM) concentration. Right most gray bars in each set indicate 100 μM CNS004 (with no agonist) application.
Figure 14B:
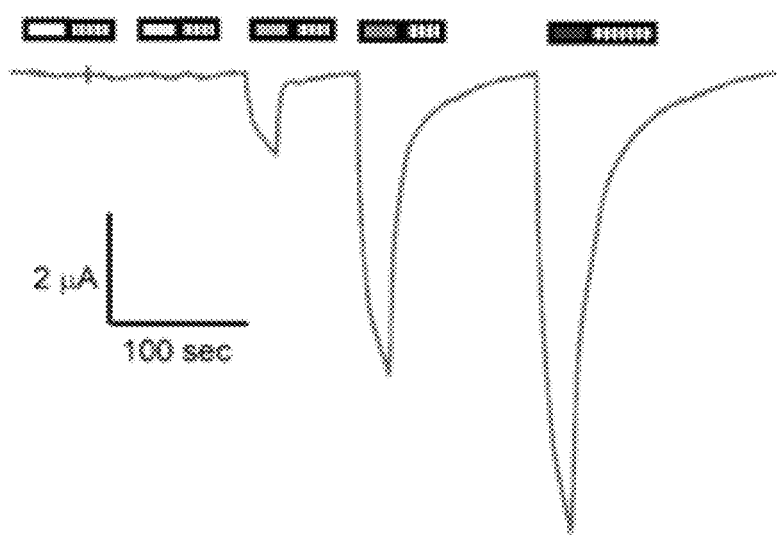
Figures 15A, 15B, 15C, 15D:
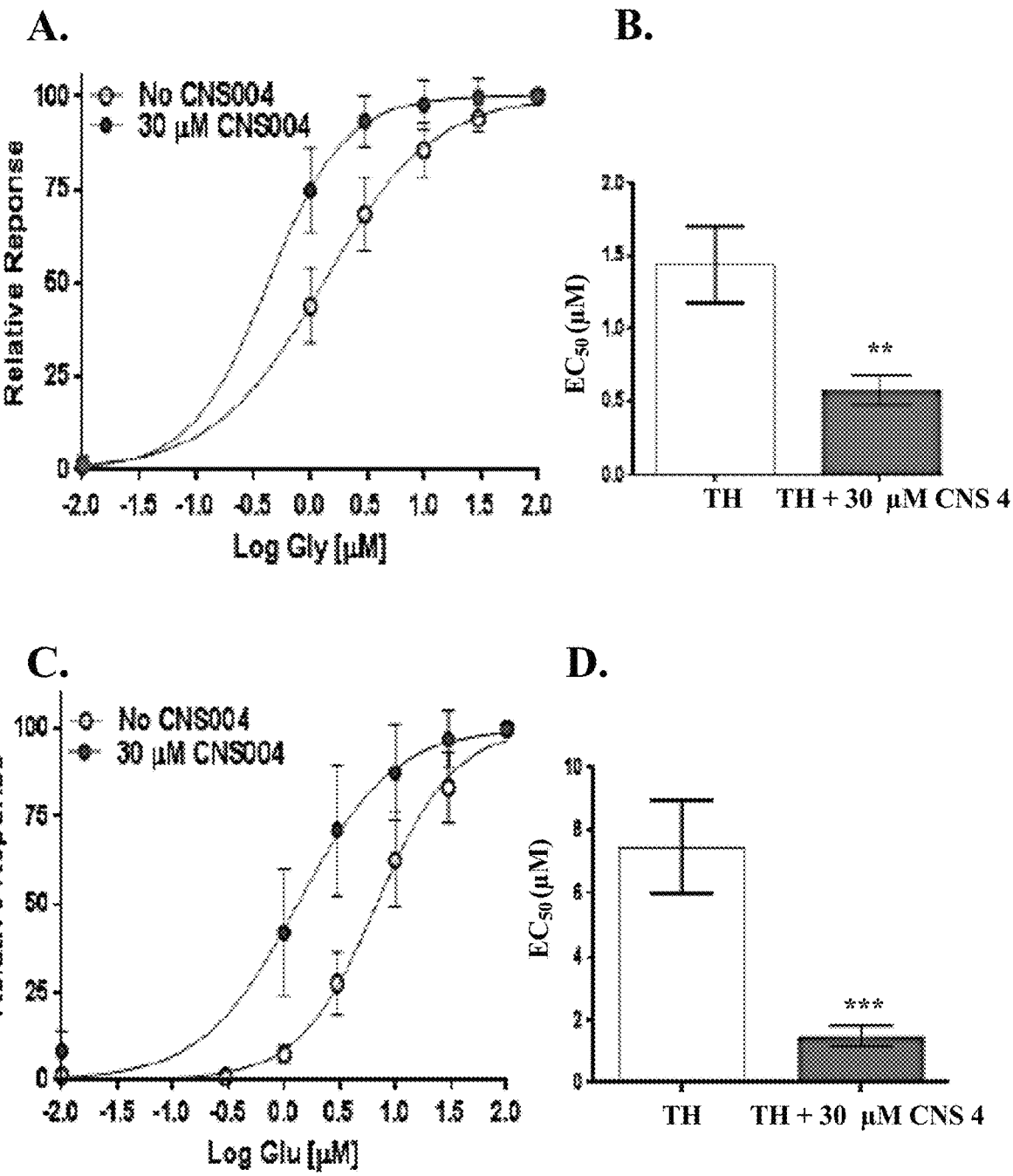
FIGS. 15A-15H can demonstrate that CNS004 increases Glycine and/or Glutamate Potency in GluN1/2A/2B NMDA Receptors. Dose-response curves of glycine (FIGS. 15A-15B) or glutamate (FIGS. 15C-15D) in the presence and absence of 30 μM CNS004 on GluN1/2A/2B receptors.
Figure 15E:
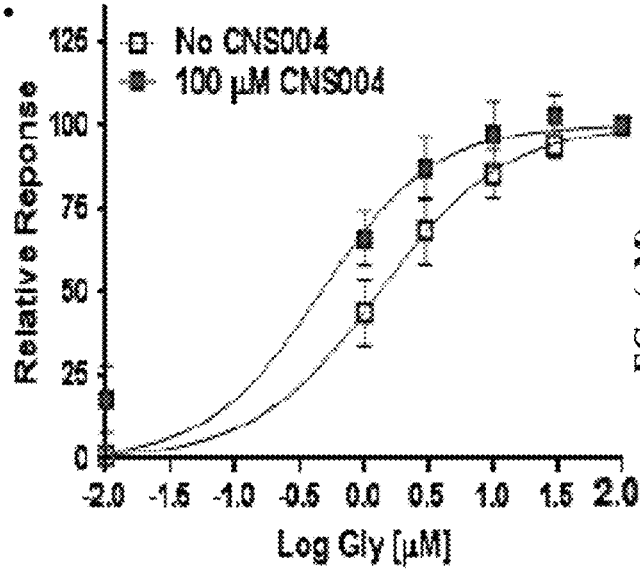
Figure 15F:
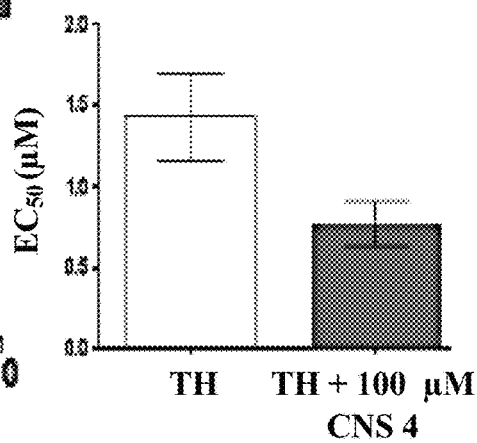
Figure 15G:
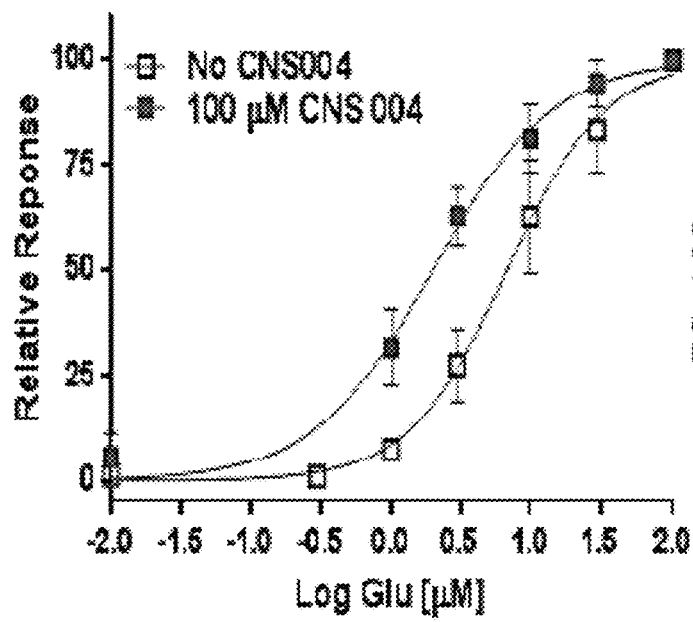
Figure 15H:
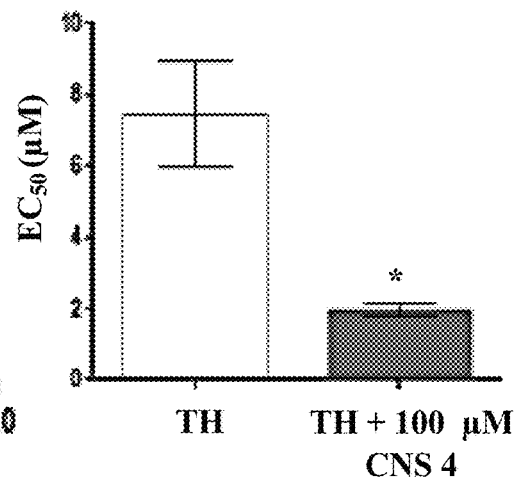
Figure 16A:
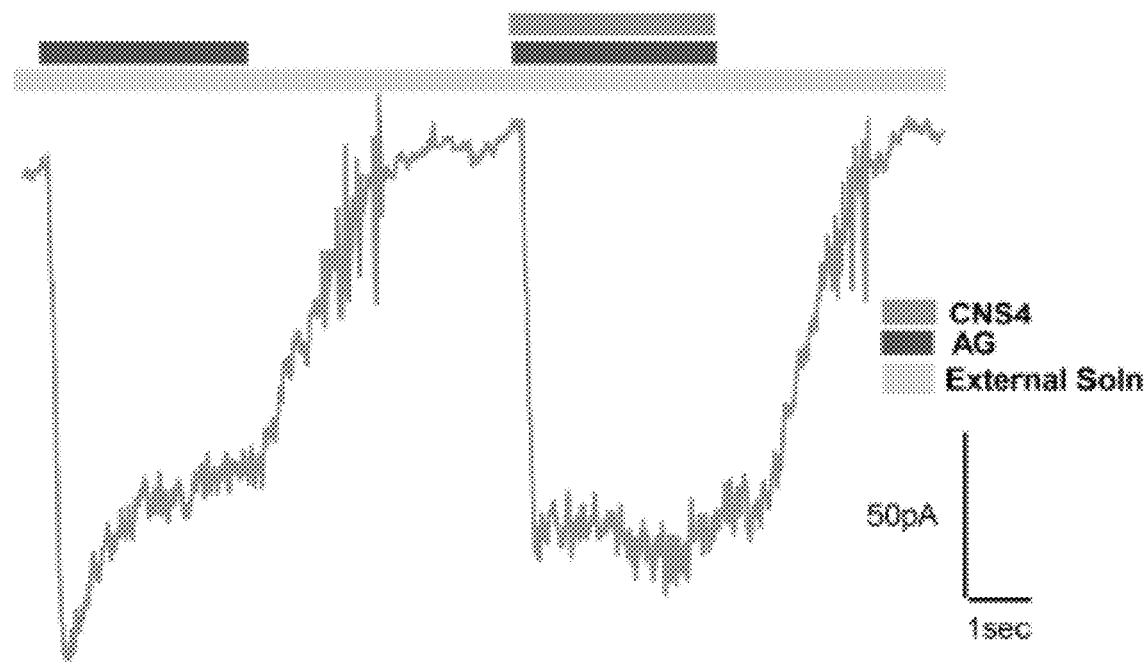
FIGS. 16A-16H can demonstrate that co-application of agonist and CNS004 potentiates steady-state currents in GluN1/2A and GluN1/2A/2B NMDA receptors. Averaged and normalized traces represent current responses of GluN1/2A (FIG. 16A) and GluN1/2A/2B (FIG. 16D) receptors activated by agonist (30 μM glycine and 100 μM glutamate, black bar) and agonist plus CNS004 (100 μM, dark grey bar) in external solution (light grey bar). Superimposed agonist and agonist plus CNS004 traces reveal potentiation of steady-state currents in GluN1/2A (FIG. 16B) and GluN1/2A/2B (FIG. 16E) receptors. Filled and unfilled circles represent the steady-state currents observed in the presence and absence of CNS004 in GluN1/2A (FIGS. 16C-16D) and GluN1/2A/2B (FIGS. 16G-16H) and whisker bars represent average and SEM. These results were obtained from patch clamp electrophysiology assay using HEK293T cells expressing above mentioned recombinant NMDA receptor subtypes. * represent statistical significance (of paired student's t-test). =p<0.01*=p<0.001.
Figure 16B:
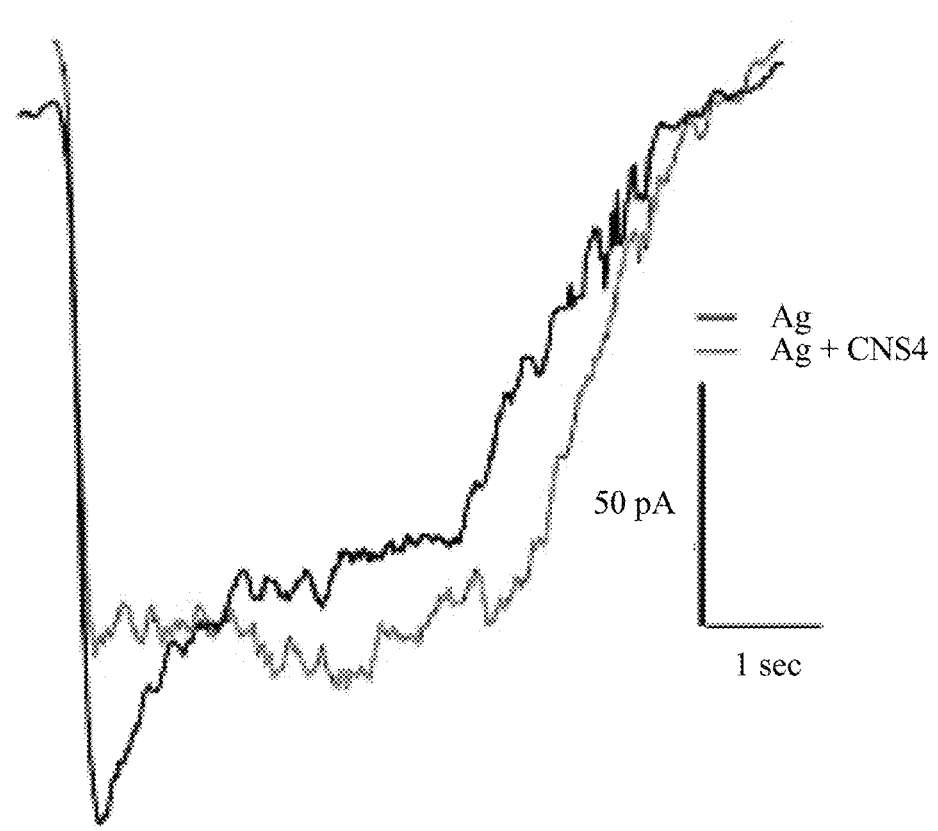
Figures 16C, 16D, 16E:
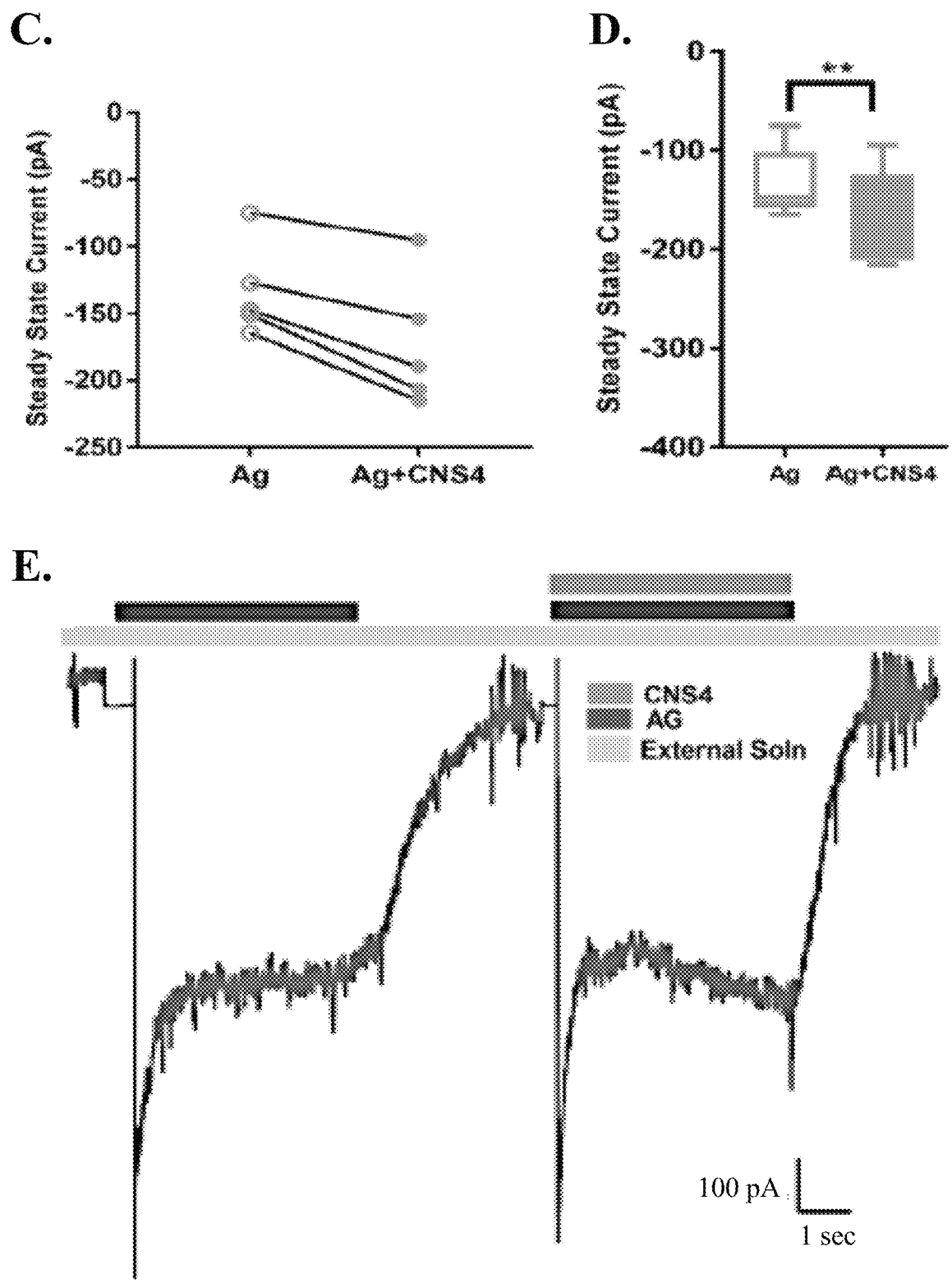
Figure 16F:
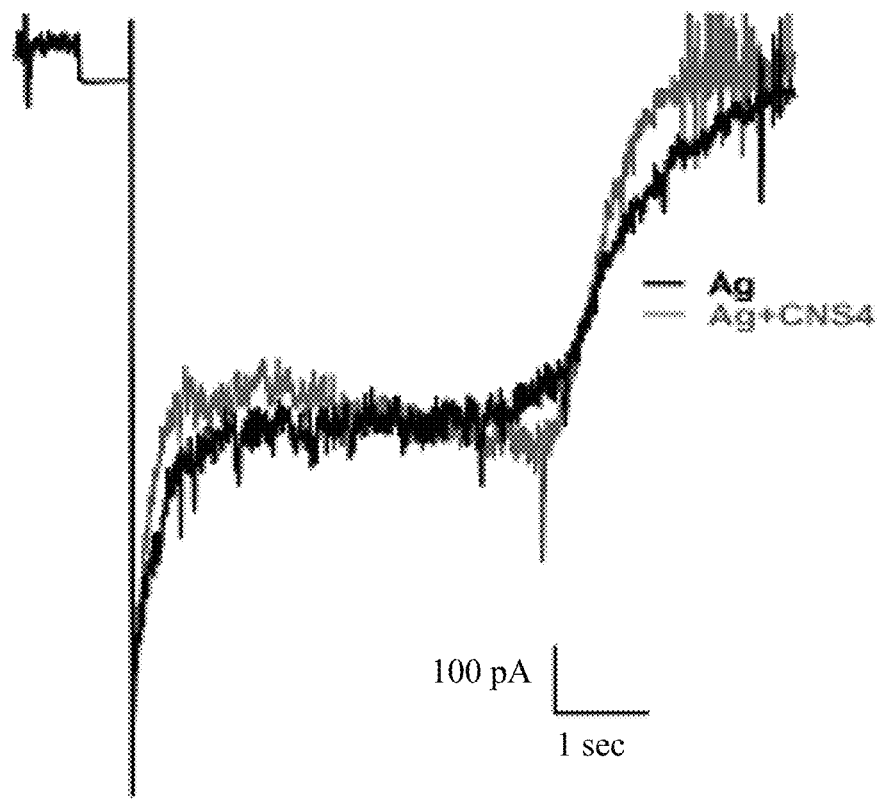
Figure 16G:
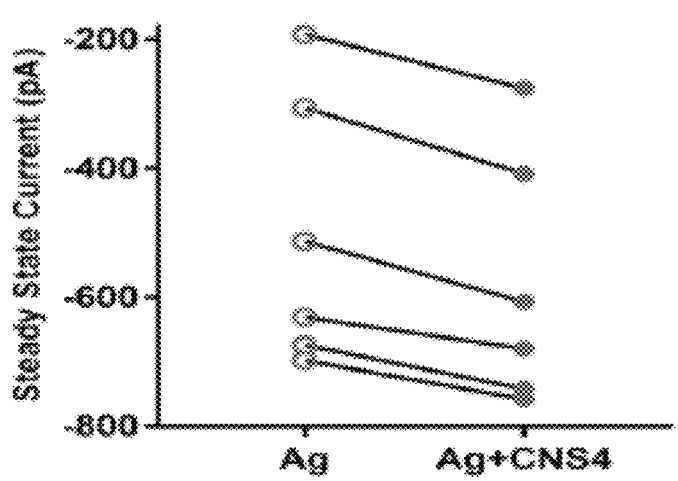
Figure 16H:
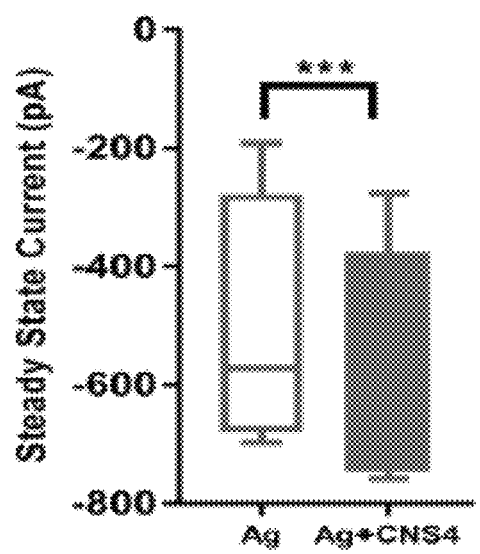
Figure 17A:
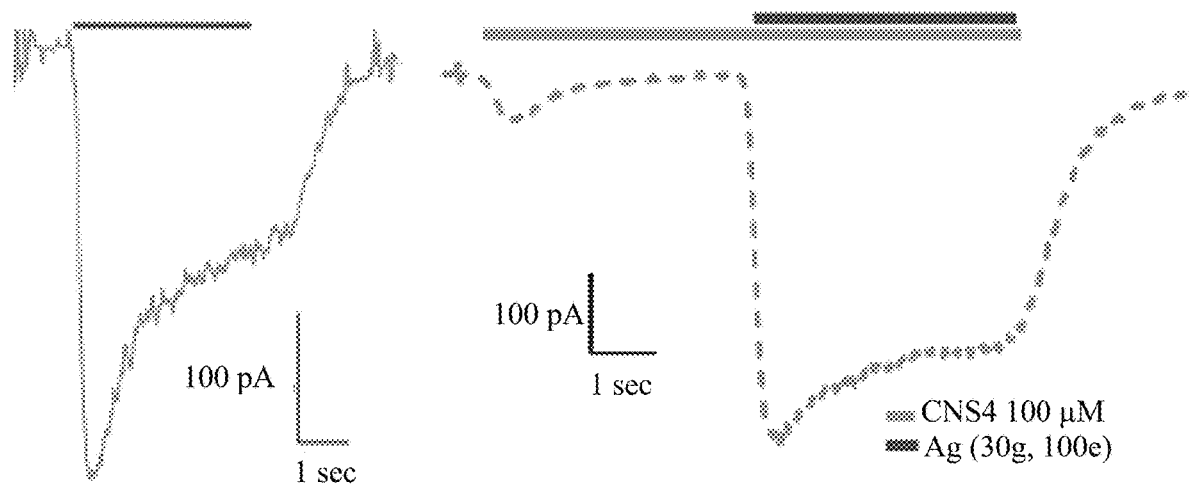
FIGS. 17A-17G can demonstrate that CNS004 pre-application promotes desensitization in GluN1/2A/2B Only. Averaged and normalized traces represent current responses of GluN1/2A (FIG. 17A) and GluN1/2A/2B (FIG. 17D) receptors activated by agonist (30 μM glycine and 100 μM glutamate, dark grey bar), and pre-application of CNS004 (100 μM, light gray bar) alone before applying agonist plus CNS004. Whisker bars represent average (and SEM) Imax and steady-state currents observed after CNS004 pre-application in GluN1/2A (FIG. 17B) and GluN1/2A/2B (FIG. 17E) receptors. Superimposed traces reveal CNS004 pre-application induced changes in peak and steady-state currents with GluN1/2A (FIG. 17C) and a steep reduction in steady-state currents with GluN1/2A/2B (FIG. 17F) receptor. Whisker bars (FIG. 17G) represent average (and SEM) of peak to steady-state in GluN1/2A (FIG. 17A) and GluN1/2A/2B (FIG. 17D) receptors. These results were obtained from patch clamp electrophysiology assay using HEK293T cells expressing above mentioned recombinant NMDA receptor subtypes. * represent statistical significance (of unpaired student's t-test). =p<0.01*=p<0.001, ****=p<0.0001.
Figure 17B:
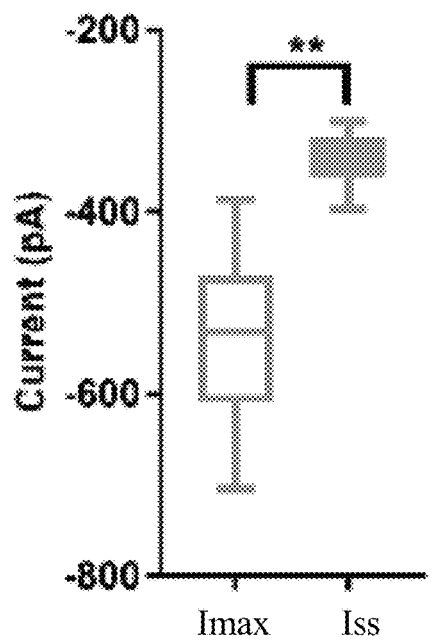
Figure 17C:
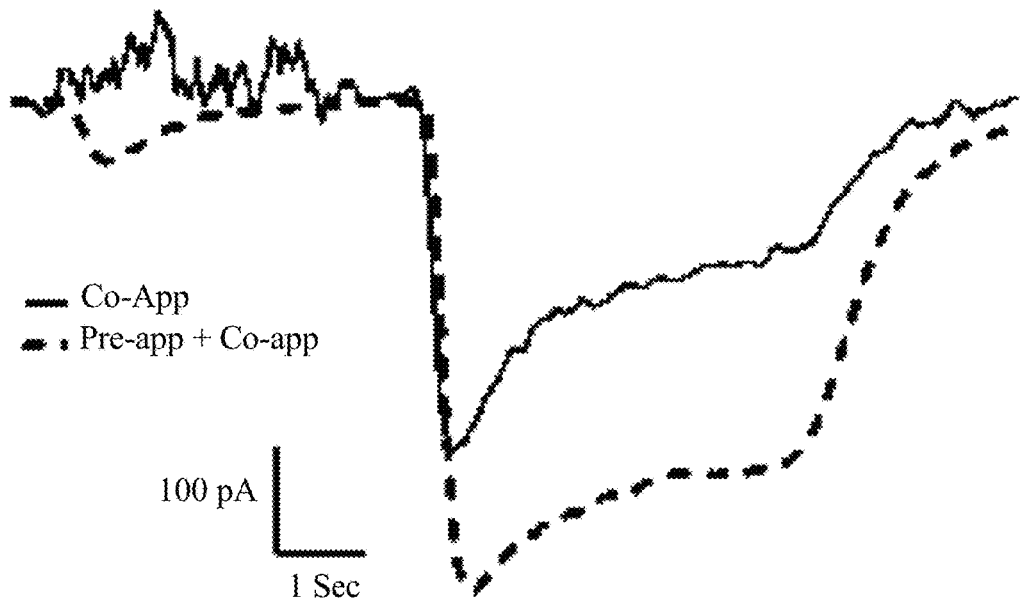
Figure 17D:
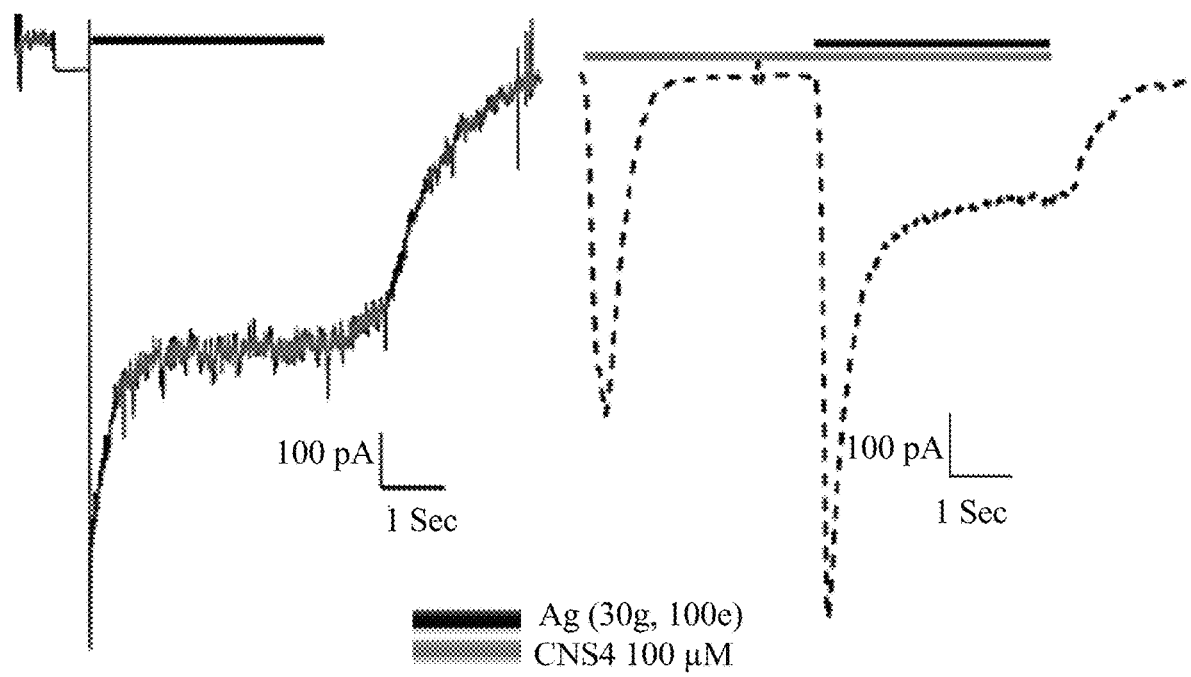
Figure 17E:
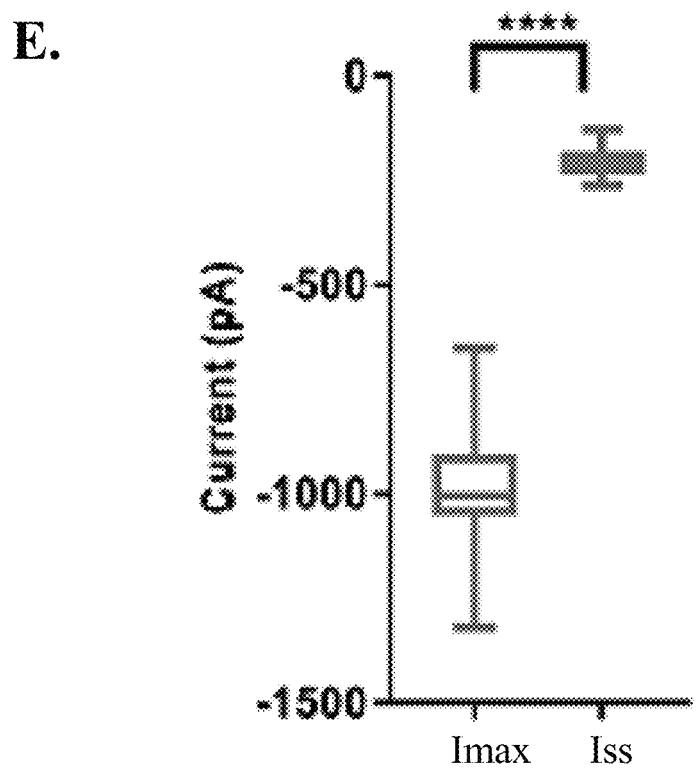
Figure 17F:
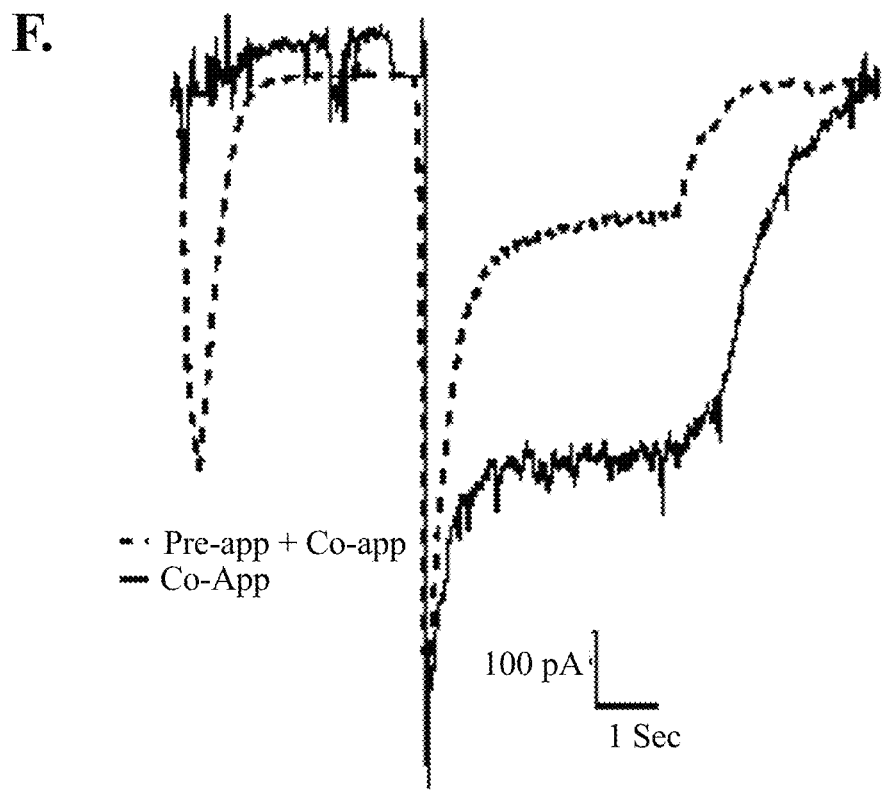
Figure 17G:
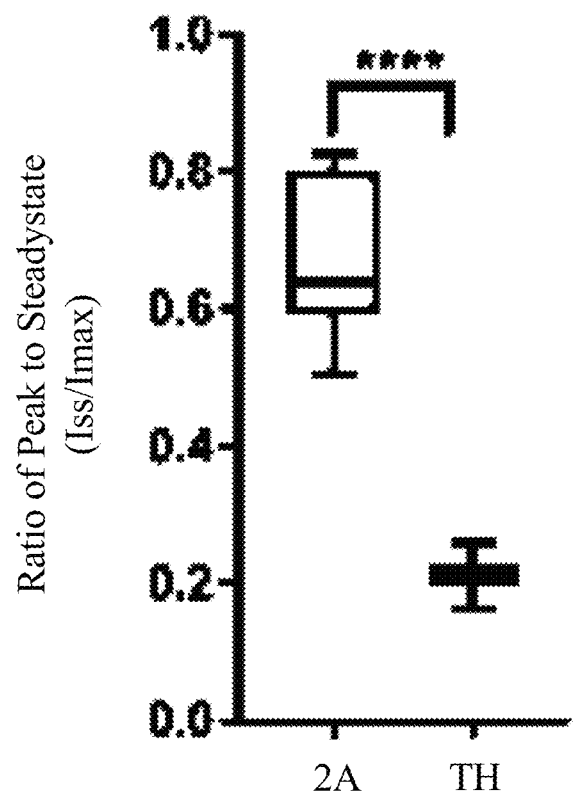

FIGS. 14A-14B show representative traces from TEVC assay, using xenopus oocytes expressing recombinant NMDA receptor subtypes (as labelled), with increasing (0, 1, 10, 100 nM & 100 μM) glycine (as marked with gradient grey bars above the traces) and constant glutamate (100 μM) concentration. Right most gray bars in each set indicate 100 μM CNS004 (with no agonist) application.

Example 6—CNS004 Increases Agonist Potency in NMDA Receptors

Methods for TEVC and patch clamp are as described with respect to Example 5 herein.

FIGS. 11A-11F show glycine dose response curves in the absence or presence of 30 uM CNS4 on GluN1/2A, GluN1/2B and GluN1/2A/2B receptors. There was an increase in glycine potency in all three receptor subtypes. Glutamate concentration was 100 uM.

FIGS. 12A-12F show glutamate dose response curves in the absence or presence of 30 uM CNS4 on GluN1/2A, GluN1/2B and GluN1/2A/2B receptors. There was an increase in glutamate potency in GluN1/2A and TH receptors. Glycine concentration was 100 uM.

Figures 13A, 13B, 13C:
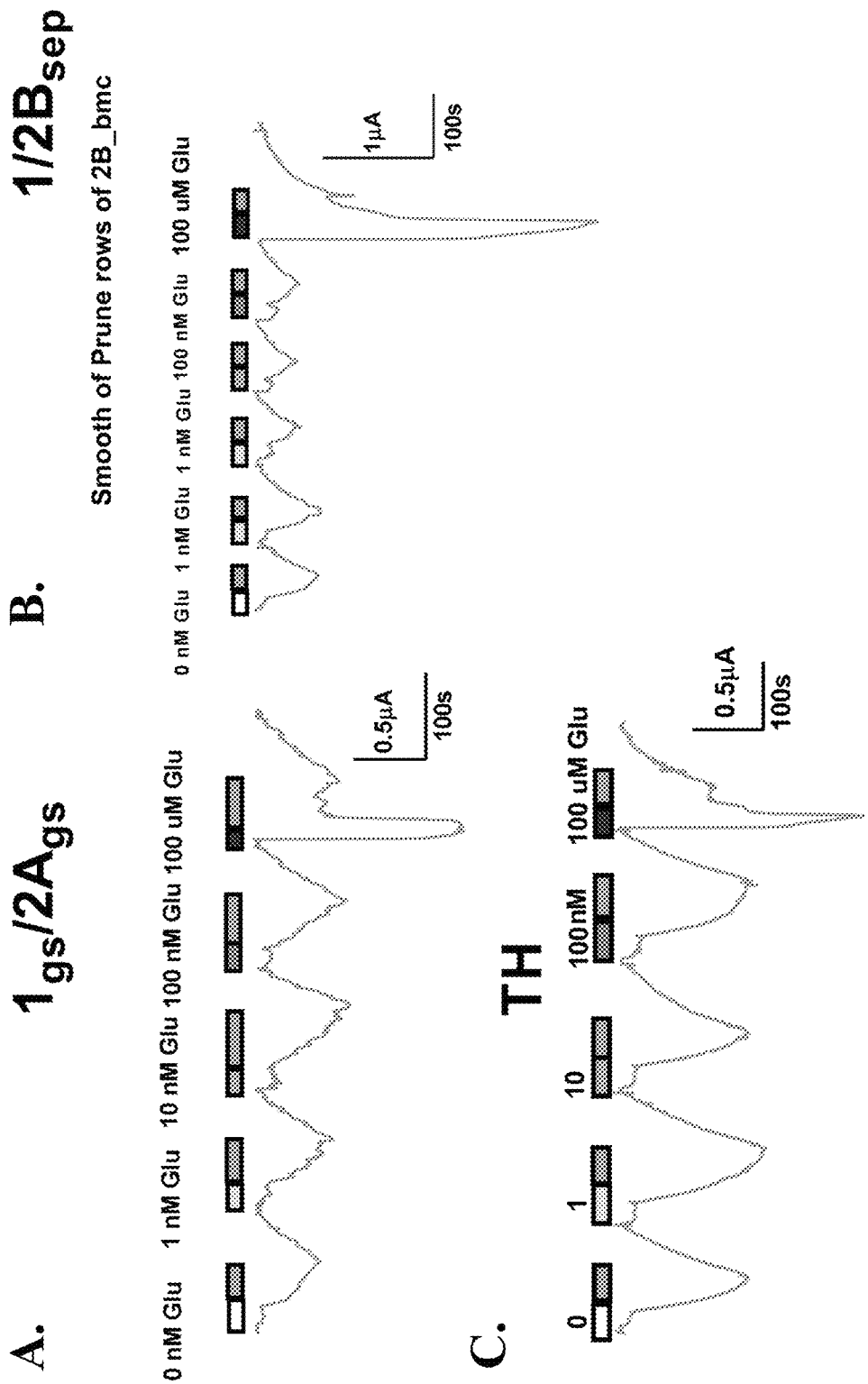
FIGS. 13A-13D show representative traces (FIGS. 13A-13C) from TEVC assay, using xenopus oocytes expressing recombinant NMDA receptor subtypes (as labelled), with increasing (0, 1, 10, 100 nM & 100 μM) glutamate (as marked with gradient grey bars above the traces) and constant glycine (100 μM) concentration. Right most grey in each set bars indicate 100 μM CNS004 (with no agonist) application.
Figure 13D:
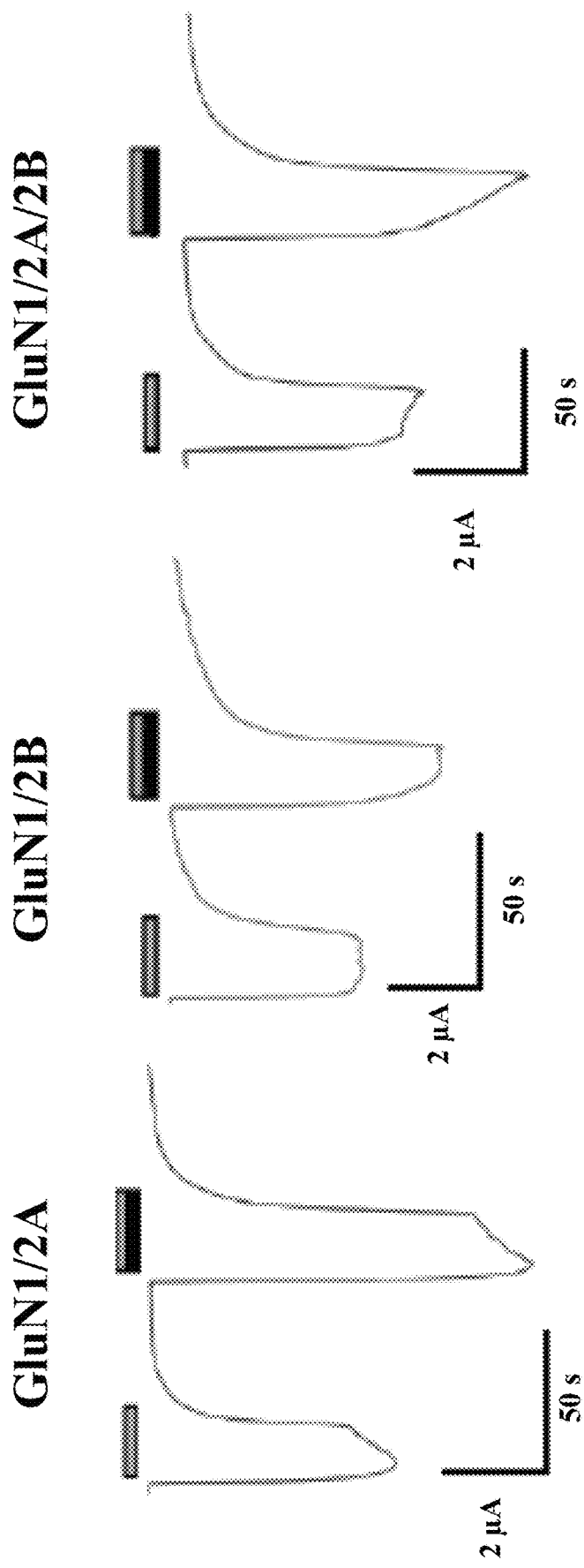

FIGS. 13A-13D show representative traces (FIGS. 13A-13C) from TEVC assay, using xenopus oocytes expressing recombinant NMDA receptor subtypes (as labelled), with increasing (0, 1, 10, 100 nM & 100 μM) glutamate (as marked with gradient grey bars above the traces) and constant glycine (100 μM) concentration. Right most grey in each set bars indicate 100 μM CNS004 (with no agonist) application. FIG. 13D shows traces from a similar assay as described in relation to FIGS. 13A-13C with increasing (0, 1, 10, 100 nM, and 100 μM glycine and constant glycine (100 μM) concentration.

Example 7—CNS004 Increases Glycine and/or Glutamate Potency in GluN1/2A/2B NMDA Receptors FIGS. 15A-15H can demonstrate that CNS004 increases Glycine and/or Glutamate Potency in GluN1/2A/2B NMDA Receptors. Dose-response curves of glycine (FIGS. 15A-15B) or glutamate (FIGS. 15C-15D) in the presence and absence of 30 μM CNS004 on GluN1/2A/2B receptors. FIGS. 15E-15H represent similar dose-response curves in the presence and absence of 100 μM CNS004. Histograms represent average $EC_{50}$ and statistical significance (of unpaired student's t-test). *=p<0.05, *=p<0.01***=p<0.001. Methods for TEVC and patch clamp experiments are as described with respect to Example 5 herein.

Example 8—NMDA Receptor Subunit Selectivity of CNS004 Analogs

Table 4 shows the average response of GluN1/2A, GluN1/2B, and GluN1/2A/2B (TH) as expressed as % inhibition of various CNS004 analogs.

TABLE 4

Selectivity of CNS004 Analogues

| Compound (100 μM) | NMDA Receptor Subunit Type | | |
| --- | --- | --- | --- |
| | 1/2A | 1/2B | TH |
| | Average Response (% inhibition) | | |
| CNS 41 | −76.1696 | −14.5863 | −3.95369 |
| CNS 42 | −52.246 | −45.1553 | −13.1155 |
| CNS 43 | 20.43303 | 5.754588 | 4.722372 |
| CNS 44 | 7.116948 | 9.467786 | −2.57094 |
| CNS 45 | −21.076 | 6.738861 | 7.444407 |
| CNS 46 | −1.85752 | 3.871504 | 16.4617 |
| CNS 47 | 0.495885 | 6.998048 | 8.377126 |
| CNS 48 | −31.9381 | −19.0618 | −11.9509 |
| CNS 49 | 15.8054 | 0.678547 | 27.54292 |
| CNS 50 | −3.81036 | −56.1908 | −3.49401 |

Various modifications and variations of the described methods, pharmaceutical compositions, and kits of the invention will be apparent to those skilled in the art without departing from the scope and spirit of the invention. Although the invention has been described in connection with specific embodiments, it will be understood that it is capable of further modifications and that the invention as claimed should not be unduly limited to such specific embodiments. Indeed, various modifications of the described modes for carrying out the invention that are obvious to those skilled in the art are intended to be within the scope of the invention. This application is intended to cover any variations, uses, or adaptations of the invention following, in general, the principles of the invention and including such departures from the present disclosure come within known customary practice within the art to which the invention pertains and may be applied to the essential features herein before set forth.

Further attributes, features, and embodiments of the present invention can be understood by reference to the following numbered aspects of the disclosed invention. Reference to disclosure in any of the preceding aspects is applicable to any preceding numbered aspect and to any combination of any number of preceding aspects, as recognized by appropriate antecedent disclosure in any combination of preceding aspects that can be made. The following numbered aspects are provided:

1. A compound of Formula I

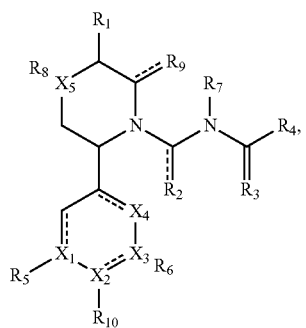

Formula I wherein R₁ is selected from the group consisting of: H₂, an aldehyde, an alkane, and an alkyl, where each are optionally substituted, wherein R₂ and R₃ are each individually selected from the group consisting of: S, O, and NH, wherein R₄ is selected from the group consisting of: an alkane, an alkene, an alkyl, an aryl, a heterocycle, a bicycloalkane, an alkoxy, and combinations thereof, wherein each are optionally substituted, wherein R₅, when optionally present, is selected from the group consisting of: H, H₂, an alkyl, and a nitrile, which are optionally substituted, wherein R₆, when optionally present, is selected from the group consisting of: H, H₂, an alkyl, and a nitrile, which are optionally substituted, wherein R₇ is selected from the group consisting of: H and an alkyl, which are optionally substituted, wherein R₈, when optionally present, is selected from the group consisting of: H, H₂, and an alkyl, which is optionally substituted, wherein R₉ is selected from the group consisting of: H₂, =O, =N, and =S, wherein R₁₀, when optionally present, is H or H₂, wherein X₁-X₃ and X₅ are each individually selected from the group consisting of: C, CH₂, and N, and wherein X₄ is CH, CH₂, or N.

2. The compound of aspect 1, wherein the compound is Compound 1

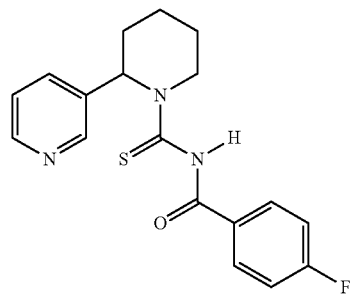

3. The compound of any of aspects 1 or 2, wherein R₁ is selected from the group consisting of: H₂,

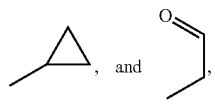

wherein R₂ and R₃ are each independently selected from the group consisting of: S, O, and NH, wherein R₄ is selected from the group consisting of:

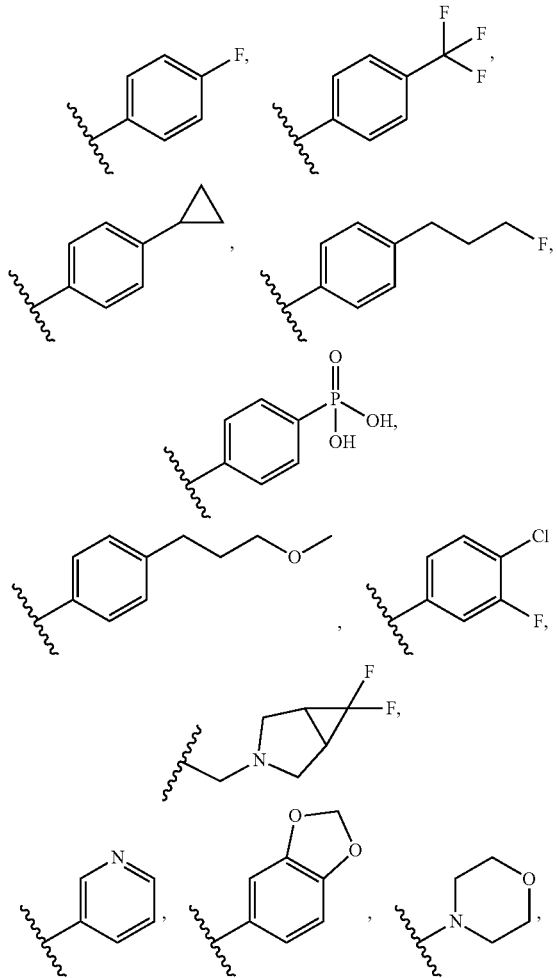

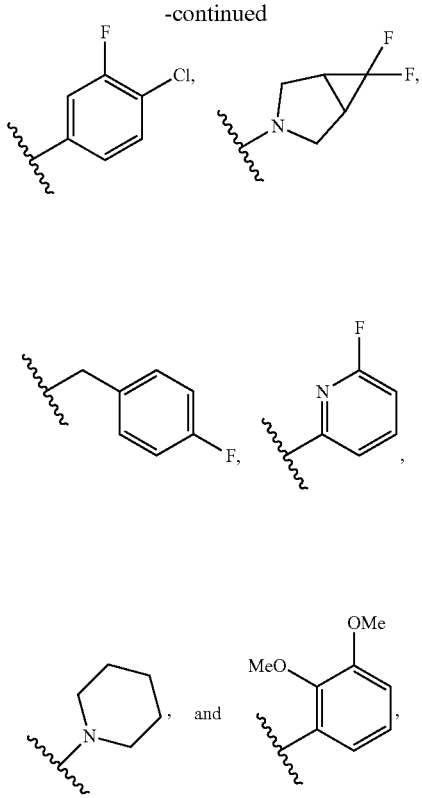

wherein $R_5$, when optionally present, is selected from the group consisting of: H, $H_2$, a nitrile, wherein $R_6$, when optionally present, is selected from the group consisting of: H, $H_2$, a nitrile, and $CH_3$, wherein $R_7$ is H or $CH_3$, wherein $R_8$, when optionally present, is $H_2$ or $CH_3$, wherein $R_9$ is $H_2$ or =O, wherein $R_{10}$, when optionally present, H or $H_2$, wherein $X_1$ and $X_5$ are each individually selected from the group consisting of: C, N, and O, wherein $X_2$ and $X_3$ are each individually selected from the group consisting of: C and N, and wherein $X_4$ is N or CH.

4. The compound of any of aspects 1-3, wherein $R_1$ is $H_2$, wherein $R_2$ is O or S, wherein $R_3$ is O, wherein $R_4$ is

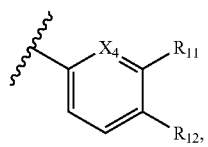

wherein $X_4$ is N or CH, wherein $R_{11}$ is F, OMe, or H, and $R_{12}$ is F, $CF_3$, $C_1$, OMe, cyclopropyl, —$(CH_2)_3F$, (—$CH_2)_3OMe$, or $PO(OH)_2$.

5. The compound of any of aspects 1 and 3-4, wherein the compound is any of compounds (2)-(41).

6. The compound of any of aspects 1-5, wherein the compound is selective for a tri-heteromeric N-methyl-D-aspartate (NMDA) receptor.

7. The compound of aspect 6, wherein the tri-heteromeric NMDA receptor is GluN1/2A/2B.

8. The compound of any of aspects 1-7, wherein the compound is a biased allosteric modulator of an N-methyl-D-aspartate (NMDA) receptor.

9. The compound of any of aspects 1-8, wherein the compound is a biased allosteric modulator of a tri-heteromeric N-methyl-D-aspartate (NMDA) receptor.

10. The compound of aspect 9, wherein the tri-heteromeric NMDA receptor is GluN1/2A/2B.

11. A pharmaceutical formulation comprising:
a compound as in any of aspects 1-10 or a pharmaceutically acceptable salt thereof and a pharmaceutically acceptable carrier.

12. The pharmaceutical formulation of aspect 11, wherein the pharmaceutical formulation comprises an auxiliary active agent.

13. The pharmaceutical formulation aspect 12, wherein the auxiliary active agent is a N-methyl-D-aspartate (NMDA) receptor antagonist, antagonist, or other NMDA receptor modulator.

14. A method of treating or preventing a disease or a symptom thereof in a subject comprising: administering a compound as in any one of claims 1-10 or a pharmaceutical formulation thereof such as that in aspects 11-13 to the subject in need thereof.

15. The method of aspect 14, wherein the disease is an N-methyl-D-aspartate (NMDA) receptor-mediated disease.

16. The method of any of aspects 14-15, wherein the disease is a neurological or a psychiatric disease.

17. The method of any of aspects 14-16, wherein the disease is a tri-heteromeric NMDA receptor-mediated disease.

18. The method of aspect 17, wherein the tri-heteromeric NMDA receptor is GluN1/2A/2B.

19. The method of any of aspects 14-18, further comprising administering an auxiliary active agent to the subject in need thereof.

20. The method of aspect 19, wherein the auxiliary active agent is an NMDA receptor antagonist, agonist, or other NMDA receptor modulator.

21. The method of any of aspects 14-20, wherein the disease is a cancer, a thrombosis disease, an autoimmune disease, a heart disease, a kidney disease, a lung disease, or a blood vessel disease.

22. Use of a compound as in any of aspects 1-10 as a medicament to treat an N-methyl-D-aspartate (NMDA) receptor-mediated disease or a symptom thereof.

23. Use of a compound as in any of aspects 1-10 in the manufacture of a medicament to treat an N-methyl-D-aspartate (NMDA) receptor-mediated disease or a symptom thereof.

24. A kit comprising: an amount of a compound as in any of aspects 1-10 or a pharmaceutical formulation thereof, such as those in aspects 11-13; and instructions fixed in a tangible medium of expression that provide directions for treatment or prevention of an N-methyl-D-aspartate (NMDA) receptor-mediated disease or a symptom thereof using the compound or pharmaceutical formulation thereof.

25. The kit of aspect 24, wherein the kit further comprises an auxiliary active agent.

26. The kit of any of aspects 24-25, wherein the auxiliary active agent is an NMDA receptor antagonist, agonist, or other NMDA receptor modulator.

What is claimed is:

1. A compound of Formula I

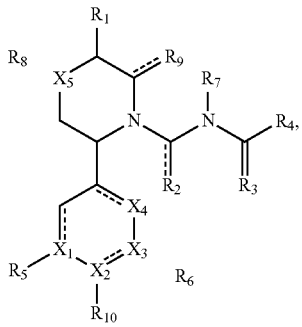

wherein R₁ is H₂,
wherein R₂ and R₃ are each S,
wherein R₄ is

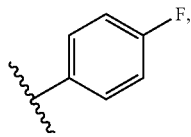

wherein R₅, when optionally present, is H,
wherein R₆, when optionally present, is H,
wherein R₇ is H,
wherein R₈, is H₂,
wherein R₉ is H₂,
wherein R₁₀,
wherein X₁ and X₃ are each individually selected from C or N;
wherein X₂ and X₅ are each C,
wherein X₄ is CH.

2. The compound of claim 1, wherein the compound is compound 3

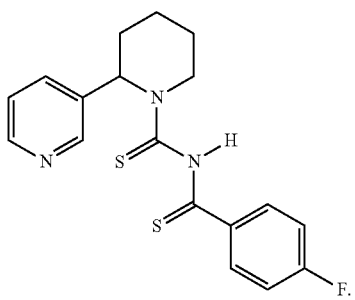

3. The compound of claim 1, wherein the compound is compound 25

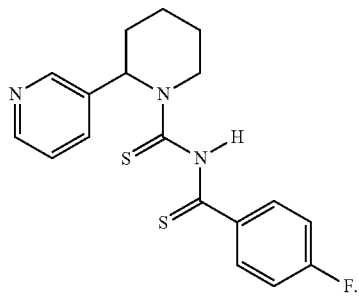

4. The compound of claim 1, wherein the compound is selective for a tri-heteromeric N-methyl-D-aspartate (NMDA) receptor.

5. The compound of claim 1, wherein the compound is a biased allosteric modulator of an N-methyl-D-aspartate (NMDA) receptor.

6. The compound of claim 5, wherein the tri-heteromeric NMDA receptor is GluN1/2A/2B.

7. A pharmaceutical formulation comprising:
the compound of claim 1 or a pharmaceutically acceptable salt thereof;
an optional auxiliary active agent; and
a pharmaceutically acceptable carrier.

8. The pharmaceutical formulation of claim 7, wherein the auxiliary active agent is a N-methyl-D-aspartate (NMDA) receptor agonist.

9. A kit comprising:
an amount of the compound of claim 1 or a pharmaceutical formulation thereof; and instructions.

10. The compound of claim 4, wherein the tri-heteromeric NMDA receptor is GluN1/2A/2B.

11. The compound of claim 1, wherein the compound is biased allosteric modulator of a tri-heteromeric N-methyl-D-aspartate (NMDA) receptor.

12. The kit of claim 9, wherein the instructions are contained on a package.

13. The kit of claim 9, wherein the instructions are contained on a package containing the compound or pharmaceutical formulation thereof.

14. The kit of claim 9, further comprising an auxiliary active agent.

15. The kit of claim 14, wherein the auxiliary active agent is an N-methyl-D-aspartate (NMDA) receptor antagonist.

16. The kit of claim 14, wherein the auxiliary active agent is an N-methyl-D-aspartate (NMDA) receptor agonist.

17. The pharmaceutical formulation of claim 7, wherein the auxiliary active agent is a N-methyl-D-aspartate (NMDA) receptor antagonist.

* * * * *